(12) United States Patent
Li et al.

(10) Patent No.: US 12,537,639 B2
(45) Date of Patent: Jan. 27, 2026

(54) CONFIGURATION SHARING FOR MULTI-NODE PASSIVE SENSING

(71) Applicant: QUALCOMM Incorporated, San Diego, CA (US)

(72) Inventors: Qiaoyu Li, Beijing (CN); Hao Xu, Beijing (CN); Yu Zhang, San Diego, CA (US); Min Huang, Beijing (CN); Chao Wei, Beijing (CN); Jing Dai, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 521 days.

(21) Appl. No.: 17/997,325

(22) PCT Filed: Jun. 11, 2021

(86) PCT No.: PCT/CN2021/099628
§ 371 (c)(1),
(2) Date: Oct. 28, 2022

(87) PCT Pub. No.: WO2022/001624
PCT Pub. Date: Jan. 6, 2022

(65) Prior Publication Data
US 2024/0291606 A1    Aug. 29, 2024

(30) Foreign Application Priority Data

Jun. 30, 2020  (WO) ................ PCT/CN2020/099491
Jun. 30, 2020  (WO) ................ PCT/CN2020/099502

(51) Int. Cl.
*H04L 5/00*    (2006.01)
(52) U.S. Cl.
CPC ................................. *H04L 5/0048* (2013.01)

(58) Field of Classification Search
CPC . H04L 5/0048; H04L 27/261; H04L 27/2655; G01S 13/931; G01S 2013/462;
(Continued)

(56) References Cited

U.S. PATENT DOCUMENTS

2011/0085502 A1    4/2011  Malladi
2014/0133331 A1*   5/2014  Fu .......................... H04L 5/0053
                                                    370/252

(Continued)

FOREIGN PATENT DOCUMENTS

CN    107396311 A    11/2017
CN    111108718 A     5/2020
(Continued)

OTHER PUBLICATIONS

Supplementary European Search Report—EP21833081—Search Authority—The Hague—Jul. 1, 2024.
(Continued)

*Primary Examiner* — Benjamin H Elliott, IV
(74) *Attorney, Agent, or Firm* — Shumaker & Sieffert, P. A.

(57) ABSTRACT

Aspects of the disclosure relate to systems and methods for receiving, by a first user equipment (UE), a message comprising at least one of: reference signal information (RS-info) relating to one or more reference signals (RSs) corresponding to line-of-sight (LoS) signals targeting a receiver other than the first UE, and/or data-decoding information relating to data scheduled for purposes of on-going communication with a second UE, and not scheduled for purposes of on-going communication with the first UE. The disclosure also relates to systems and methods for monitoring for at least one of: encoded signals based on the data-decoding information, and/or for one or more RSs
(Continued)

based on the RS-info. Other aspects, embodiments, and features are also claimed and described.

30 Claims, 19 Drawing Sheets

(58) Field of Classification Search
CPC ........ G01S 7/006; G01S 13/003; G01S 13/46; G01S 13/878; H04W 64/006
See application file for complete search history.

(56) References Cited

U.S. PATENT DOCUMENTS

| | | | |
|---|---|---|---|
| 2014/0341051 A1* | 11/2014 | Gaal | H04B 7/2656 370/252 |
| 2016/0174078 A1* | 6/2016 | Salem | H04W 16/14 370/329 |
| 2016/0227559 A1* | 8/2016 | Schober | H04W 72/542 |
| 2016/0259041 A1* | 9/2016 | Tan | G01S 13/003 |
| 2019/0007181 A1* | 1/2019 | Marinier | H04L 5/0051 |
| 2019/0320428 A1* | 10/2019 | Zhang | H04W 72/20 |
| 2019/0387529 A1* | 12/2019 | Nammi | H04W 72/542 |
| 2020/0015203 A1 | 1/2020 | Zhang et al. | |
| 2020/0052845 A1* | 2/2020 | Chuang | H04L 5/0048 |
| 2020/0181837 A1* | 6/2020 | Igarashi | B41J 2/01 |
| 2021/0076417 A1* | 3/2021 | Bayesteh | H04W 80/02 |
| 2021/0223376 A1* | 7/2021 | Luo | G01S 13/003 |
| 2021/0392516 A1* | 12/2021 | Park | H04L 5/0048 |
| 2023/0309144 A1* | 9/2023 | Zhu | H04W 56/0015 |
| 2024/0291606 A1* | 8/2024 | Li | G01S 13/003 |

FOREIGN PATENT DOCUMENTS

| | | |
|---|---|---|
| EP | 3051741 A1 | 8/2016 |
| EP | 3554160 A1 | 10/2019 |
| WO | 2017117424 A1 | 7/2017 |
| WO | 2018121772 A1 | 7/2018 |
| WO | 2018204151 A1 | 11/2018 |
| WO | 2020057748 A1 | 3/2020 |
| WO | 2021252778 | 12/2021 |
| WO | 2021253307 A1 | 12/2021 |

OTHER PUBLICATIONS

Interdigital Communications: "On NR-PDCCH Structure", R1-1705516, 3GPP TSG RAN WG1 #88bis Meeting, Spokane, WA, USA, Apr. 3-8, 2017, Apr. 8, 2017 (Apr. 8, 2017) the Whole Document, pp. 1-6.
International Search Report and Written Opinion—PCT/CN2021/099628—ISA/EPO—Sep. 10, 2021 9 Pages.
International Search Report and Written Opinion—PCT/CN2020/099491—ISA/EPO—Mar. 29, 2021 9 Pages.

* cited by examiner

CONFIGURATION SHARING FOR MULTI-NODE PASSIVE SENSING

CROSS-REFERENCE TO RELATED APPLICATIONS

This application is a national stage application under 35 U.S.C. § 371 of PCT Application No. PCT/CN2021/099628, filed Jun. 11, 2021, which claims the benefit of priority from PCT Application No. PCT/CN2020/099491, filed in the Chinese Intellectual Property Office on Jun. 30, 2020, and PCT Application No. PCT/CN2020/099502, filed in the Chinese Intellectual Property Office on Jun. 30, 2020, the entire contents of which are incorporated herein by reference as if fully set forth below in their entirety and for all applicable purposes.

TECHNICAL FIELD

The technology described below relates generally to wireless communication systems, and more particularly, to explicitly sharing data-decoding and/or reference signal information for multiple transmitters to facilitate multi-node passive sensing using signals transmitted for other receivers.

INTRODUCTION

In general, radar technology is tailored to extract an object's location-based information such as its distance, speed, angle, position, etc. In some instances, a device employing such radar technologies may be able to locate an object early and initiate mitigation efforts, for example, to avoid colliding with the object, such as when traveling on a path toward the detected object. In various instances, a device may utilize radar signals to detect such objects while utilizing other signals to communicate with other devices. With the growing number of devices capable of such detection, and the growing number of devices reliant on such technologies, the underlying radio access network (RAN) may require a combination of a very high data rate, a very high reliability, and a very low latency. Next-generation wireless telecommunication systems (e.g., such as Fifth Generation (5G) or New Radio (NR) technologies) are being deployed utilizing millimeter-wave (mmW) signals that may allow for efficient data sharing and communication and that may be useful for achieving improved radar technologies.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a summary of one or more aspects of the present disclosure, to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure as a prelude to the more detailed description presented later.

Aspects of the disclosure relate to a method of wireless communication. The method includes, for example, receiving, by a first user equipment (UE), a message including at least one of: (i) reference signal information (RS-info) indicative of a set of resource parameters relating to a set of reference signals (RSs) that correspond to at least one line-of-sight (LoS) signal targeting at least one UE other than the first UE, or (ii) data-decoding information indicative of a first set of data-decoding parameters configured for at least partially decoding a set of encoded data items, the set of encoded data items corresponding to a set of encoded signals configured for a second UE to fully decode via a second set of data-decoding parameters; and monitoring, by the first UE, for at least one of: (i) the set of RSs based on the RS-info, or (ii) the set of encoded signals on one or more channels based on the data-decoding information.

Aspects of the disclosure relate also to a wireless communication device. The wireless communication device includes, for example: a transceiver; memory; and a processor communicatively coupled to the transceiver and the memory. The processor is configured to: receive, via the transceiver, a message including at least one of: (i) a set of reference signal information (RS-info) parameters relating to one or more reference signals (RSs) corresponding to at least one line-of-sight (LoS) signal targeting one or more receiving devices distinct and separate from the wireless communication device, or (ii) a set of data-decoding information parameters relating to data that is scheduled for purposes of communications with the one or more receiving devices via the at least one line-of-sight (LoS) signal targeting the one or more receiving devices; and monitor, using the transceiver, for at least one of: (i) a set of RSs based on the set of RS-info parameters, or (ii) a set of encoded signals based on the set of data-decoding information parameters.

Aspects of the disclosure further relate to an apparatus for wireless communication, including: means for receiving, by a first user equipment (UE), a message including at least one of: (i) a set of reference signal information (RS-info) parameters relating to one or more reference signals (RSs) corresponding to at least one line-of-sight (LoS) signal targeting one or more other devices distinct and separate from the first UE, or (ii) a set of data-decoding information parameters relating to data that is scheduled for purposes of communications with the one or more other devices via the at least one line-of-sight (LoS) signal targeting the one or more other devices; and means for monitoring for at least one of: (i) a set of RSs based on the set of RS-info parameters, or (ii) a set of encoded signals based on the data-decoding information parameters.

Another aspect of the disclosure relates to a scheduling entity for wireless communication. The scheduling entity includes: a transceiver; memory; and a processor communicatively coupled to the transceiver and the memory, the processor configured to: receive, via the transceiver, at least one of: (i) a set of reference signal information (RS-info) parameters including a set of resource parameters corresponding to one or more reference signals (RSs) targeting a plurality of receiving devices, or (ii) a set of data-decoding information parameters including a set of decoding parameters for decoding a set of encoded signals transmitted to a plurality of receiving devices over one or more encoded channels; receive, via the transceiver, a request from a first user equipment (UE) for at least one of: (i) the set of RS-info parameters, wherein the RS-info parameters comprises information relating to one or more reference signals (RSs) that target at least one second UE other than the first UE, or (ii) the data-decoding information parameters, wherein the data-decoding information corresponds to a data-decoding for at least one data item scheduled for at least one second UE; and transmit, via the transceiver, a message to the first UE, wherein the message includes at least one of: (i) the set of RS-info parameters, or (ii) the set of data-decoding information parameters.

Aspects of the disclosure relate to receiving, by a user equipment (UE), a message comprising data-decoding information relating to data that is not scheduled for the UE to receive; and monitoring for encoded signals based on the data-decoding information.

Aspects of the disclosure relate to receiving, by a user equipment (UE), a message comprising reference signal (RS) information relating to one or more RSs that target a receiver other than the UE; and monitoring reference signals (RSs) based on the RS information.

A method for receiving transmission configuration information is disclosed. The method includes receiving, by a first entity (e.g., a first user equipment), a configuration message including: reference signal information corresponding to a set of reference signals transmitted between a plurality of other entities (e.g., at least two entities other than the first user equipment), and/or data-decoding information (e.g., a first set of data-decoding parameters) indicative of a first set of data-decoding parameters corresponding to data conveyed between the plurality of other entities. The method further includes monitoring, by the first entity, for at least one of: (i) the set of reference signals based on the reference signal information, and/or (ii) the data conveyed between the plurality of other entities (e.g., the at least two entities). The method further includes receiving the set of reference signals, wherein the set of reference signals are reflection signals as indicated by the reference signal information (e.g., indicating that the set of reference signals are reflections of a signal transmitted as a line-of-sight (LoS) signal from one of the plurality of other entities (e.g., to the other of the two entities). The first UE may receive the encoded data, where the encoded data is transmitted with the set of reference signals, such as on a demodulation reference signal (DMRS)). The first UE, in such instances, may utilize the transmission configuration information to at least partially decode the encoded signal to determine a decoded subset of data items decoded from a full set of encoded data items. The full set of encoded data items includes a first subset of encoded data items corresponding to the decoded subset of data items, and a second subset of encoded data items corresponding to a remaining subset of encoded data items for at least one of the two other entities to decode. For example, these may be transmitted between a base station and a second UE. The second UE utilizes a second set of data-decoding parameters to monitor, receive, and determine a full set of decoded data items from the full set of encoded data items transmitted to the second UE. In some instances, the transmission configuration information may include additional or different data decoding information (e.g., relative to the first set of data decoding parameters). In such instances, the method includes utilizing the transmission configuration information to receive a different set of encoded data items intended for the first entity to fully decoded. In an example, the first UE utilizing the transmission configuration information to determine a full set of decoded data items from the set of encoded data items transmitted to the first UE.

Aspects of the disclosure relate to receiving, by a scheduling entity, data-decoding information comprising information relating to data-decoding of one or more channels; receiving, by the scheduling entity, a request from a user equipment (UE) for data-decoding information relating data-decoding of one or more channels that are not for any one or more of: reference in relation to transmission or reception of information by the UE, channel characterization by the UE, or synchronization by the UE; and in response to the request from the UE, transmitting a message comprising the data-decoding information to the UE.

Aspects of the disclosure relate to receiving, by a scheduling entity, reference signal (RS) information comprising information relating to one or more reference signals (RSs); receiving, by the scheduling entity, a request from a user equipment (UE) for RS information relating to one or more reference signals (RSs) that target a receiver other than the UE; and in response to the request from the UE, transmitting a message comprising the RS information to the UE.

An apparatus (e.g., a base station, a road side unit, a UE, etc.) including means for sharing configuration information with a first entity is disclosed. The apparatus includes means for transmitting reference signal information indicating a set of reference signals (RSs) transmitted between a plurality of entities including between a second entity and a third entity. In some instances, the plurality of entities may include the apparatus (e.g., a base station transmitting RSs to a remote UE (e.g., a second UE, a sidelink UE, etc.). The reference signal information may indicate the set of RSs using resource parameters (e.g., one or more subcarriers, one or more symbols, etc.). In some examples, the apparatus includes means for transmitting data-decoding information (e.g., a first set of data-decoding parameters) indicative of a first set of data-decoding parameters corresponding to data conveyed between at least two entities. In additional examples, the apparatus includes means for receiving a request from a requesting entity for additional configuration information. In such instances, the apparatus may include additional means for transmitting the configuration information to the requesting entity. The requesting entity may then monitor for signal transmissions (e.g., encoded signal transmissions) transmitted between at least two other entities to be received as a reflection signal corresponding to a line-of-sight data transmission conveyed between the at least two other entities.

These and other aspects of the technology discussed herein will become more fully understood upon a review of the detailed description, which follows. Other aspects, features, and embodiments will become apparent to those of ordinary skill in the art, upon reviewing the following description of certain examples in conjunction with the accompanying figures. While the following description may discuss various advantages and features relative to certain embodiments and figures, all embodiments can include one or more of the advantageous features described herein. In other words, while this description may discuss one or more examples as having certain advantageous features, one or more of such features may also be used in accordance with one or more of the various techniques of this disclosure. In similar fashion, while this description may discuss exemplary embodiments as device, system, or method embodiments, it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein can be practiced. The detailed description includes specific details for providing a thorough understanding of various concepts. However, those skilled in the art will readily recognize that these concepts can be practiced without these specific details. In some instances, this description provides well-known structures and components in block diagram form in order to avoid obscuring such concepts.

While this description describes aspects and embodiments by illustration to some examples, those skilled in the art will understand that additional implementations and use cases can come about in many different arrangements and scenarios. Innovations described herein can be implemented across many differing platform types, devices, systems, shapes, sizes, and/or packaging arrangements. In an example, embodiments and/or uses can come about via integrated chip (IC) embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations can occur. Implementations can span over a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features can also necessarily include additional components and features for implementation and practice of claimed and described embodiments. In an example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that the disclosed technology may be practiced in a wide variety of devices, chip-level components, systems, distributed arrangements, end-user devices, etc. of varying sizes, shapes and constitution.

The disclosure that follows presents various concepts that may be implemented across a broad variety of telecommunication systems, network architectures, and communication standards.

Figure 1:
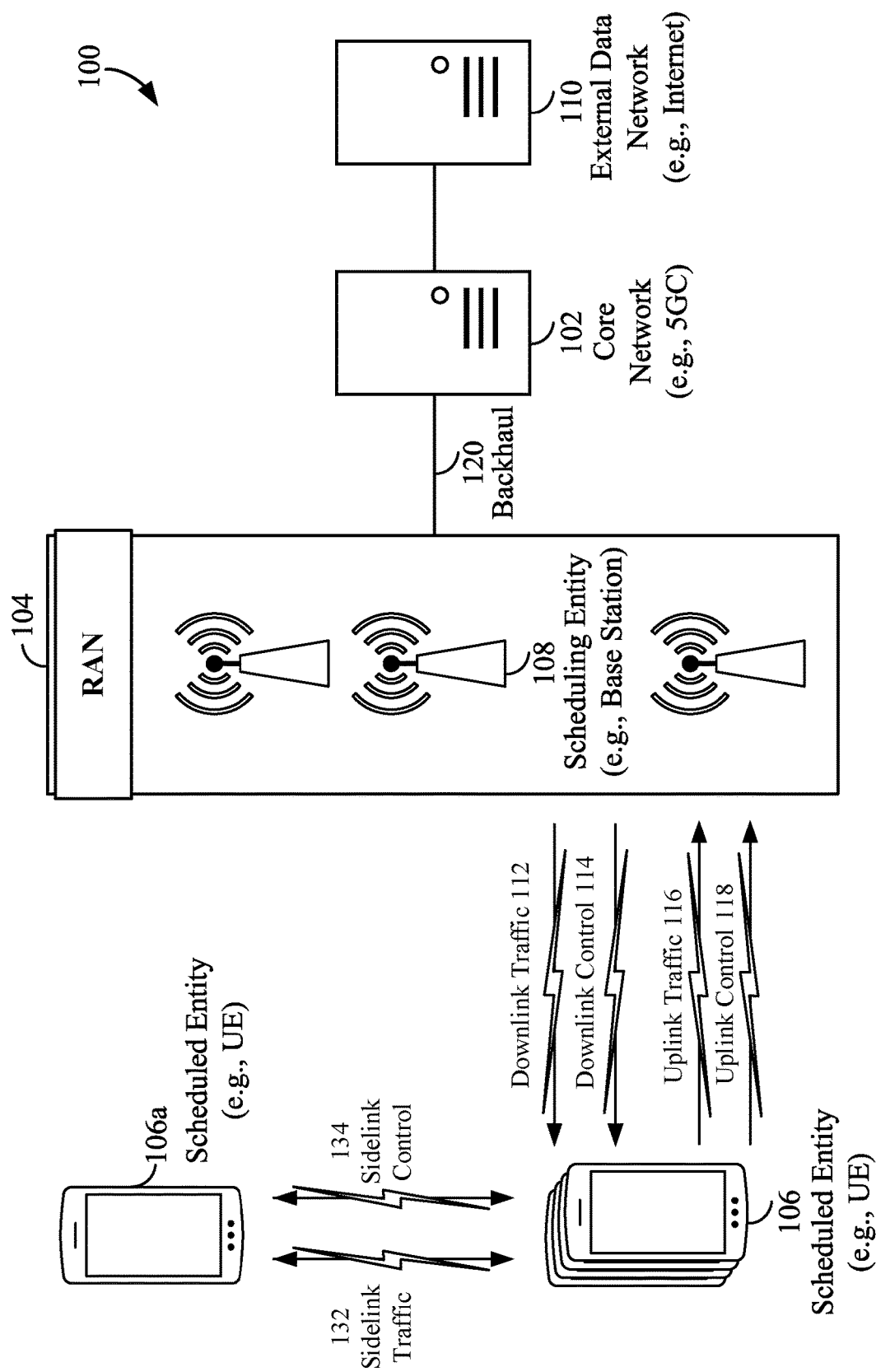
FIG. 1 is a schematic illustration of a wireless communication system, in accordance with one or more of the various techniques of this disclosure.

FIG. 1 is a schematic illustration of a wireless communication system 100, in accordance with one or more of the various techniques of this disclosure, and is described as an illustrative example without limitation. In some aspects, wireless communication system 100 includes several interacting domains: a core network 102, a radio access network (RAN) 104, and a user equipment (UE) 106. In some aspects, by virtue of wireless communication system 100, UE 106 can be enabled to carry out data communication with an external data network 110, such as (but not limited to) the Internet.

In some aspects, RAN 104 can implement any suitable wireless communication technology or combination of technologies to facilitate communication between a UE 106 and a scheduling entity 108 (e.g., by providing radio access to the UE 106). In an example, RAN 104 can operate according to 3rd Generation Partnership Project (3GPP) New Radio (NR) specifications, often referred to as 5G or 5G NR. In some examples, RAN 104 can operate under a hybrid of 5G NR and Evolved Universal Terrestrial Radio Access Network (eUTRAN) standards, which is sometimes referred to as Long-Term Evolution (LTE). 3GPP refers to this hybrid RAN as a next-generation RAN, or NG-RAN. Of course, many other examples can be utilized in connection with the subject matter disclosed herein without departing from the scope of the present disclosure.

NR access may support various wireless communication services, such as enhanced mobile broadband (eMBB) targeting wide bandwidth (e.g., 80 MHz or beyond), millimeter wave (mmW) targeting high carrier frequency (e.g., e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective QoS requirements. In addition, these services may co-exist in the same subframe.

As illustrated in the example of FIG. 1, RAN 104 includes various base stations (BSs) 108. Broadly, a base station (BS) can be used to implement a network element in a radio access network responsible for radio transmission and reception in one or more cells to or from a UE, such as UE 106. In different technologies, standards, and/or contexts, various terminology has been used to refer to a network elements that act as a base station. For example, a base station can also be referred to by those skilled in the art using various terminology to refer to a network element that connects one or more UE apparatuses to one or more portions of core network 102, such as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The RAN 104 supports wireless communication for multiple mobile apparatuses. Those skilled in the art may refer to a mobile apparatus as user equipment (a UE), as in 3GPP specifications, but may also refer to a UE as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides access to network services. A UE may take on many forms and can include a range of devices.

Within the present document, a "mobile" apparatus (aka a UE) need not necessarily have a capability to move, and may be stationary. The term mobile apparatus or mobile device broadly refers to a diverse array of devices and technologies. UEs can include a number of hardware structural components sized, shaped, and arranged to facilitate communication; such components can include antennas, antenna arrays, RF chains, amplifiers, one or more processors, etc., electrically coupled to each other. For example, some non-limiting examples of a mobile apparatus include a mobile, a cellular (cell) phone, a smartphone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus can additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health and/or fitness tracker, a digital audio player (e.g., MP3 player), a camera, a game console, etc. A mobile apparatus can additionally be a digital home device or smart home device such as a home audio device, a home video device, and/or a home multimedia device, an appliance, a vending machine, intelligent lighting, a home security system, a smart meter, etc. A mobile apparatus can additionally be a smart energy device, a security device, a solar panel and/or solar array, a municipal infrastructure device controlling electric power (e.g., a smart grid), a municipal infrastructure device controlling lighting, a municipal infrastructure device controlling water, etc.; an industrial automation and enterprise device; a logistics controller; agricultural equipment; military defense equipment, vehicles, aircraft, ships, weaponry, etc. Still further, a mobile apparatus can provide for connected medicine or telemedicine support, e.g., health care at a distance. Telehealth devices can include telehealth monitoring devices and telehealth administration devices, whose communication may be given preferential treatment or prioritized access over other types of information (e.g., in terms of prioritized access for transport of critical service data, and/or for relevant quality of service (QoS) for transport of critical service data).

Wireless communication between the RAN 104 and a UE 106 may be described as utilizing an air interface. Transmissions over the air interface from a base station (e.g., base station 108) to one or more UEs (e.g., UE 106) can be referred to as downlink (DL) transmissions. In accordance with one or more of the various techniques of this disclosure, the term "downlink" may refer to a point-to-multipoint transmission originating at a scheduling entity (e.g., base station 108). For example, a DL can be implemented using one or more broadcast channel multiplexing techniques. In some aspects, transmissions from a UE (e.g., UE 106) to a base station (e.g., base station 108) may be referred to as uplink (UL) transmissions. In accordance with one or more of the various techniques of this disclosure, the term "uplink" may refer to a point-to-point transmission originating at a scheduled entity (e.g., UE 106). As illustrated in FIG. 1, a scheduling entity 108 may manage DL traffic 112 to one or more scheduled entities 106, and UL traffic 116 from one or more scheduled entities 106.

In some aspects, access to the air interface may be scheduled, wherein a scheduling entity (e.g., a base station of RAN 104, such as base station 108) allocates wireless resources for communication among some or all devices and equipment within its service area or cell. Within the present disclosure, the scheduling entity 108 may be responsible for scheduling, assigning, reconfiguring, and releasing resources for one or more scheduled entities 106. In such an example, for scheduled communication, scheduled entities (e.g., UEs 106) may utilize resources allocated by a scheduling entity (e.g., base station 108). In an example, the scheduled entities 106 may include entities scheduled for communication (e.g., UEs) that are configured to utilize resources allocated by the scheduling entity 108.

It should be noted that base stations (BSs) are not the only entities that can function as scheduling entities. That is, in some examples, a UE may function as a scheduling entity. A UE, as such, may, in some instances, be configured to schedule resources for one or more scheduled entities (e.g., one or more other UEs) in the wireless communication system 100.

As illustrated in FIG. 1, in some aspects, a scheduling entity (e.g., base station 108) may broadcast downlink (DL) traffic 112 to one or more scheduled entities (e.g., UEs 106). Broadly, in some aspects, a scheduling entity (e.g., base station 108) can act as a node or device responsible for scheduling traffic in a wireless communication network, including DL traffic 112 and, in some examples, UL traffic 116 from one or more scheduled entities (e.g., UEs 106) to the scheduling entity (e.g., base station 108). Additionally, a scheduled entity (e.g., UE 106) can act as a node or device that receives DL control information (DCI) 114, including (but not limited to) scheduling information (e.g., a grant), synchronization or timing information, and/or other control information from another entity in the wireless communication network, such as the scheduling entity (e.g., base station 108).

In general, a scheduling entity (e.g., one or more base stations 108) may include a backhaul interface for communication with a backhaul 120 of the wireless communication system 100. In some examples, the backhaul 120 can provide a link between a particular base station and core network 102. Further, in some examples, a backhaul network (e.g., including backhaul 120) can provide interconnection between various base stations 108. Various types of backhaul interfaces can be employed, such as a direct physical connection, a virtual network, and/or any other suitable connection, using any suitable transport network.

The core network 102 may be a part of the wireless communication system 100, and may be independent of the radio access technology (RAT) used in RAN 104. In some examples, the core network 102 may be configured according to NR specifications (e.g., 5GC). In another example, the core network 102 may be configured according to a 4G evolved packet core (EPC), or any other suitable standard or configuration.

In some aspects, UE 106 can simultaneously connect to multiple base stations 108 and/or can connect to a single base station 108 using multiple component carriers (CCs) (e.g., at different frequencies) to increase the bandwidth available for communications to and/or from UE 106. Additionally, in some aspects, UE 106 can receive signals transmitted by multiple transmitters that may not be base stations (BSs), such as other UEs, road side units (RSUs), and/or any other transmitter. In some aspects, such signals can be used in a multi-node passive sensing process (which is sometimes referred to as passive radar, passive radar sensing, bistatic radar, or multistatic radar sensing). For example, passive radar sensing can include object detection, ranging, or other similar object characterization based on signals transmitted from another entity other than the one performing the passive radar sensing, where those signals are at least partially reflected from an object before being received.

In some examples, scheduled entities such as a first scheduled entity 106 and a second scheduled entity 106a may utilize sidelink (SL) signals for communication. Sidelink (SL) signals may include sidelink traffic 132 and sidelink control information (SCI) 134. In some aspects, SCI 134 can include a request signal. For example, SCI 134 can include a request-to-send (RTS), a source transmit signal (STS), a direction selection signal (DSS), and/or any other suitable request signal(s). A request signal can provide a mechanism for a particular scheduled entity 106 to request a duration of time to keep a sidelink (SL) channel available for an SL signal. In some aspects, SCI 134 can include a response signal. For example, SCI 134 can include a clear-to-send (CTS) signal, a destination receive signal (DRS), and/or any other suitable response signal(s). A response signal can provide a mechanism for a particular scheduled entity 106 to indicate the availability of the SL channel (e.g., for a requested duration of time). In some aspects, an exchange of request and response signals (e.g., a handshake) can facilitate different scheduled entities performing sidelink (SL) communications to negotiate the availability of the SL channel, for example, prior to communication of the sidelink traffic 132.

It should be noted that the techniques described herein may be used for various wireless networks and radio technologies, and that while some aspects of the present disclosure may be described using terminology commonly associated with 3G, 4G, and/or new radio (e.g., 5G NR) wireless technologies, aspects of the disclosed technology can be applied in other generation-based communication systems as would be understood by a person skilled in the art.

In general, any number of wireless networks may be deployed in a given geographic area. Each wireless network may support a particular RAT and may operate on one or more frequencies. Those skilled in the art may variously refer to a RAT as a radio technology, an air interface, etc. Those skilled in the art may further refer to a frequency as a carrier, a subcarrier, a frequency channel, a component carrier, a tone, a subband, etc. Each frequency may support a single RAT in a given geographic area in order to avoid interference between wireless networks of different RATs.

Figure 2:
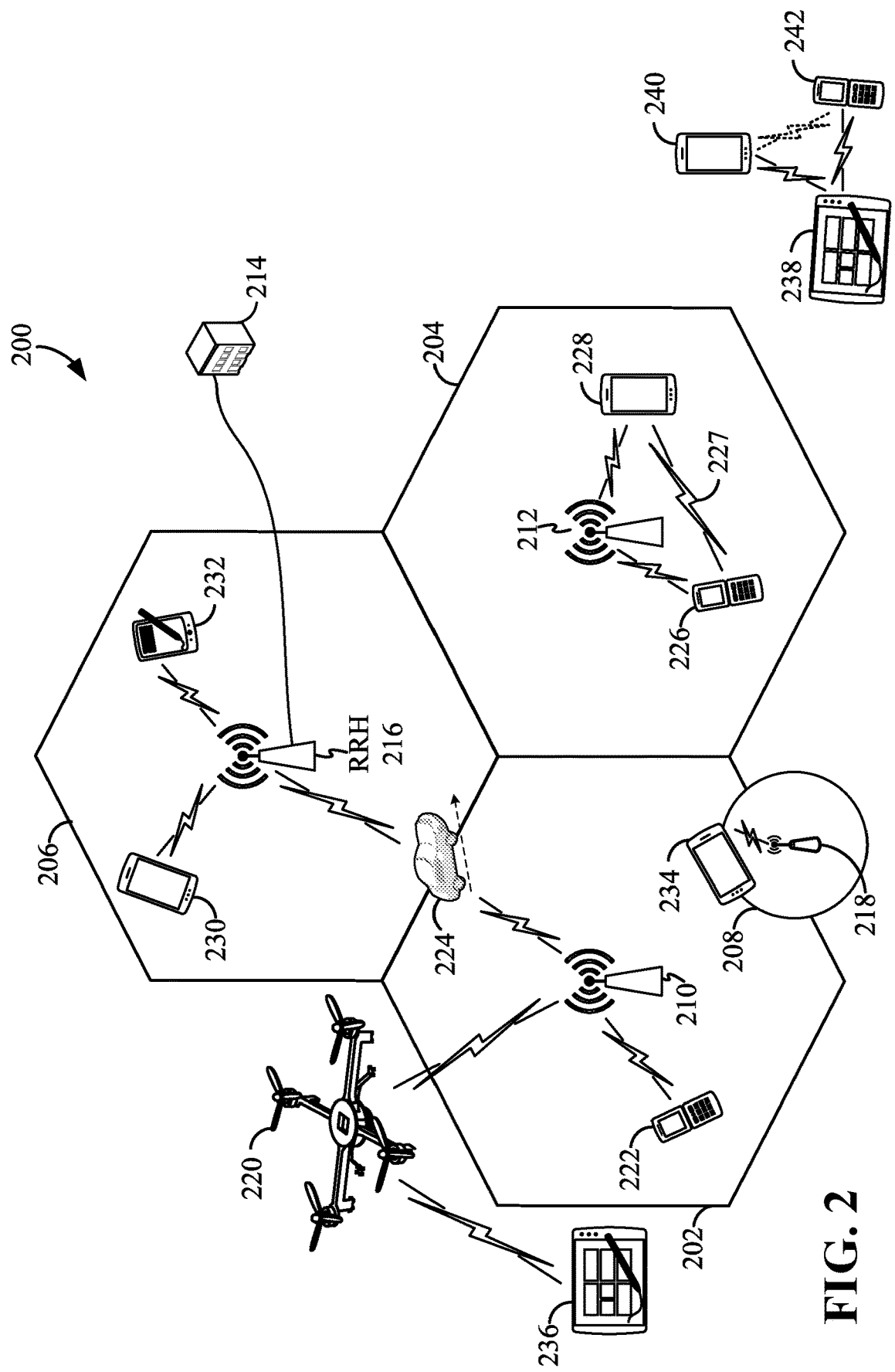
FIG. 2 is a conceptual illustration of an example of a radio access network (RAN), in accordance with one or more of the various techniques of this disclosure.

FIG. 2 provides a schematic illustration of a radio access network (RAN) 200, by way of example and without limitation, in accordance with one or more of the various techniques of this disclosure. In some examples, RAN 200 can be an implementation of RAN 104 described above in connection with, and illustrated in, FIG. 1. For example, the RAN 200 may be an NR system (e.g., a 5G NR network). The RAN 200 may be in communication with a core network 102. The core network 102 may be in communication with one or more BSs 210, 212, 214, 218, and/or 220, and/or UEs 222, 224, 226, 228, 230, 232, 234, 236, 238, 240, and/or 242 in the RAN 200 via one or more interfaces.

The geographic area covered by the RAN 200 may be divided into cellular regions (cells) that a user equipment (UE) may uniquely identify, for example, based on an identification broadcast from one access point or base station (BS). FIG. 2 illustrates macrocells 202, 204, and 206, and a small cell 208, each of which can include one or more sectors (not shown). For example, a sector can be defined as a sub-area of a cell, and all sectors within one cell can be served by the same BS. A radio link within a sector can be identified by a single logical identification belonging to that sector. In a cell that is divided into sectors, the multiple sectors within a cell can be formed by groups of antennas with each antenna responsible for communication with UEs in a portion of the cell.

FIG. 2 shows two base stations (BSs) 210 and 212 in cells 202 and 204; and shows a third base station 214 controlling a remote radio head (RRH) 216 in cell 206. That is, a base station can have an integrated antenna or can be connected to an antenna or RRH by feeder cables. In the illustrated example, cells 202, 204, and 206 may be referred to as macro cells, as BSs 210, 212, and 214 support cells having a relatively large size. Further, a base station 218 is shown in small cell 208 (which can be referred to, for example, as a micro cell, pico cell, femto cell, home base station, home Node B, home eNode B, etc.) which can overlap with one or more macro cells. In the example illustrated in FIG. 2, cell 208 can be referred to as a small cell, as base station 218 supports a cell having a relatively small size. In some aspects, cell sizing can be done according to system design as well as component constraints.

The RAN 200 may include any number of wireless BSs and cells. Further, a RAN may include a relay node to extend the size or coverage area of a given cell. The BSs 210, 212, 214, 218, 220 provide wireless access points to a core network 102 for any number of mobile apparatuses. In some examples, BSs 210, 212, 214, 218, and/or 220 may include particular implementations of scheduling entity 108 described, for example, with reference to FIG. 1.

FIG. 2 further includes a quadcopter 220 (which is sometimes referred to as a drone), which can be configured to function as a base station, in some examples. That is, in some examples, a cell may not necessarily be stationary, and the geographic area of the cell can move according to the location of a mobile base station such as quadcopter 220.

Within RAN 200, the cells may include UEs that may be in communication with one or more sectors of each cell. Further, each base station 210, 212, 214, 218, and 220 may be configured to provide an access point to a core network 102 (e.g., as described above in connection with FIG. 1) for all the UEs in the respective cells. For example, UEs 222 and 224 can be in communication with base station 210; UEs 226 and 228 can be in communication with base station 212; UEs 230 and 232 can be in communication with base station 214 by way of RRH 216; UE 234 can be in communication with base station 218; and UE 236 can be in communication with mobile base station 220. In some examples, UEs 222, 224, 226, 228, 230, 232, 234, 236, 238, 240, and/or 242 can be particular implementations of UE 106 described, for example, with reference to FIG. 1.

In some examples, a mobile network node (e.g., a quadcopter 220) may be configured to function as a UE. In an example, quadcopter 220 may operate within cell 202 by communicating with base station 210.

In some aspects, sidelink (SL) signals may be utilized between UEs without necessarily relying on scheduling or control information from a base station (BS). For example, two or more UEs (e.g., UEs 226 and 228) may communicate with each other using peer-to-peer (P2P) or sidelink (SL) signals without relaying that communication through a base station (e.g., base station 212). In another example, UE 238 is illustrated communicating with UEs 240 and 242. In such an example, UE 238 can function as a scheduling entity or a primary sidelink (SL) device, and UEs 240 and/or 242 can function as scheduled entities and/or non-primary (e.g., secondary) sidelink (SL) device(s).

In some examples, a UE can function as a scheduling entity in a device-to-device (D2D) network, a peer-to-peer (P2P) network, a vehicle-to-vehicle (V2V) network, a vehicle-to-infrastructure (V21) network, a vehicle-to-everything (V2X) network, and/or in a mesh network. In a mesh network example, UEs 240 and 242 can optionally communicate directly with one another, in addition to communicating with a scheduling entity (e.g., UE 238). Thus, in a wireless communication system 100 with scheduled access to frequency-time domain (FD-TD) resources and having a cellular configuration, a peer-to-peer (P2P) configuration, a vehicle-to-everything (V2X) network, etc., and/or a mesh configuration, a scheduling entity 108 and one or more scheduled entities 106 may communicate utilizing the scheduled resources.

The air interface in the RAN 200 can utilize one or more multiplexing and multiple access algorithms to enable simultaneous communication of the various devices. For example, 5G NR specifications provide multiple access for uplink (UL) transmissions from UEs 222 and 224 to a base station (BS) 210, and for multiplexing for downlink (DL) transmissions from BS 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-orthogonal frequency division multiple access (OFDMA) (DFT-s-OFDMA) with a CP (also referred to as single-carrier FDMA (SC-FDMA)). However, within the scope of the present disclosure, multiplexing and multiple access are not limited to such schemes. For example, a UE may provide for UL multiple access utilizing time division multiple access (TDMA), time division synchronous code division multiple access (TD-SCDMA), code division multiple access (CDMA), frequency division multiple access (FDMA), sparse code multiple access (SCMA), resource spread multiple access (RSMA), or other suitable multiple access schemes. Further, a BS may multiplex DL transmissions to UEs utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Examples for the Passive Sensing of Objects in an Environment

Figure 3:
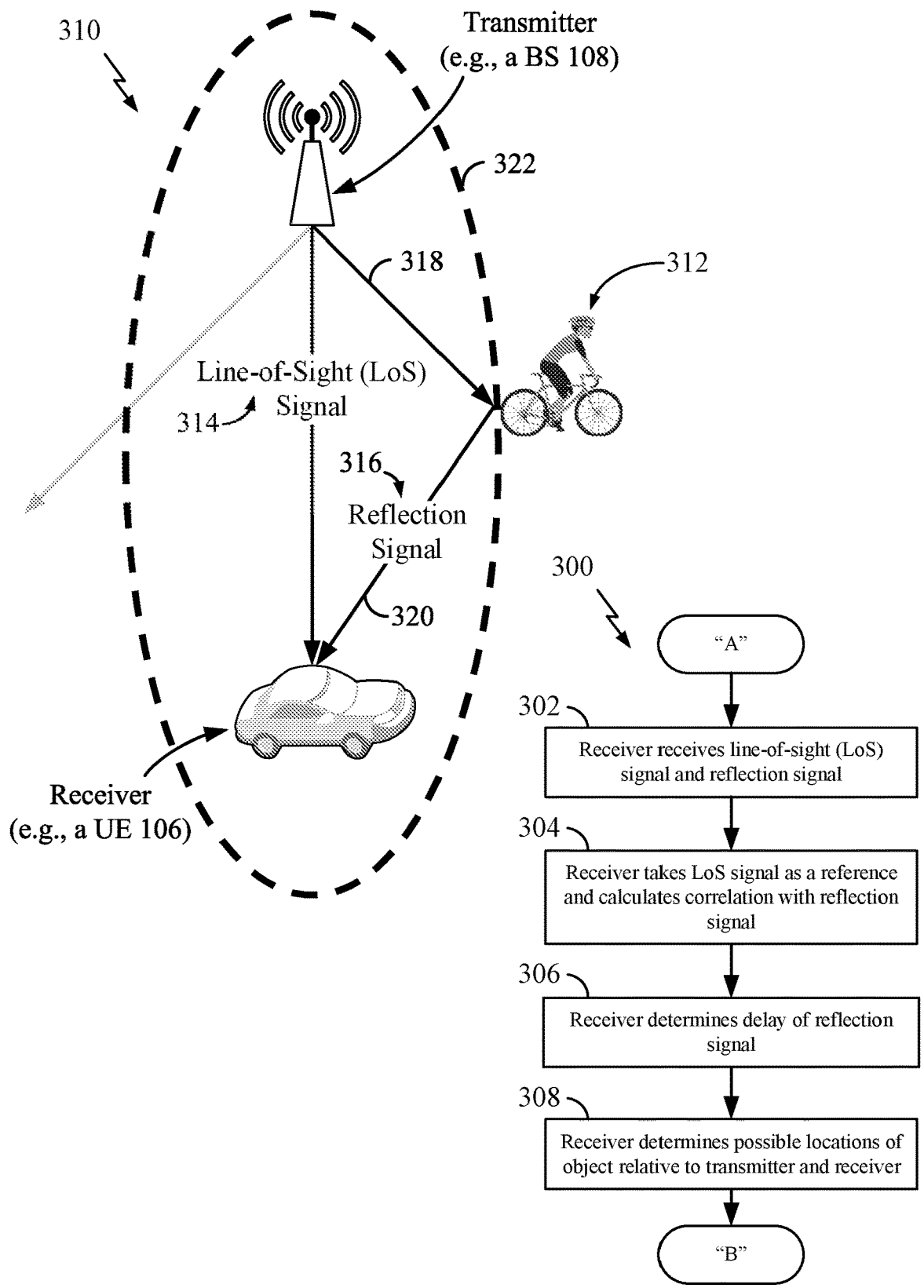
FIG. 3 is a conceptual illustration of passive sensing with a single transmitter, and a flow chart illustrating an example process for passive sensing, in accordance with one or more of the various techniques of this disclosure.

FIG. 3 is a conceptual illustration 310 of passive sensing with a single transmitter (which can sometimes be referred to as an 'illuminator of opportunity' (IOO)) and a flow chart illustrating an example process 300 for passive sensing, in accordance with one or more of the various techniques of this disclosure, and is described as an illustrative example without limitation. As shown in FIG. 3, in a passive sensing process (e.g., passive radar, passive coherent location (PCL), etc.), a transmitter (e.g., a base station (BS) 108) and a receiver (e.g., a user equipment (UE) 106) may be located in different physical locations, whereas in a conventional mono-static sensing process the transmitter and receiver are co-located (e.g., a single device both transmitting radar signals and receiving those signals back after being reflected off an object). In the example shown in FIG. 3, only a single object (e.g., object 312) is illustrated for simplicity. However, there may be many more obstructions in the environment of the transmitter (e.g., the illuminator) and the receiver (e.g., the observer), creating multiple objects, such as object 312, that can be detected using one or more of the various passive radar techniques of this disclosure.

In some aspects, when the transmitter transmits a signal, both a line-of-sight (LoS) signal 314 and a signal that has been reflected (e.g., backscattered) from the object 312 can be received at the receiver. As shown in FIG. 3, the LoS signal 314 may take a straight path to the receiver (e.g., a UE 106). In such examples, a reflection signal (e.g., a backscattered signal) corresponding to the LoS signal (e.g., sent from the same transmitter using the same or similar resources) may take a relatively longer path to the receiver compared to the straight path of the LoS signal 314. To illustrate, the longer path of the reflection signal 316 may include at least one first path 318 to the object 312, and at least one second path 320 back toward the receiver. It should be understood that additional corresponding parts of the LoS signal 314 may propagate outwardly away from the transmitter and/or may not reflect off any object or may scatter off an object, such as object 312, in various other directions away from the receiver. This is because the LoS signal 314, while transmitted as targeting a particular receiver as shown, may nevertheless exhibit wavelike properties that radiate outwardly in various directions including in the intended direction toward the intended receiver, such that the receiver receives the LoS signal and corresponding parts of the LoS signal in various instances. In the example shown in FIG. 3, a single reflection signal 316 (separate from the LoS signal 314) is shown for simplicity as having reflected off the example object 312.

In some aspects, the receiver can correlate the LoS signal 314 (taken as the reference signal) and the reflection signal 316 (e.g., the backscattered signal or wave). The receiver (or another entity such as a central node or server) may determine, from the correlation maximum, a time delay ($\Delta t$) to determine the possible positions of the object 312 (e.g., as being potentially along an outer part of various geometric constructs, such as along the perimeter of an ellipse 322).

In an illustrative example, the receiver may determine the time delay between arrival of the two signals (e.g., the LoS signal and its corresponding reflection signal) to determine an ellipse describing possible positions of the object 312 relative to the transmitter and the receiver. In such examples, the transmitter and receiver may be conceptually placed or located at the foci of the ellipse 322 (as shown in FIG. 3).

The object 312 may theoretically be located in various locations along the ellipse 322. This is because the object 312 may still reflect the reflection signal 316 back to the receiver with a similar time delay if the object 312 were on the opposite side of the ellipse, for example. As such, the use of an ellipse 322, without more, may describe possible positions 312 of the object 312, rather than provide a precise spatial location for the object 312. As described herein, additional data (e.g., additional ellipse information received from other observers) may be useful for determining an exact spatial location of the object 312.

As shown in FIG. 3, the receiver (e.g., a user equipment (UE) 106, a base station (BS) 108, another device) can execute an example process 300 for passive sensing, in accordance with one or more of the various techniques of this disclosure. In some aspects, process 300 can begin at "A" and can proceed to block 302.

At block 302, the receiver can receive a line-of-sight (LoS) signal 314. In addition, the receiver may receive a reflection signal 316 (e.g., a backscattered signal) that has reflected off one or more objects 312. In such examples, a time delay $\Delta t$ may exist between when the receiver receives the LoS signal 314 and when the receiver receives the reflection signal 316. In some aspects, the receiver can use any suitable technique or combination of techniques to receive the LoS signal 314 and the reflection signal 316 (e.g., a multipath reflection signal). For example, the receiver can sample and buffer a received wireless signal, and apply suitable processing to the buffered signal such as energy detection, demodulation, decoding, etc.

At block 304, the receiver can use the line-of-sight (LoS) signal 314 as a reference, and can calculate a correlation with the reflection signal 316. Note that because the LoS signal 314 has traveled to the receiver on a straight line, the receiver may receive the LoS signal 314 prior to receiving any reflection signal(s) corresponding to the LoS signal 314. A receiver may determine the correlation between the LoS signal 314 and the reflection signal(s) 316 using any suitable technique or combination of techniques.

In an illustrative example, a receiver of a line-of-sight (LoS) signal and corresponding reflection signal(s) may convert received LoS and reflection signals from the time domain (TD) into the frequency domain (FD) (e.g., using a circuit for performing a fast Fourier transform (FFT)). In such examples, the receiver may then apply a filter (e.g., a matched filter) process to determine a correlation between the LoS signal 314 and the reflection signal(s) 316.

In an illustrative example, a receiver (or other entity, such as a central node) may determine a correlation between the LoS signal 314 and the reflection signal 316 delayed by time $\tau$ by multiplying the conjugate of the FD components of the LoS signal 314 ($S_{ref}*(f)$) with the FD components of the reflection signal 316 shifted by $\tau(S(f))$. A correlation $g(\tau)$ between the LoS signal 314 and the reflection signal 316 can then be determined using the relationship: $g(\tau)=F^{-1}$ [$S(f) S_{ref}*(f)$] by applying an inverse FFT (IFFT) to the result of the multiplication. In such an example, the FD signals can be filtered (e.g., using a rectangular windowing function) to reduce noise that falls outside of the baseband of the received signals. This can be repeated at various time delays (e.g., corresponding to a detection range of the passive radar sensing). A subsequent IFFT can be applied to the correlation from a sequence of time delayed correlations (e.g., for $\tau=[0, i]$, where 0 represents a time at which the LoS signal was received) to generate a range profile across delays $\tau$.

At block 306, the receiver can determine the delay $\Delta t$ between the line-of-sight (LoS) signal 314 and the reflection signal 316 based on the time delay at which the correlation between the two signals is maximized. In some aspects, there may be multiple maxima in the correlations corresponding to multiple objects (not shown in FIG. 3) that may have reflected the same signal. In some aspects, the receiver can determine the time delay $\Delta t$ between LoS signal 314 and a reflection signal 316 (note there may be multiple reflection signals from different objects) by finding the maximum (or maxima) in the correlated data. Note that any particular range estimate can be affected by noise. In some aspects, the receiver can generate a Doppler matrix across the slow time axis. For example, each sample in slow time can represent a range profile generated based on a correlation between an LoS signal 314 and one or more reflection signal(s) 316, with the LoS signal 314 being transmitted periodically (at regular or irregular intervals). This can be used to differentiate between moving objects (e.g., object 312) and the environment. In a particular example, a Doppler matrix can be generated using an FFT filter bank with 'D' inputs corresponding to the number of LoS-signal transmissions used to generate the Doppler matrix. In some aspects, the delay $\Delta t$ can be determined by finding the maximum (or maxima) in the Doppler matrix, which can correspond to objects that have been detected (e.g., object 312).

At block 308, the receiver can determine the ellipse 322 corresponding to one or more possible locations of the object(s) (e.g., object 312) based on delay $\Delta t$. In an example, the receiver may determine the ellipse 322 by tracing possible locations of the object 312 relative to the transmitter and receiver. In some aspects, the ellipse 322 can be determined by determining the path length corresponding to the delay $\Delta t$. In an example, the path length may be determined by dividing the speed of light by $\Delta t$.

In some examples, the receiver may use its own position and a known position of the transmitter to determine which locations in the environment around the receiver lie on the ellipse 322. For example, the receiver can draw an ellipse 322 conceptually using the positions of the transmitter and the receiver as the foci, and finding all points that are at least a distance (e.g., corresponding to the speed of light multiplied by $\Delta t$) from each transmitter (e.g., illuminator(s)), whether those include a base station 108, a road side unit (RSU), a user equipment (UE) 106, etc. In a more particular example, the receiver can determine an ellipse 322 that has the transmitter and the receiver as the foci, and a height $2b$ and width $2a$ such that each position of the ellipse 322 lies a distance corresponding to time $t_{tran}$ from the transmitter and a distance corresponding to time $t_{rec}$ from the receiver with $t_{tran}+t_{rec}=t_{LoS}+\Delta t$, which can be represented by the relationship $t_{tran}^2/a^2+t_{rec}^2/b^2=1$. In an illustrative and non-limiting example, the receiver can determine the width $2a$ using the relationship $$a = \frac{1}{2}t_{LoS} + \frac{1}{2}\Delta t,$$

and can determine the height $2b$ using the relationship b= $\sqrt{c^2-a^2}$, where $c=(\tau+\Delta t)/2$. In some aspects, after determining an ellipse 322 based on the line-of-sight (LoS) signal 314 and the one or more reflection signal(s) 316, process 300 can proceed to "B" at which process 300 can end.

Examples for Multi-Node Passive Sensing Environments

Figure 4:
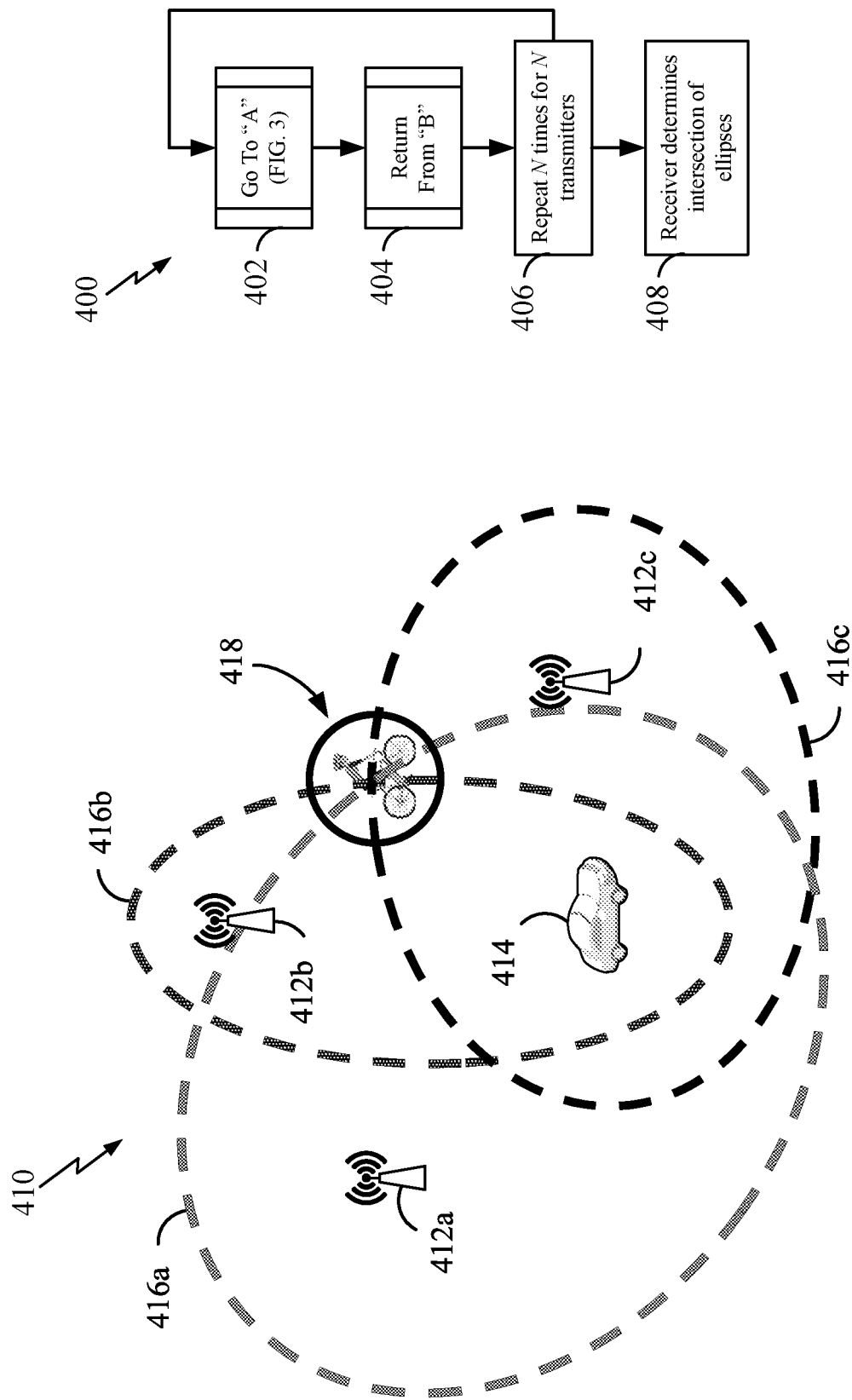
FIG. 4 is a conceptual illustration of an example environment for multi-node passive sensing involving multiple transmitters, and a flow chart illustrating example processes for multi-node passive sensing, in accordance with one or more of the various techniques of this disclosure.

FIG. 4 is a conceptual illustration of an example multi-node passive sensing environment 410 involving multiple transmitters (which can sometimes be referred to as 'illuminators of opportunity'), in accordance with one or more of the various techniques of this disclosure FIG. 4 also provides a flow chart illustrating an example process 400 for multi-node passive sensing, in accordance with one or more of the various techniques of this disclosure. FIG. 4 is described as an illustrative example without limitation. As shown in FIG. 4, in a multi-node passive sensing environment 410, multiple transmitters (e.g., base stations (BSs) 412 in this illustrative example) and/or one or more receivers (e.g., a user equipment (UE) 414 in this example) may be located in different physical locations. In the examples shown in FIG. 4, only a single object (e.g., object 418) is illustrated for simplicity. However, there may be many more obstructions in the environment of the transmitter(s) and/or the receiver (s), creating multiple objects that can be detected.

In some examples, in a multi-node passive sensing example involving multiple transmitters (e.g., multiple base stations (BSs) 108) and a receiver (e.g., UE 414 via a transceiver of UE 414) capable of receiving signals (e.g., downlink (DL) transmissions) from the multiple transmitters (e.g., from base station 412a, base station 412b, base station 412c, etc.), the receiver 414 can determine a location of the object 418 by generating multiple ellipses (e.g., ellipse 416a, 416b, and/or 416c, etc.). In some aspects, the receiver 414 can determine the object 418 is located at an intersection of the multiple ellipses (e.g., ellipse 416a, 416b, and/or 416c, etc.). In this way, the receive 414 may place the object 418 at the intersection of the multiple ellipses (e.g., ellipse 416a, 416b, and/or 416c, etc.).

In some examples, a receiver (e.g., a UE 106, such as UE 414, a BS 108, and/or another device, such as a road side unit (RSU), etc.) can execute example process 400 for multi-node passive sensing, in accordance with one or more of the various techniques of this disclosure.

At block 402, the receiver 414 can go to "A" in process 300 described above in connection with FIG. 3. There, the receiver 414 may perform the process 300 of FIG. 3, starting from "A" and proceeding through the process 300 to "B," in various examples.

At block 404, process 400 (being executed via a receiver 414) may return from "B" in process 300 described above in connection with FIG. 3. That is, as described with reference to block 308 of FIG. 3, the receiver may determine at least one ellipse 322 by tracing possible locations of one or more object(s) (e.g., object 312 in FIG. 3) relative to the transmitter and the receiver, in accordance with one or more of the various techniques of this disclosure. When returning from "B," the ellipse 322 corresponding to the transmitter of FIG. 3 may then relate to any one of ellipses 416a, 416b, 416c, etc., corresponding to any one of the transmitters 412a, 412b, 412b, etc., of FIG. 4.

At block 406, the process 400 (being executed by a receiver 414) may return to block 402 until block 402 to block 406 have been repeated N times, where 'N' may correspond to the number of transmitters (e.g., transmitters 412a, 412b, 412c, etc.) being used in the multi-node passive sensing process (e.g., three in this particular example, as but one example for N number of transmitters).

When block 402 to block 406 have been repeated N times, process 400 can proceed to block 408. Note that in each iteration of block 402 to block 406, multiple ellipses can be determined if there are multiple objects that reflect (e.g., backscatter) the transmitted signals strongly enough (e.g., a first ellipse corresponding to a first object 312 in FIG. 3, a second ellipse corresponding to a second object (not shown in FIG. 3), etc.) and/or in a direction toward a particular receiver 414.

At block 408, the receiver 414 (or another entity, such as a central server) can determine one or more intersection points at which the ellipses (e.g., ellipse 566a, ellipse 566b, ellipse 566c, etc.) effectively intersect as candidate locations of an object 418. The receiver 414 may then utilize the one or more intersection points to estimate the spatial location(s) of one or more object(s) (e.g., for object 418). In an illustrative and non-limiting example, a receiver 414 (or other entity) may aggregate and/or plot each ellipse (e.g., ellipse 566a, ellipse 566b, ellipse 566c, etc.) using Cartesian coordinates. The entity may then determine whether certain points along various ellipses are within one or more predetermined intersection distances from other points along various other ellipses to satisfy an intersection threshold (e.g., within feet of one another, as just an example). In such examples, an entity may determine that the ellipses 566a-566c approximately intersect with at least one intersection point where object 418 is shown in FIG. 4. In some examples, a receiver 414 (or other entity) may utilize clusters of ellipse intersections to estimate object positions (e.g., a position of object 418).

In some examples, a receiver 414 (or other entity) may generate and/or receive ellipse information defining a plurality of ellipses (e.g., ellipse 566a, ellipse 566b, ellipse 566c, etc.). The ellipse information may include certain geometry values or other ellipse coordinates for effectively tracing, at least partially, a given ellipse corresponding to the ellipse information. In such examples, the receiver 414 (or other entity) may then arrange a set of such ellipse values (e.g., Cartesian coordinates, etc.) into a matrix or other mathematical construct. The receiver 414 (or other entity) may then solve a system of equations to determine one or more candidate intersection points. In addition, or alternatively, a receiver 414 (or other entity) may use a filter, such as an extended Kalman filter or an unscented Kalman filter, to determine one or more candidate intersection points.

Figure 5:
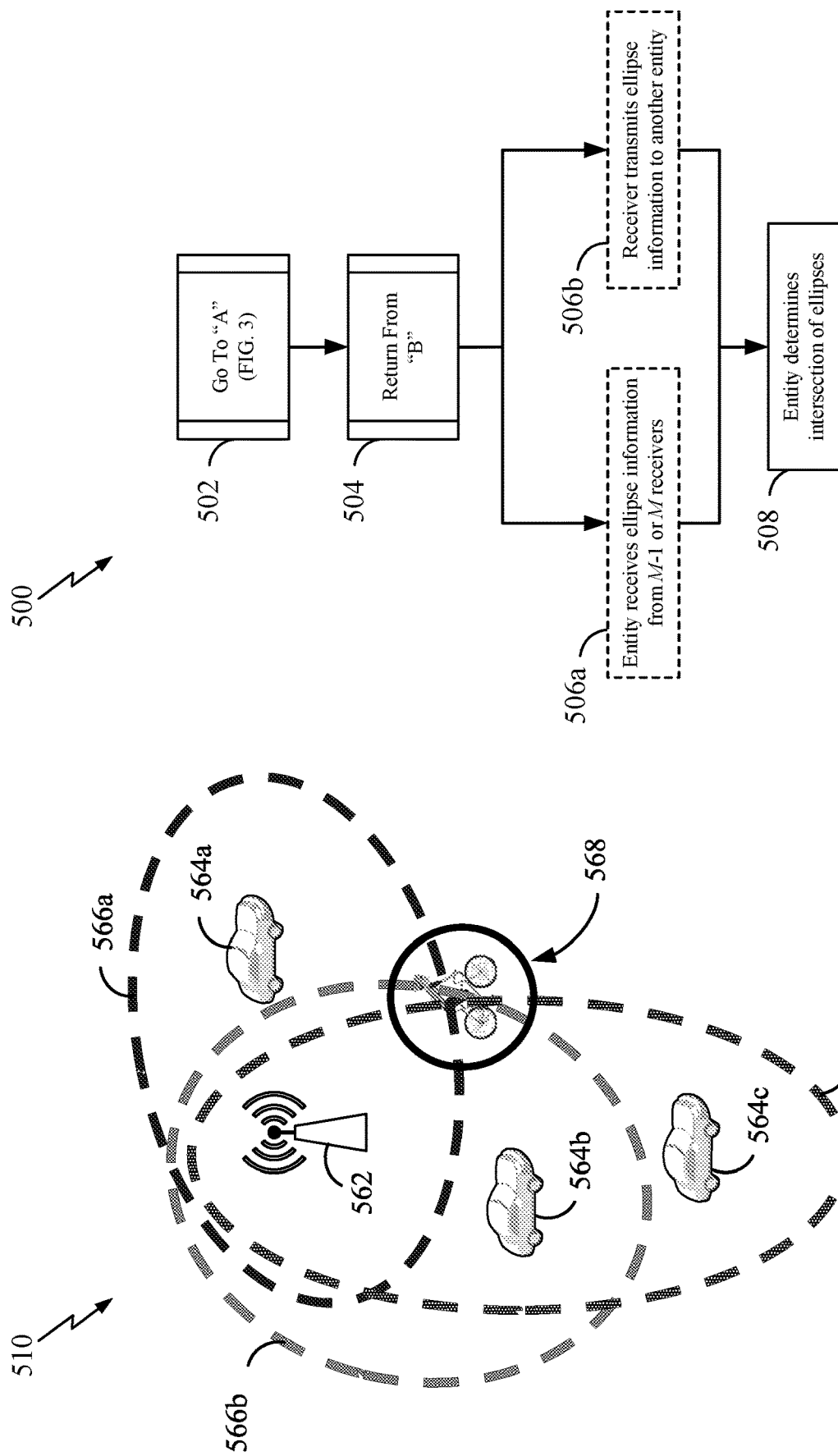
FIG. 5 is a conceptual illustration of an example environment for multi-node passive sensing involving multiple receivers, and a flow chart illustrating example processes for multi-node passive sensing, in accordance with one or more of the various techniques of this disclosure.

FIG. 5 is a conceptual illustration of an example multi-node passive sensing environment 510, in accordance with one or more of the various techniques of this disclosure. FIG. 5 also provides a flow chart illustrating an example process 500 for multi-node passive sensing, in accordance with one or more of the various techniques of this disclosure. FIG. 5 is described as an illustrative example without limitation.

In this illustrative example, multi-node passive sensing environment 510 involves at least one transmitter 562 (e.g., a base station 108 in this particular example) and multiple receivers (e.g., user equipment (UE) 564a, UE 564b, UE 564c, etc.) capable of receiving signals (e.g., downlink (DL) transmissions) from the at least one transmitter 562. In such examples, an entity, such as the at least one transmitter 562, one or more of the receivers 564, and/or any other suitable entity (e.g., a data server, road side unit (RSU), etc.), may determine a spatial location of one or more objects (e.g., the object 568 shown in FIG. 5) in a particular radio network (e.g., RAN 104/200). Similar to the one or more techniques described previously, the entity may do so by generating and/or fusing multiple ellipses (e.g., ellipse 566a, ellipse 566b, ellipse 566c, etc.) to determine intersection points corresponding to various objects (e.g., object 568 in FIG. 5). In some examples, each receiver (e.g., a UE 106, a BS 108, another device) can execute at least a portion of the process 500 for multi-node passive sensing.

At block 502, a receiver (e.g., UE 564a, UE 564b, UE 564c, etc.) can go to "A" in process 300 described above in connection with FIG. 3. There, the receiver may perform the process 300 of FIG. 3, starting from "A" and proceeding through "B." In an example, a first UE may determine at least one ellipse defining possible locations of one or more object(s) relative to the transmitter and the receiver, in accordance with one or more of the various techniques of this disclosure.

At block 504, the process 500 may return from "B" in process 300 described above in connection with FIG. 3. That is, when the process 300 of FIG. 3 reaches "B," the process may continue with one or a combination of processes 400 and/or 500. When returning from "B" upon executing "A" to "B," for example, the receiver may have determined an ellipse (e.g., ellipse 322 of FIG. 3) that may relate to any one of ellipses 566a, 566b, 566c, etc., corresponding to any one of the receivers 564a, 564b, 564b, etc., of FIG. 5.

At block 506a, in some aspects, an entity executing at least a portion of process 500 can receive ellipse information defining the location (in the environment) and path of the ellipse (e.g., using the location of the two foci c, the height 2b, and the width 2a; using the location of one focus and a directrix, and/or any other information that can convey the shape of an ellipse). In some aspects, any suitable entity can receive the ellipse information. For example, a receiver (e.g., a UE 106, a BS 108, another device) that is executing at least a portion of process 500 can receive ellipse information from M−1 other receivers. In a more particular example, the receiver can receive ellipse information in one or more messages and/or information elements (IEs) transmitted using any suitable communication network (e.g., via a network, such as RAN 104 or RAN 200, using one or more uplink (UL) slot(s), sidelink (SL) slot(s), and/or downlink (DL) slot(s); or via one or more peer-to-peer (P2P) connections, vehicle-to-everything (V2X) connections, etc., utilizing any suitable technique or combination of techniques, such as sidelink (SL) communications, Bluetooth communications, etc.). In another example, an entity (e.g., a UE 106, a BS 108, another device) that is not a receiver that executed block 502 and block 504 can receive ellipse information from M receivers that did execute block 502 and block 504 of process 500.

Additionally or alternatively, in some aspects, at block 506b, a receiver executing at least a portion of process 500 can transmit ellipse information (e.g., a set of ellipse informational parameters) to another entity (e.g., an entity executing block 506a, such as a central node or server, etc.). For example, the receiver (e.g., UE 564a, UE 564b, UE 564c, etc.) can transmit ellipse information using one or more messages and/or information elements (IEs) transmitted using any suitable communication network (e.g., via a network, such as RAN 104 or RAN 200, using one or more uplink (UL) slot(s), sidelink (SL) slots, and/or downlink (DL) slot(s); or via one or more peer-to-peer (P2P) connections, vehicle-to-everything (V2X) connections, etc., utilizing any suitable technique or combination of techniques, such as sidelink (SL) communications, Bluetooth communications, etc.).

Note that in some aspects, a single entity can execute block 506a. Alternatively, multiple entities can execute block 506a (e.g., multiple receivers that executed block 502 and block 504). In an example, a data server may receive ellipse information from one or more receivers 564 and/or from the transmitter 562 to aggregate ellipse information at a central node. In such examples, the data server may receive such information from one or more entities performing certain other functions of processes 300, 400, and/or 500, for example.

At block 508, an entity (e.g., a base station 108, a central server, a road side unit (RSU), a user equipment 106, etc.) that collected a plurality of ellipses corresponding to at least M receivers (e.g., at block 506a, or at block 502 to block 506b) can determine one or more points at which the plurality of ellipses intersect as candidate locations of an object 568 using any suitable technique or combination of techniques, such as techniques described above in connection with block 408. Note that if there are multiple objects, the entity may have collected more ellipses than the number M of receivers. In some aspects, the receiver can use any suitable technique or combination of techniques to select the location(s) of one or more object(s) (e.g., object 568) among the points at which the ellipses 566 intersect. In some aspects, the entity that determined the intersection points at block 508 can send information related to the position of one or more object(s) to the receivers that executed block 502 and block 504, and/or to any other suitable devices.

It will be understood that a device or system can employ process 400 and process 500 in conjunction with one another (e.g., together with process 300) to improve precision with object detection (e.g., relative spatial location of objects). In an example, a central node (e.g., a data server, a base station 108, a road side unit (RSU), etc.) may fuse multiple ellipses together. When doing so, the central node may apply biasing weights to various aspects of the ellipse information to account for speed of an object (e.g., if one receiver is traveling faster compared to another receiver and/or relative to a common transmitter at the time), or distance might matter too, to bias the ellipse information when fusing ellipse information from multiple receiving devices into one ellipse for detecting the precise spatial location of an object.

Examples for Utilizing Communication Networks to Enable Multi-Node Passive Sensing In some aspects, 5G signals (e.g., millimeter waves (mmW), etc.) can be used to perform multi-node passive sensing, which can have several benefits. For example, because operations of various network entities (e.g., scheduled entities 106, scheduling entities 108, etc.) are coordinated via a radio access network (RAN) (e.g., the RAN 104 described with reference to FIG. 1), signal interference, data traffic congestions, and communication channel collisions can be avoided at a network level. As another example, when used in vehicles, some road users (e.g., vehicles, bicycles, pedestrians, etc.) may not be capable of communicating using vehicle-to-everything (V2X) techniques. In such examples, a UE may not necessarily be able to use V2X techniques to become aware of such road users, and thus, may utilize one or more multi-node passive sensing techniques instead to detect such road users. As yet another example, because many obstructions are transparent to certain 5G signals, the coverage provided via multi-node passive sensing using 5G signals can be larger (e.g., in ranges and angles) than coverage of a mono-static radar system.

As still another example, at least in downlink (DL), radio nodes are synchronized, and radio resources can be adjusted according to location needs (e.g., for use in detecting objects in particular areas). As a further example, V2X can be used to provide reference position, Doppler information, and/or speed information of the receivers and/or transmitters, which can facilitate improved precision of the location estimates.

As another further example, locally estimated parameters (e.g., locations, speeds, ellipses, etc. for detected objects) may be efficiently exchanged with other UEs (e.g., via V2X communications, via enhanced mobile broadband (eMBB) communications, etc.).

As yet another further example, a network operator can collect and provide dedicated information related to objects in an environment of 5G infrastructure (e.g., via V2X applications). In a more particular example, the operator can charge UEs for access to such information. As another more particular example, the operator can provides UEs with access to such information at a discount (e.g., including free) in exchange for the UEs providing estimated parameters and/or assistance with coordination. As yet another further example, estimated parameters can be collected by 5G infrastructure that is installed for other purposes (e.g., road side units (RSUs), base stations (BSs), etc.).

Sharing Transmission Configuration Information Between Multiple Entities

In some aspects, in order to perform a frequency domain (FD) channel estimation, the receiver may acquire information (e.g., reference signal information (RS-info), data-decoding information, etc.) that the receiver may then utilize to identify signals it receives from a particular transmitter. For example, a receiver (e.g., a UE 106, a BS 108, etc.) can use information about a reference signal (RS) (e.g., RS-info) transmitted by the transmitter to perform an FD channel estimation.

As another example, a receiver can improve detection and FD channel estimation by decoding transport blocks (TBs). In a more particular example, the receiver can use cyclic redundancy check (CRC)-correct decoded data to refine a channel estimation. In such examples, the modulated symbols corresponding to the decoded (and CRC-correct) data may be used to refine the estimated channel response (e.g., using techniques similar to techniques for estimating the channel response based on the RS). Using multiple estimates based on the decoded data and the RS, the channel can be more accurately estimated, improving resolution of a position estimation based on the channel response.

In some aspects, a receiver (e.g., a UE 106 in downlink (DL), a BS 108 in uplink (UL), a UE 106 in sidelink (SL), etc.) that has established an active communication session with a transmitter (e.g., a BS 108 in DL, a UE 106 in UL, a second UE 106a in SL, etc.) may use information related to the active communication session to perform an FD channel estimation. For example, if a UE 106 uses a transmission from a BS 108 or another transmitter that is intended for that UE, the UE 106 has information needed to perform FD channel estimation and to decode data in the transmission (e.g., if the signal is encoded with data).

If the receiver relied only on connections in which it is an active participant, however, it can limit the amount of transmitters that can be used by the receiver in a multi-node passive sensing process, or require an increase in active communications between the receiver and other transmitters leading to an increase in interference and/or a decrease in capacity to carry out normal communications.

In some aspects, a receiver can use signals transmitted for other receivers in a multi-node passive sensing process. However, the receiver does not normally have the information required to perform FD channel estimation using signals intended for other receivers (e.g., other UEs separate from the receiver, base stations, RSUs, etc.).

Figure 6:
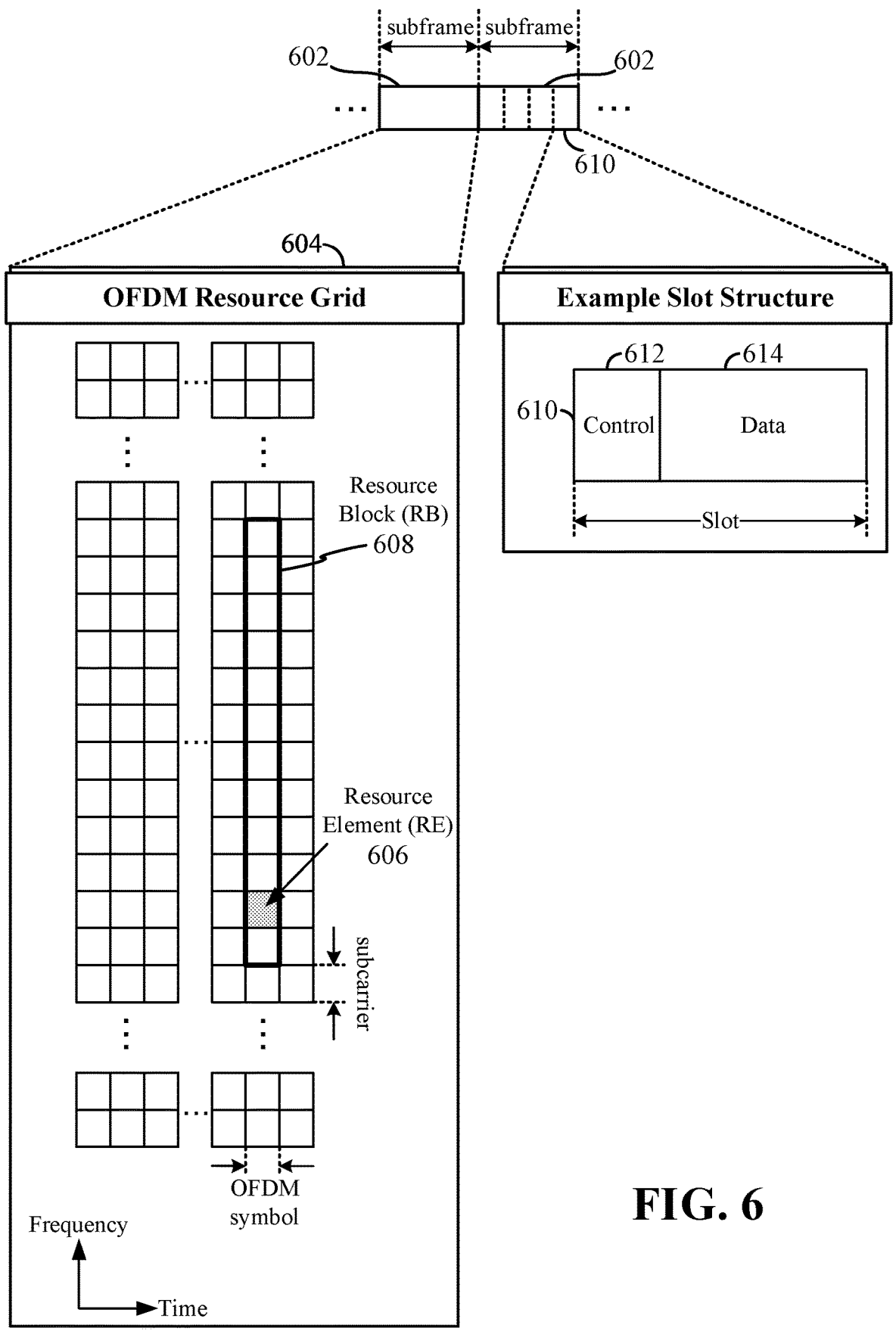
FIG. 6 is a schematic illustration of an organization of wireless resources in an air interface utilizing orthogonal frequency division multiplexing (OFDM), in accordance with one or more of the various techniques of this disclosure.

FIG. 6 is a schematic illustration of an organization of wireless resources in an air interface utilizing orthogonal frequency division multiplexing (OFDM), in accordance with one or more of the various techniques of this disclosure, and is described as an illustrative example without limitation. It should be understood by those of ordinary skill in the art that the various aspects of the present disclosure can be applied to a discrete Fourier transform-spread-orthogonal frequency division multiple access (OFDMA) (DFT-s-OFDMA) waveform in substantially the same way as described herein below. That is, while some examples of the disclosed subject matter may focus on an OFDM link for clarity, it should be understood that the same principles can be applied as well to DFT-s-OFDMA waveforms.

Within the present disclosure, a frame can refer to a duration of 10 milliseconds (ms) for wireless transmissions, with each frame including 10 subframes of one ms each. On a given carrier, there may be one set of frames in the uplink (UL), and another set of frames in the downlink (DL). Referring now to FIG. 6, an expanded view of an exemplary DL subframe 602 is illustrated, showing an OFDM resource grid 604. However, as those skilled in the art will readily appreciate, the physical (PHY) transmission structure for any particular application can vary from the example described here, depending on any number of factors. Here, time is in the horizontal direction with units of OFDM symbols; and frequency is in the vertical direction with units of subcarriers or tones.

Resource grid 604 may be used to schematically represent time-frequency resources for a given antenna port. That is, in a multiple-input multiple-output (MIMO) implementation with multiple antenna ports available, a corresponding multiple number of resource grids 604 can be available for communication. A resource grid 604 can be divided into multiple resource elements (REs) 606. A resource element (RE), which is one subcarrier by one symbol (1 subcarrier×1 symbol), is the smallest discrete part of the time-frequency grid, and contains a single complex value representing data from a physical channel or signal. Depending on the modulation utilized in a particular implementation, each RE can represent one or more bits of information. In some examples, a block of resource elements (REs) can be referred to as a physical resource block (PRB) or more simply a 'resource block' (RB) 608, which contains any suitable number of consecutive subcarriers in the frequency domain (FD). In an illustrative and non-limiting example, a resource block (RB) can include 12 subcarriers, a number independent of the numerology used. In some examples, depending on the numerology, an RB can include any suitable number of consecutive OFDM symbols in the time domain. Within the present disclosure, unless otherwise stated, it is assumed that a single RB such as RB 608 entirely corresponds to a single direction of communication (either transmission or reception for a given device).

A user equipment (UE) generally utilizes only a subset of resource grid 604. A resource block (RB) can be the smallest unit of resources that can be allocated to a UE (e.g., a scheduled entity 106, another scheduled entity 106a, etc.). Thus, as more resource blocks (RBs) are scheduled for a particular UE, the modulation scheme chosen for the air interface increases, and data rates that can be achieved by the UE also increase.

In FIG. 6, RB 608 is shown as occupying less than the entire bandwidth of subframe 602, with some subcarriers illustrated above and below RB 608. In a given implementation, subframe 602 can have a bandwidth corresponding to any number of one or more RBs 608. Further, in FIG. 6, RB 608 is shown as occupying less than the entire duration of subframe 602, although this is merely one possible example.

Each 1 ms subframe 602 may include one or multiple adjacent slots (e.g., a series of consecutive slots). In FIG. 6, one subframe 602 includes four slots 610, as an illustrative example. In some examples, a slot can be defined according to a specified number of OFDM symbols with a given cyclic prefix (CP) length. For example, a slot can include 7 or 14 OFDM symbols with a nominal CP. Additional examples can include mini-slots having a shorter duration (e.g., one or two OFDM symbols). Such mini-slots can in some cases be transmitted occupying resources scheduled for ongoing slot transmissions for the same or for different UEs. A scheduling entity 108 may, in some cases, transmit these mini-slots occupying resources scheduled for ongoing slot transmissions for the same or for different UEs (e.g., scheduled entities 106).

An expanded view of one of the slots 610 illustrates the slot 610 including a control region 612 and a data region 614. In general, the control region 612 may carry control channels (e.g., physical downlink control channel (PDCCH), physical uplink control channel (PUCCH), physical sidelink control channel (PSCCH), etc.), and the data region 614 may carry data channels (e.g., a physical downlink shared channel (PDSCH), a physical uplink shared channel (PUSCH), a physical sidelink shared channel (PSSCH), etc.). Additionally or alternatively, a slot can contain various combinations of downlink (DL), uplink (UL), and sidelink (SL), such as all DL, all UL, all SL, or at least one DL portion, at least one UL portion, and/or at least one SL portion, etc. The simple structure illustrated in FIG. 6 is merely an example, and different slot structures can be utilized, and can include one or more of each of control region(s) and data region(s) in any number of various examples.

In some examples, a scheduling entity 108 (e.g., a base station (BS), a user equipment (UE), etc.) may schedule various resource elements (REs) 606 within a resource block (RB) 608 to carry one or more physical channels, including control channels, data channels (e.g., shared channels), etc. Other REs 606 within an RB 608 may also carry reference signals (RSs) (e.g., pilot signals, etc.). These reference signals (RSs) can facilitate performance of channel estimation of the corresponding channel by a receiving device (e.g., a receiver/UE), which can enable coherent demodulation/detection of the control and/or data channels within a RB 608. For example, reference signals (RSs) can be used to convey information that a receiving device (e.g., a UE 106, a second scheduled entity 106a, a base station 108, a road side unit (RSU), etc.) can use as a reference in relation to transmission or reception of information that is intended for the receiving device.

In some examples, a transmitter (e.g., a base station 108) can transmit a demodulation reference signal (DMRS) for use by a particular UE (or other receiver) in channel characterization (e.g., for use in estimating the channel over which the DMRS was sent). As another example, a transmitter (e.g., a base station 108, etc.) can transmit a phase tracking reference signal (PTRS) for use by a particular receiver (e.g., over a particular channel associated with the transmitter and/or receiver) in tracking the phase of the local oscillator in the transmitter. As yet another example, a transmitter (e.g., a UE 106) can transmit a sounding reference signal (SRS) for use by a receiver (e.g., a base station 108) in channel characterization (e.g., for use in estimating the uplink (UL) channel over which the SRS was sent). As still another example, a transmitter (e.g., base station 108, etc.) can transmit a channel state information reference signal (CSI-RS) for use by a particular receiver (e.g., a UE 106) in channel characterization (e.g., for use in estimating the downlink (DL) channel over which the CSI-RS was sent).

In a downlink (DL) transmission, the transmitting device (e.g., a base station 108) may allocate one or more resource elements (REs) 606 (e.g., within a control region 612) to carry DL control information (DCI) (e.g., DCI 114 described above in connection with FIG. 1), e.g., via one or more DL control channels. In an example, DL control channels may include DCI 114 that generally carries information originating from higher layers, such as a physical broadcast channel (PBCH), a physical downlink control channel (PDCCH), etc., to one or more scheduled entities (e.g., a particular UE 106). In an example, a PDCCH may carry DCI 114 for one or more UEs in a cell. This may include, but is not limited to, power control commands, scheduling information, a grant, and/or an assignment of REs for downlink (DL) and/or uplink (UL) transmissions.

In addition, the scheduling entity 108 may allocate a portion of a slot's resources (e.g., one or more downlink (DL) resource elements (REs)) to carry DL physical signals that generally do not carry information originating from higher layers. These DL physical signals may include a primary synchronization signal (PSS), a secondary synchronization signal (SSS), demodulation reference signals (DMRSs), phase-tracking reference signals (PT-RSs), channel state information (CSI) reference signals (CSI-RSs), etc. In such examples, DL resources may be allocated to carry such DL physical signals (e.g., DMRSs, etc.).

A scheduling entity 108 may transmit the synchronization signals, and in some examples, the PBCH, in a sync signal block that includes four consecutive OFDM symbols, numbered via a time index in increasing order from 0 to 3. In the frequency domain (FD), a sync signal block may extend over 240 contiguous subcarriers, with the subcarriers being numbered via a frequency index in increasing order from 0 to 239. It should be noted that while the present disclosure, at times, may refer to one or more specific sync signal block configurations as illustrative examples, the present disclosure is not so limited. A person of ordinary skill in the art will understand that other example configurations may also apply according to one or more of the various techniques disclosed herein. To illustrate, additional, or alternative, examples may utilize greater or fewer than two synchronization signals, may include one or more supplemental channels in addition to the PBCH, may omit a PBCH, and/or may utilize nonconsecutive symbols for a block of this type, to name but a few examples.

In an uplink (UL) transmission, a transmitting device (e.g., UE 106) can utilize one or more REs 606 to carry UL control information (UCI) (e.g., uplink control information 118 described above in connection with FIG. 1). In an example, the transmitting device may utilize one or more REs to carry one or more UL control channels, such as a physical uplink control channel (PUCCH), a physical random access channel (PRACH), etc., to the scheduling entity (e.g., base station 108). Further, UL REs may carry UL physical signals that generally do not carry information originating from higher layers, such as demodulation reference signals (DM-RS), phase-tracking reference signals (PT-RS), sounding reference signals (SRS), etc. In some examples, the control information (e.g., uplink control information (UCI) 118) can include a scheduling request (SR) (e.g., a request for the scheduling entity 108 to schedule UL transmissions). In such examples, the scheduling entity 108 (e.g., a base station 108) may, in response to receiving the SR transmitted on the control channel (e.g., over which UCI 118 is transmitted), transmit downlink control information (e.g., DCI 114) that may schedule resources for UL packet transmissions.

In some examples, the control information (e.g., UCI, DCI, SCI) can also include hybrid automatic repeat request (HARQ) feedback such as an acknowledgment (ACK) or negative acknowledgment (NACK), channel state information (CSI), and/or any other suitable control information. HARQ is a technique well known to those in the art. In such instances, a receiving device may check the integrity of packet transmissions at its receiving side for accuracy, e.g., utilizing any suitable integrity checking mechanism, such as a checksum or a cyclic redundancy check (CRC). If the receiving device (e.g., a UE 106) confirms the integrity of the transmission, it may transmit an ACK to the transmitting device (e.g., a scheduling entity 108). If the integrity of the transmission is not confirmed, the receiving device may transmit a NACK to the transmitting device. In response to a NACK, the transmitting device may send a HARQ retransmission, which may implement chase combining, incremental redundancy, etc.

In addition to control information, one or more REs 606 (e.g., within the data region 614) can be allocated for user data or traffic data. Such traffic can be carried on one or more traffic channels, such as, for a DL transmission, a physical downlink shared channel (PDSCH); or for a UL transmission, a physical uplink shared channel (PUSCH).

The channels or carriers described with reference to FIG. 1 or 6 are not necessarily all the channels or carriers that can be utilized between a scheduling entity (e.g., base station 108) and scheduled entities (e.g., UEs 106). Those of ordinary skill in the art will recognize that other channels or carriers may be utilized in addition to those illustrated, such as other traffic, control, and feedback channels.

In some examples, a physical (PHY) layer may generally multiplex and map these physical channels described above to transport channels for handling at a medium access control (MAC) layer entity. Transport channels carry blocks of information called transport blocks (TBs). The size of a transport block size (which may correspond to a number of bits of information) can be a controlled parameter, based on the modulation and coding scheme (MCS) and/or the number of resource blocks (RBs) in a given transmission.

In some examples, different portions of the OFDM resource grid can be allocated to different scheduled entities 106 (e.g., a first user equipment (UE), a second UE, a third UE, etc.). In some examples, a transmitting entity (e.g., a scheduling entity 108) may target multiple scheduled entities 106 to receive various downlink (DL) transmissions. In such examples, the transmitting entity may transmit one or more DL signal(s) towards one or more corresponding scheduled entities 106 scheduled to receive the DL signal(s). That is, a scheduling entity 108 may schedule a first DL transmission for a first scheduled entity 106, and may schedule a second DL transmission for a second scheduled entity 106a. In such examples, the first scheduled entity 106 may receive a first line-of-sight (LoS) signal corresponding to the first DL transmission, and the second scheduled entity 106 may receive a second line-of-sight (LoS) signal corresponding to the second DL transmission. In such instances, the LoS signals may correspond to one or more reflection signals that extend outwardly from the scheduling entity 108 to then reflect off one or more objects that, in some instances, may deflect the signal back towards the first scheduled entity 106 and/or the second scheduled entity 106.

In some examples, the transmitting entity (e.g., or another entity) may jointly process those DL transmission signals targeted toward the different scheduled entities 106. In such examples, these DL transmission signals may have the same multipath propagation when they reflect off one or more objects. In this way, the transmitting entity may cover a relatively large portion of the resource grid in frequency. This is because the different signals would have the same multipath propagation for each object. This can improve precision when calculating ellipses corresponding to an object (e.g., as described herein, for example, with reference to FIGS. 3-5).

In uplink (UL) and/or sidelink (SL) transmissions, a receiver may separately process the different parts of the resource grid corresponding to different scheduled entities 106 (e.g., UEs) (and/or other transmitters that are not scheduling entities). This is because the different transmitters of UL and/or SL transmissions are not co-located. This causes the multipath propagation from each transmitter to be different. This can degrade performance due to the sparse occupation of each signal in the frequency-time domain (FD-TD) plane.

Frequency and or Time Domain Segmentation

Figure 7:
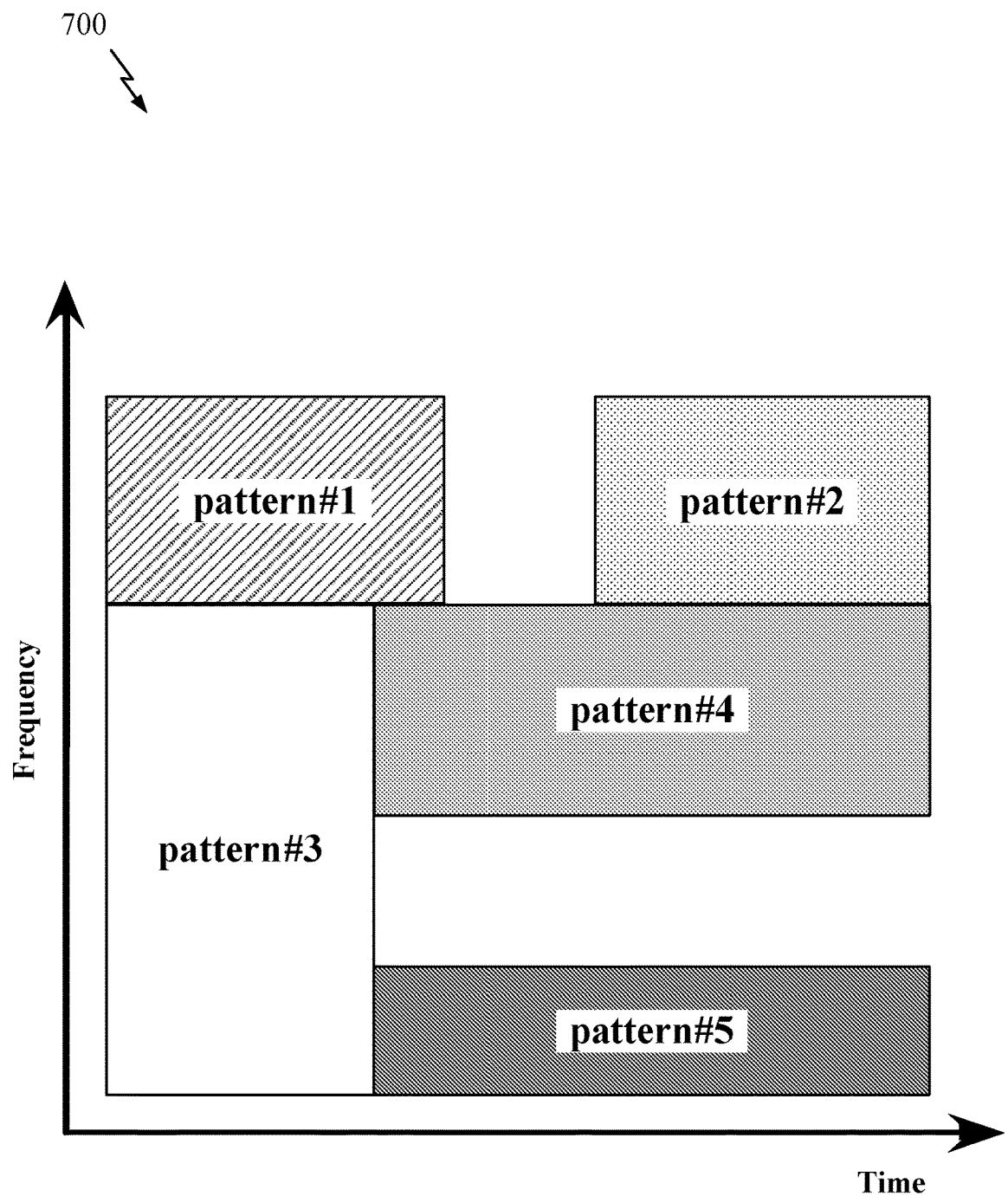
FIG. 7 is a schematic illustration of resource allocation patterns indicated via reference signal information (RS-info) and/or data-decoding information, in accordance with one or more of the various techniques of this disclosure.

FIG. 7 is a schematic illustration 700 of resource allocation patterns segmented in a plot of frequency domain (FD) and time domain (TD), in accordance with one or more of the various techniques of this disclosure, and is described as an illustrative example without limitation. The resource allocation patterns may correspond to information indicated via a set of reference signal information (RS-info) parameters (e.g., as further described with reference to FIG. 8), and/or via a set data-decoding information parameters (e.g., as further described with reference to FIG. 9).

In some examples, reference signal information (RS-info) can, among other things, include an indication of a pattern of resources in the time domain (TD) and/or frequency domain (FD) that a particular transmitter expects (e.g., has been assigned) to use to transmit one or more reference signals (RSs). As described with reference to FIG. 8, and/or with reference to FIGS. 10 and 13 to 16, RS-info (e.g., RS configuration information, a set of resource parameters) can more generally include any suitable information that a device (e.g., a user equipment (UE), a base station (BS), a road side unit (RSU), etc.) can use to detect a reference signal that was transmitted between two other devices for a purpose other than passive radar sensing. In some aspects, a pattern of resources can correspond to a set of resources for a receiver to monitor for one or more RSs. For example, each set of resources can include one or more FD properties and/or one or more TD properties for the receiver to potentially monitor. In some aspects, each pattern can correspond to a set of resources.

In addition (and as described further with reference to FIG. 10), data-decoding information can be indicative of a pattern of resources in the time domain (TD) and/or frequency domain (FD) that a particular transmitter expects (e.g., has been assigned) to use to transmit data that can be used in a multi-node passive sensing process. In some aspects, a pattern of resources can correspond to a set of resources for a receiver to monitor for a set of encoded signals (e.g., one or more encoded data items transmitted via an encoded signal). For example, each set of resources can include one or more FD properties and/or one or more TD properties for the receiver to potentially monitor. In some aspects, each pattern can correspond to a set of resources. In an illustrative example, data-decoding information can include information in any suitable DCI format (e.g., a DCI format 00, a DCI format 0_1, a DCI format 10, or a DCI format 11) that can identify a resource that may be used to transmit encoded data. As a further additional example, data-decoding information can include information indicating an SCI format that may be used to transmit encoded data. As another further example, data-decoding information can include information indicating information in a DCI format that may be used to transmit encoded data using a physical sidelink shared channel (PSSCH). As another further additional example, data-decoding information can include a frequency domain resource assignment (FDRA). As another further additional example, data-decoding information can include a time domain resource assignment (TDRA).

Examples for Reference Signal Patterns

Figure 8:
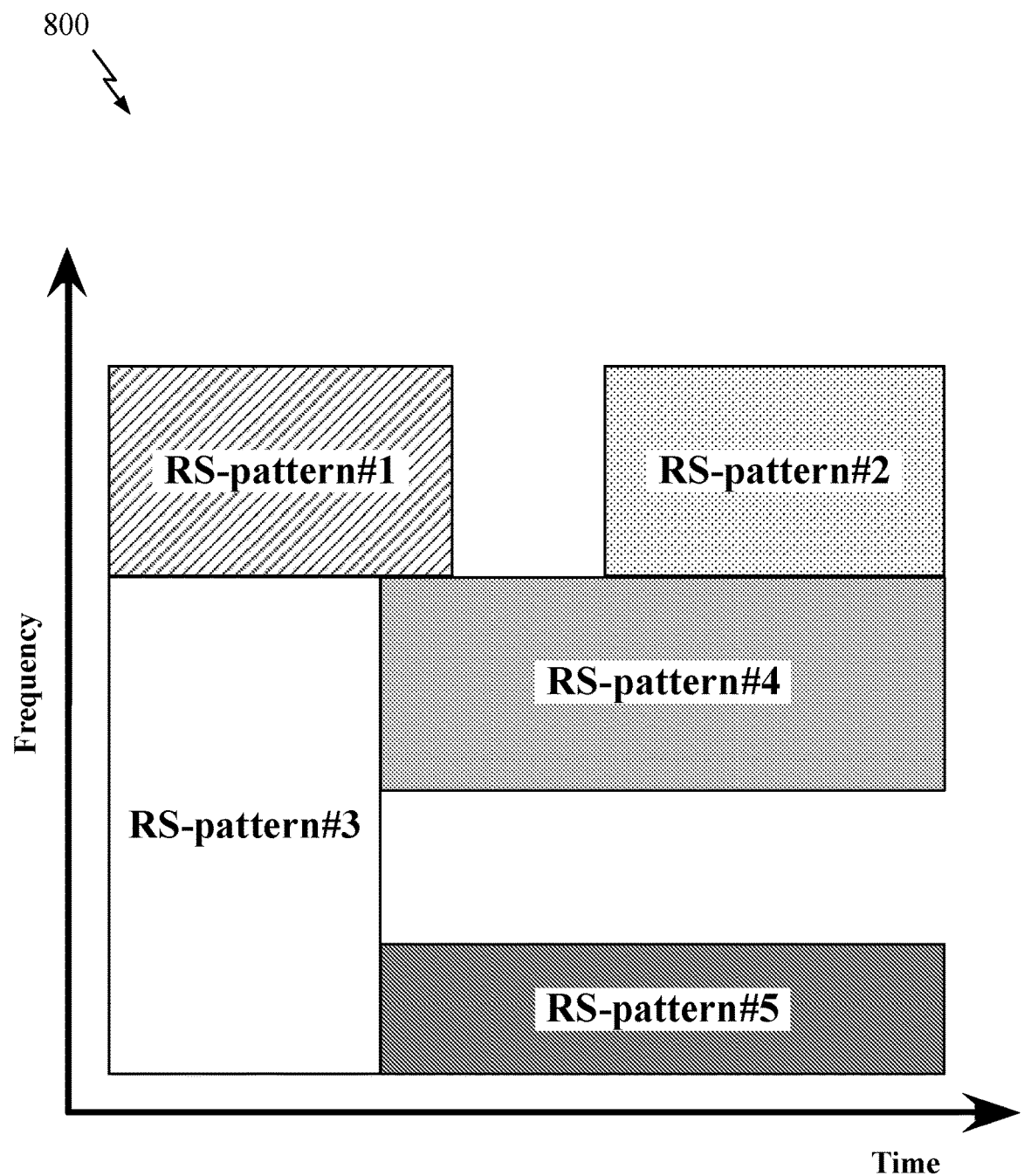
FIG. 8 is a schematic illustration of resource allocation patterns indicated via reference signal information (RS-info) segmented in a plot of frequency domain and time domain, in accordance with one or more of the various techniques of this disclosure.

FIG. 8 is a schematic illustration 800 of resource allocation patterns segmented in a plot of frequency domain (FD) and time domain (TD), in accordance with one or more of the various techniques of this disclosure, and is described as an illustrative example without limitation. The resource allocation patterns may correspond to information indicated via a set of reference signal information (RS-info) parameters.

In some examples, reference signal information (RS-info) can, among other things, include an indication of a pattern of resources in the time domain (TD) and/or frequency domain (FD) that a particular transmitter expects (e.g., has been assigned) to use to transmit one or more reference signals (RSs). As described above with reference to FIG. 7, and below with reference to FIGS. 9 and 12 to 14, RS-info can more generally include any suitable information that a device (e.g., a user equipment (UE), a base station (BS), a road side unit (RSU), etc.) can use to detect a reference signal that was transmitted between two other devices for a purpose other than passive radar sensing. In some aspects, a pattern of resources can correspond to a set of resources for a receiver to monitor for one or more RSs. For example, each set of resources can include one or more FD properties and/or one or more TD properties for the receiver to potentially monitor. In some aspects, each pattern can correspond to a set of resources.

In some examples, reference signal information (RS-info) can include information about a portion of frequency domain (FD) resources that the transmitter expects to use. In an example, RS-info corresponding to a transmitter can include an indication of a group of one or more physical resource blocks (PRBs) within a particular bandwidth part (BWP). In such an example, the BWP may or may not be an active BWP used by the receiver (e.g., by a UE during a downlink (DL) transmission). In a particular example, the BWP designated by the transmitter can be in a non-active BWP for the receiver.

As another example, RS-info corresponding to a transmitter can include an indication of a BWP or multiple bandwidth parts (BWPs) that the transmitter expects to use to transmit an RS. In such an example, the BWP or BWPs may or may not correspond to an active BWP used by the receiver (e.g., by a UE during a downlink (DL)). In a particular example, at least a portion of the BWP designated by the transmitter can be in a non-active BWP for the receiver.

As yet another example, RS-info corresponding to a transmitter can include an indication of a component carrier (CC) or multiple component carriers (CCs) that the transmitter expects to use to transmit a reference signal (RS). In such an example, the CC or CCs may or may not correspond to an active CC used by the receiver (e.g., by a UE during a downlink (DL)). In a particular example, at least one of the CCs designated by the transmitter can be a CC that is not used by the receiver.

As still another example, RS-info corresponding to a transmitter can include an indication of a radio access technology (RAT) or multiple RATs that the transmitter expects to use to transmit an RS. In such an example, at least one RAT corresponding to the transmitter may not correspond to a RAT used by the receiver (e.g., by a UE during a downlink (DL)).

In some aspects, RS-info can include information about a portion of TD resources that the transmitter expects to use. For example, RS-info corresponding to a transmitter can include one or more symbols (e.g., OFDM symbols) that the transmitter expects to use to transmit an RS. As another example, RS-info corresponding to a transmitter can include one or more slots (e.g., OFDM slots) that the transmitter expects to use to transmit an RS. As yet another example, RS-info corresponding to a transmitter can include one or more subframes (e.g., OFDM subframes) that the transmitter expects to use to transmit an RS. As still another example, RS-info corresponding to a transmitter can include one or more frames (e.g., OFDM frames) that the transmitter expects to use to transmit an RS. As another example, RS-info corresponding to a transmitter can include one or more time domain units that the transmitter expects to use to transmit an RS.

In some aspects, the reference signal information (RS-info) can indicate multiple frequency-time domain (FD-TD) blocks (e.g., as shown in FIG. 8), corresponding to different combinations of frequency domain (FD) and time domain (TD) resources. For example, in different FD-TD blocks provided by a transmitter (e.g., a UE, an RSU, etc.), the same or different RS patterns can be identified (e.g., the different blocks can correspond to the same pattern of resources or different patterns of resources). In a particular example, a transmitter can specify a first FD-TD block for a first type of RS (e.g., a demodulation reference signal (DMRS) used to demodulate a physical downlink shared channel (PDSCH)). In some examples, the first FD-TD block (for the first type of RS) and a second FD-TD block for a second type of RS (e.g., a positioning reference signal (PRS), etc.) may differ from one another.

In some examples, a first receiver (e.g., a first user equipment (UE) 106) may utilize any suitable information to identify a frequency-time domain (FD-TD) block corresponding to one or more signals (e.g., reference signals (RSs)) transmitted from a first transmitter (e.g., a base station (BS) 108, a UE 106) to a second receiver (e.g., a second UE 106*a*, a second BS 108, etc.). In an example, the first receiver may receive, from the first transmitter and/or the second receiver, reference signal information (RS-info) corresponding to one or more signals (e.g., at least one demodulation reference signal (DMRS), etc.) communicated between the first transmitter and the second receiver. In an illustrative and non-limiting example, the first receiver (e.g., the first UE 106) may utilize the reference signal information (RS-info) an FD-TD block corresponding to the one or more signals (e.g., the at least one DMRS) communicated between the first transmitter and the second receiver. In such examples, the first receiver may utilize the FD-TD block to monitor for the one or more signals (e.g., the at least one DMRS) corresponding to the RS-info. In this way, the first receiver may utilize the RS-info to monitor for and/or identify the one or more signals (e.g., the at least one DMRS) communicated between the first transmitter and the second receiver. In such examples, the first receiver may utilize the RS-info to identify and/or use the one or more signals (e.g., the at least one DMRS) corresponding to the first transmitter, in accordance with one or more of the various techniques of this disclosure.

In some examples, reference signal information (RS-info) shared by a transmitter can include a UE-specific ID needed to identify a demodulation reference signal (DMRS)-sequence (e.g., a DMRS scrambling ID). As another example, RS-info shared by a transmitter can include an OFDM symbol index or indices of the DMRS symbol(s). As yet another example, RS-info shared by a transmitter can include a comb type corresponding to one or more RSs (e.g., comb-2, comb-4). As still another example, RS-info shared by a transmitter can include a DMRS port ID or multiple DMRS port IDs. As a further example, RS-info shared by a transmitter can include a code division multiplexing (CDM)-group ID corresponding to the transmitter. As another further example, RS-info shared by a transmitter can include an energy per resource element (EPRE)-ratio with data symbols. As yet another further example, RS-info shared by a transmitter can include quasi co-location (QCL) information. In some aspects, such information can correspond to one or more resource parameters corresponding to resources for the UE to monitor for one or more reference signals (RSs).

Examples for Data-Decoding Patterns

Figure 9:
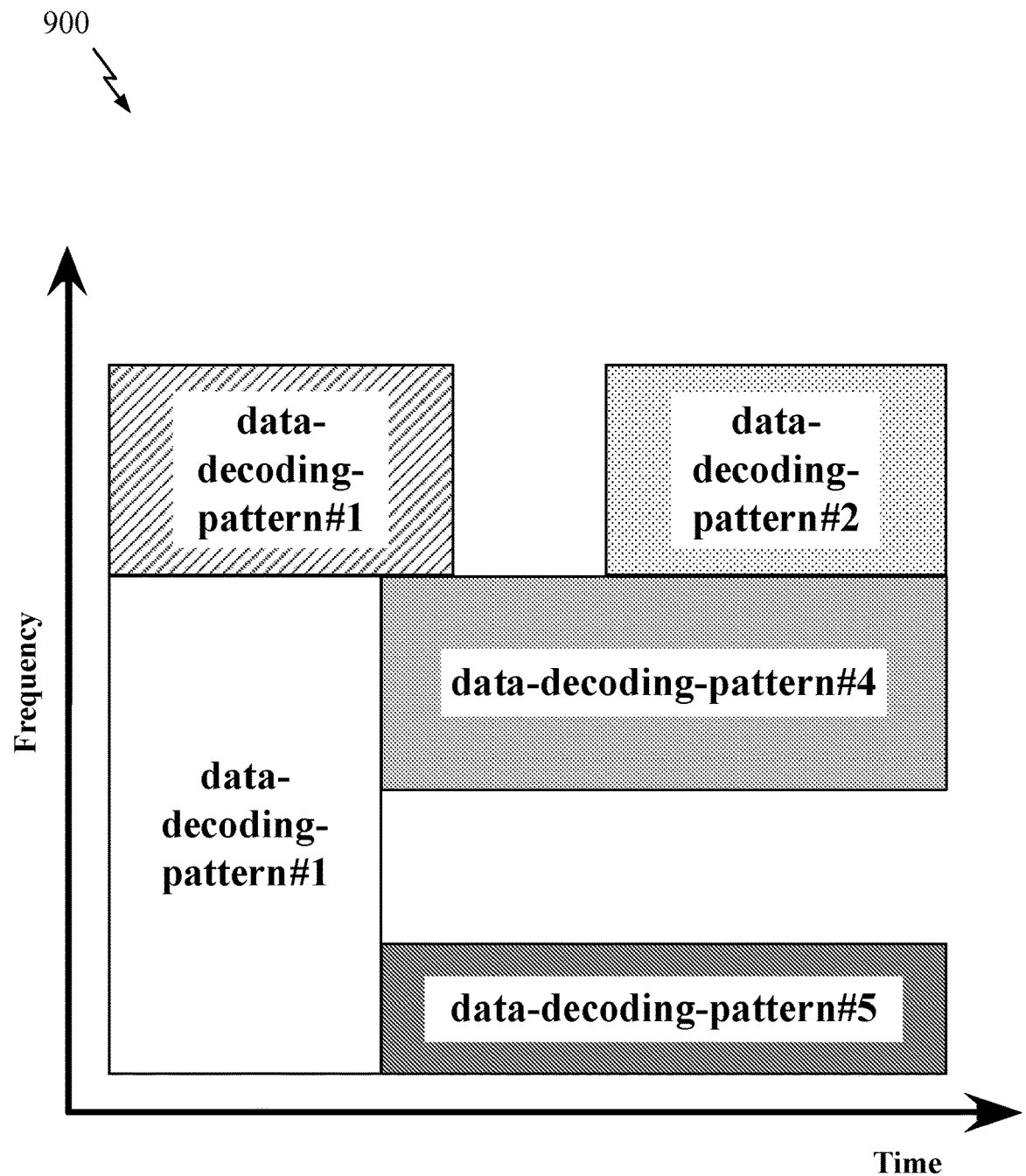
FIG. 9 is a schematic illustration of resource allocation patterns indicated via data-decoding information segmented in a plot of frequency domain and time domain, in accordance with one or more of the various techniques of this disclosure.

FIG. 9 is a schematic illustration 900 of resource allocation patterns for encoded data segmented in a plot of frequency domain (FD) and time domain (TD), in accordance with one or more of the various techniques of this disclosure, and is described as an illustrative example without limitation. In some aspects, data-decoding information can be indicative of a pattern of resources in the time domain (TD) and/or frequency domain (FD) that a particular transmitter expects (e.g., has been assigned) to use to transmit encoded data that can be used in a multi-node passive sensing process. In some aspects, a pattern of resources can correspond to a set of resources for a receiver to monitor for one or more encoded signals. For example, each set of resources can include one or more FD properties and/or one or more TD properties for the receiver to potentially monitor. In some aspects, each pattern can correspond to a set of resources.

In some examples, data-decoding information can include information about a portion of FD resources that the transmitter expects to use. For example, data-decoding information corresponding to a transmitter can include an indication of a group of one or more physical resource blocks (PRBs) within a particular bandwidth part (BWP). In such an example, the BWP may or may not be an active BWP used by the receiver (e.g., by a UE during a downlink (DL)). In a particular example, the BWP that the transmitter designates in the data-decoding information can be in a non-active BWP for the receiver.

As another example, data-decoding information corresponding to a transmitter can include an indication of a BWP or multiple bandwidth parts (BWPs) that the transmitter expects to use to transmit encoded data. In such an example, the BWP or BWPs may or may not correspond to an active BWP used by the receiver (e.g., by a UE during a downlink (DL)). In a particular example, at least a portion of the BWP designated by the transmitter can be in a non-active BWP for the receiver.

As another example, data-decoding information corresponding to a transmitter can include an indication of a component carrier (CC) or multiple component carriers (CCs) that the transmitter expects to use to transmit encoded data. In such an example, the CC or CCs may or may not correspond to an active CC used by the receiver (e.g., by a UE during a downlink (DL)). In a particular example, at least one of the CCs designated by the transmitter can be a CC that is not used by the receiver.

As still another example, data-decoding information corresponding to a transmitter can include an indication of a radio access technology (RAT) or multiple RATs that the transmitter expects to use to transmit an RS. In such an example, at least one RAT corresponding to the transmitter may not correspond to a RAT used by the receiver (e.g., by a UE during a downlink (DL)).

In some aspects, data-decoding information can include information about a portion of time domain (TD) resources that the transmitter expects to use. For example, data-decoding information corresponding to a transmitter can include information that identifies one or more symbols (e.g., OFDM symbols) that the transmitter expects to use to transmit encoded data (e.g., encoded data that can be used in a multi-node sensing process). As another example, data-decoding information corresponding to a transmitter can include information that identifies one or more slots (e.g., OFDM slots) that the transmitter expects to use to transmit encoded data. As yet another example, data-decoding information corresponding to a transmitter can include information that identifies one or more subframes (e.g., OFDM subframes) that the transmitter expects to use to transmit encoded data. As still another example, data-decoding information corresponding to a transmitter can include information that identifies one or more frames (e.g., OFDM frames) that the transmitter expects to use to transmit encoded data. As another example, data-decoding information corresponding to a transmitter can include information that identifies one or more time domain units that the transmitter expects to use to transmit encoded data.

In some aspects, the data-decoding information can indicate multiple frequency-time domain (FD-TD) blocks (e.g., as shown in FIG. 9), corresponding to different combinations of frequency domain (FD) and time domain (TD) resources. For example, in data-decoding information that a transmitter (e.g., a UE, a road side unit (RSU), etc.) provides, within different FD-TD blocks, the same or different patterns of resources can be identified (e.g., the different blocks can correspond to the same pattern of resources or different patterns of resources). In a particular example, a transmitter can specify a first FD-TD block for data sent from and/or for a particular UE, which can be different from an FD-TD block for data sent from and/or for a different UE.

In some aspects, an FD-TD block can be identified using any suitable information, such as information that can be used to decode encoded data transmitted by a transmitter. For example, data-decoding information shared by a transmitter can include a radio network temporary identifier (RNTI) corresponding to the transmitter. As another example, data-decoding information shared by a transmitter can include a scrambling ID corresponding to the transmitter. As yet another example, data-decoding information shared by a transmitter can include rate-matching information corresponding to the transmitter. As a further example, data-decoding information shared by a transmitter can include a UE-specific ID needed to identify a demodulation reference signal (DMRS)-sequence (e.g., a DMRS scrambling ID). As another further example, data-decoding information shared by a transmitter can include an OFDM symbol index or indices of the DMRS symbol(s). As yet another further example, data-decoding information shared by a transmitter can include a comb type corresponding to one or more encoded signals (e.g., comb-2, comb-4). As still another example further example, data-decoding information shared by a transmitter can include a DMRS port identifier (ID) or multiple DMRS port identifiers (IDs). As an additional example, data-decoding information shared by a transmitter can include a code division multiplexing (CDM)-group ID corresponding to the transmitter. As another additional example, data-decoding information shared by a transmitter can include an energy per resource element (EPRE)-ratio with data symbols. As yet another additional example, data-decoding information shared by a transmitter can include quasi co-location (QCL) information. In some aspects, such information can correspond to one or more resource parameters corresponding to resources for the UE to monitor for one or more encoded signals.

As still another additional example, data-decoding information can include information in any suitable DCI format (e.g., a DCI format 0_0, a DCI format 01, a DCI format 10, or a DCI format 11) that can identify a resource that may be used to transmit encoded data. As a further additional example, data-decoding information can include information indicating an SCI format that may be used to transmit encoded data. As another further example, data-decoding information can include information indicating information in a DCI format that may be used to transmit encoded data using a PSSCH. As another further additional example, data-decoding information can include a frequency domain resource assignment (FDRA). As another further additional example, data-decoding information can include a time domain resource assignment (TDRA).

Examples for Overlapping Resource Patterns

Figure 10:
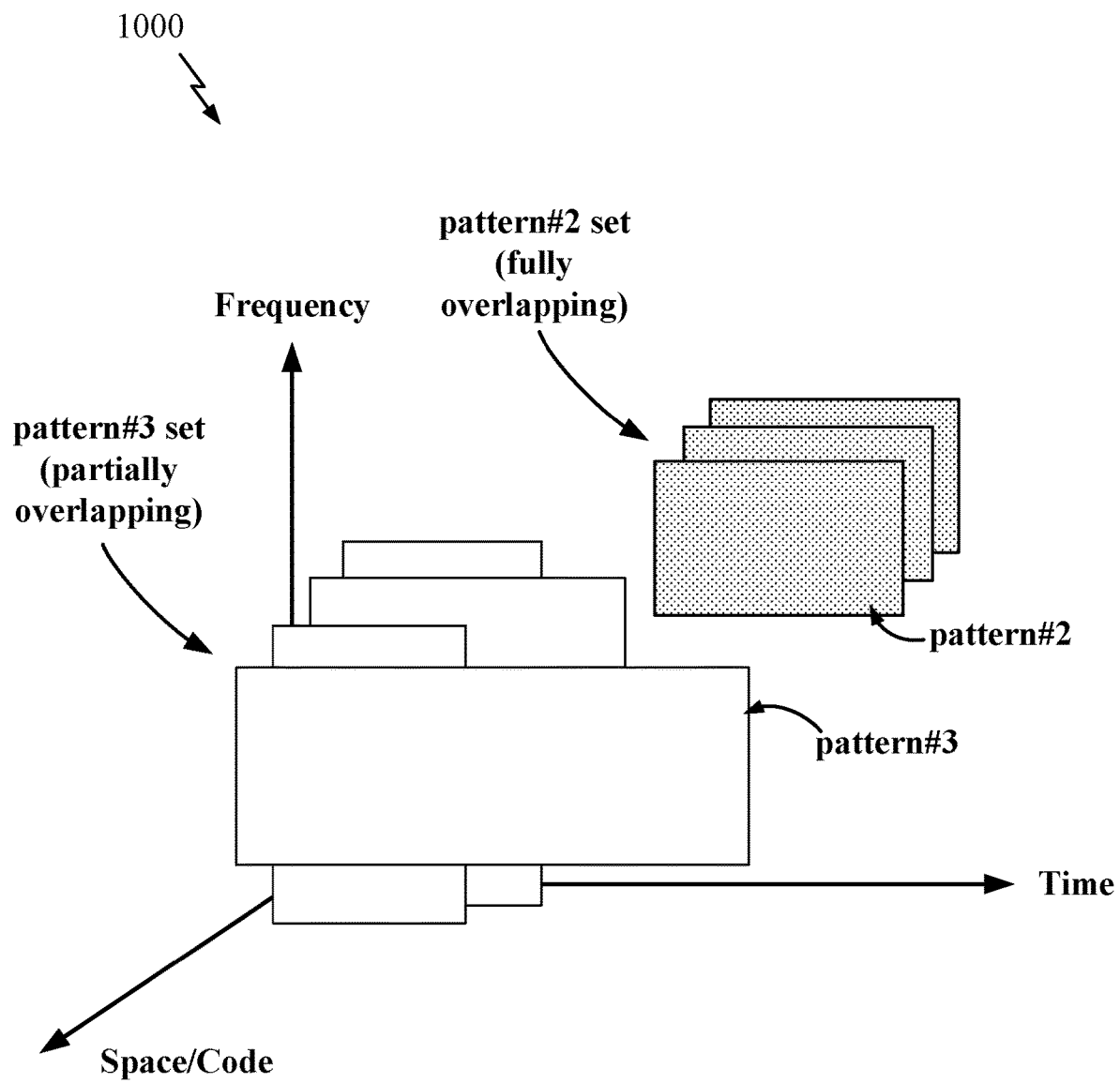
FIG. 10 is a schematic illustration of resource allocation patterns segmented in a plot of frequency domain, time domain, and a space/coding domain, in accordance with one or more of the various techniques of this disclosure.

FIG. 10 is a schematic illustration 1000 of resource allocation patterns (e.g., reference signal information (RS-info) patterns, data-decoding patterns, etc.) segmented in a plot of frequency domain, time domain, and a space/coding domain, in accordance with one or more of the various techniques of this disclosure, and is described as an illustrative example without limitation.

In some examples, multiple reference signal (RS) resources and/or multiple data-decoding resources can overlap in the frequency-time domain (FD-TD) plane, and can be multiplexed via spatial and/or code multiplexing. In an illustrative example, as shown in FIG. 10, multiple RS resources and/or multiple data-decoding resources can be fully overlapping in the FD-TD plane and/or partially overlapping in the FD-TD plane. In an illustrative example, pattern #3 may correspond to a reference signal (RS)-pattern (or a data-decoding pattern) that partially overlaps in the FD-TD plane, as shown toward the left-hand side of FIG. 10. In another example, pattern #2 may correspond to an RS-pattern (or a data-decoding pattern) that fully overlaps in the FD-TD plane, as shown toward the right-hand side of FIG. 10.

In some examples, overlapping FD-TD resources can be differentiated from each other based on information related to the demodulation reference signal (DMRS). In an example, overlapping FD-TD resources can be differentiated from each other based on information related to the RS-info used to demodulate signals corresponding to resources corresponding to the pattern. For example, different overlapping FD-TD patterns can be differentiated through the use of different DMRS port identifiers (IDs). As another example, different overlapping FD-TD patterns can be differentiated through the use of different DMRS scrambling IDs. In some aspects, RS-info and/or data-decoding information can include information relating to one or more port IDs and/or one or more scrambling IDs for the UE to monitor for RSs and/or encoded data (e.g., for use in passive sensing).

Scheduling Entity

Figure 11:
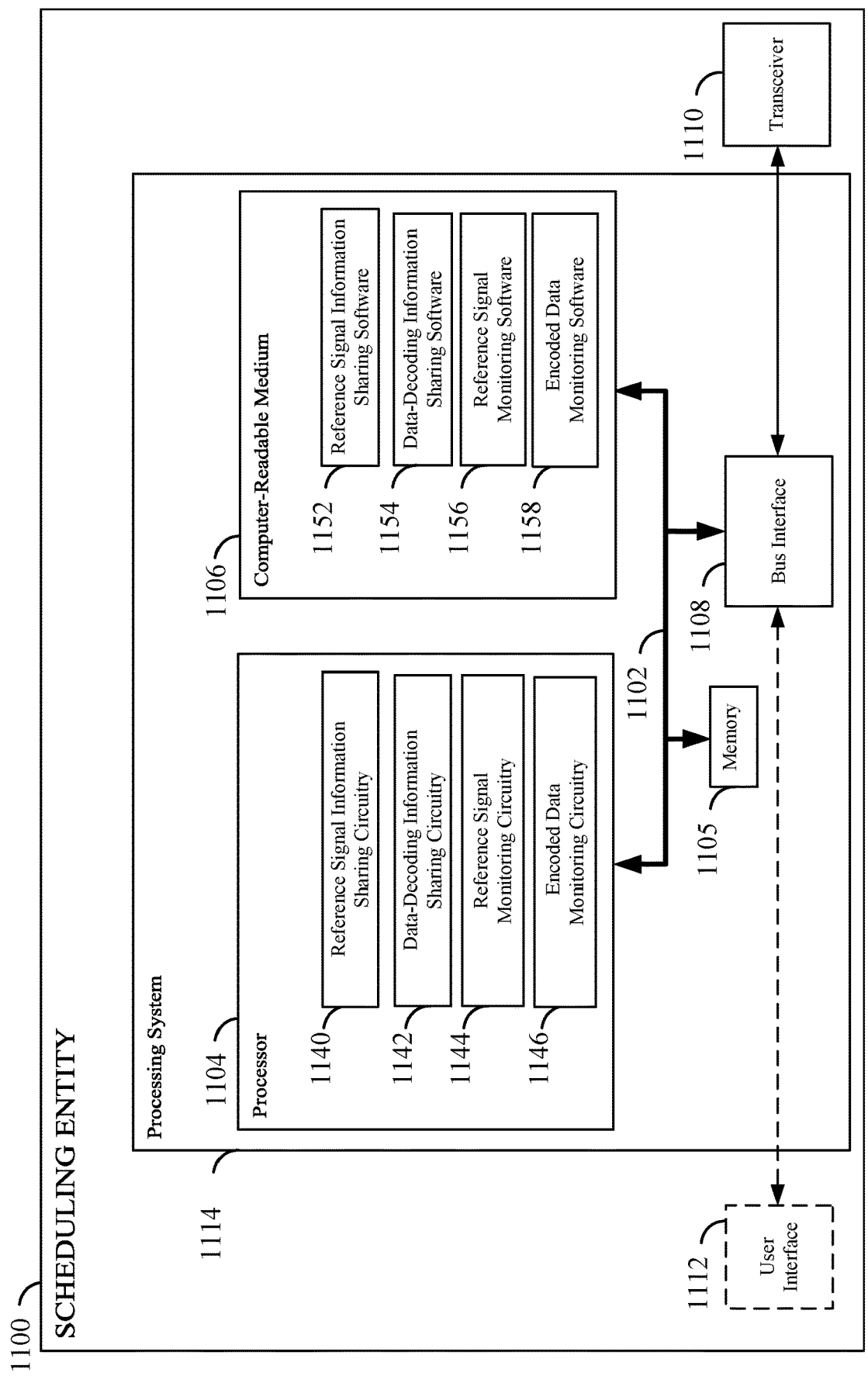
FIG. 11 is a block diagram conceptually illustrating an example of a hardware implementation for an example scheduling entity according to various aspects of the disclosure.

FIG. 11 is a block diagram conceptually illustrating an example of a hardware implementation for an example scheduling entity 1100 according to various aspects of the disclosure, and is described as an illustrative example without limitation. In some examples, the scheduling entity 1100 may represent an example of a user equipment (UE), such as a UE described for example with reference to any one or more of FIGS. 1 and/or 2. In another example, the scheduling entity 1100 may represent an example of a base station (BS), such as any one of those described for example with reference to FIGS. 1 and/or 2.

In some aspects, the scheduling entity 1100 can be implemented with a processing system 1114 that includes one or more processors 1104. Examples of processors 1104 include central processing units (CPUs), microprocessors, microcontrollers, digital signal processors (DSPs), field programmable gate arrays (FPGAs), programmable logic devices (PLDs), graphics processing units (GPUs), state machines, gated logic, discrete hardware circuits, and other suitable hardware configured to perform the various functionality described throughout this disclosure. In various examples, scheduling entity 1100 can be configured to perform any one or more of the functions described herein. In some examples, a processing system 1114 may utilize one or more processor(s) 1104 to implement any one or more of the processes and procedures described with reference to any one or more of FIGS. 3 to 5 and/or FIGS. 13 to 19.

In this example, processing system 1114 can be implemented with a bus architecture, represented generally by the bus 1102. Bus 1102 can include any number of interconnecting buses and bridges depending on the specific application of processing system 1114 and the overall design constraints. Bus 1102 can communicatively couple together various circuits including one or more processors (represented generally by processor 1104), memory 1105, and computer-readable media (represented generally by computer-readable medium 1106). Bus 1102 can also link various other circuits such as timing sources, peripherals, voltage regulators, and power management circuits, which are well known in the art, and therefore, will not be described any further. A bus interface 1108 can provide an interface between bus 1102 and a transceiver 1100. In some examples, the transceiver 1110 can provide a communication interface or means for communicating with various other apparatus over a transmission medium. Depending upon the nature of the apparatus, a user interface 1112 (e.g., keypad, display, speaker, microphone, joystick) can also be provided. Of course, such a user interface 1112 can be omitted in some examples, such as a base station.

In accordance with one or more of the various techniques of this disclosure, processor 1104 can include reference signal information (RS-info) sharing circuitry 1140 configured for various functions, including, for example, collecting and/or sharing RS-info received from one or more transmitters. In some examples, RS-info sharing circuitry 1140 may be configured to implement one or more of the functions described below in connection with FIGS. 14 and 15, such as functions described in connection with 1402, 1404, and/or 1406, and/or in connection with 1502 and/or 1504.

In accordance with one or more of the various techniques of this disclosure, processor 1104 can include data-decoding information sharing circuitry 1142 configured for various functions, including, for example, collecting and/or sharing data-decoding information received from one or more transmitters. Data-decoding information can include any suitable information that a device (e.g., a scheduling device 1100, or a scheduled device as described below in connection with FIG. 12) may utilize to decode at least a portion of an encoded signal that was transmitted by another device for a purpose other than passive radar sensing. For example, such an encoded signal can include information (e.g., an encrypted packet) that is intended for a remote endpoint (e.g., a server, a remote UE, etc.). As another example, such an encoded signal can include information that is intended for receipt by a local scheduling entity or scheduled entity for the purposes of scheduling communications over a RAN (e.g., as described above in connection with FIG. 6). Examples of information that can be included in data-decoding information, and examples of techniques that can be used to provide data-decoding information are described herein, for example, with reference to FIGS. 17 to 19. In some examples, the data-decoding information sharing circuitry 1042 may be configured to implement one or more of the functions described below in connection with FIGS. 17 and 18, such as functions described in connection with block 1702, block 1704, and/or block 1706, and/or in connection with block 1802 and/or block 1804.

Additionally, in some aspects, processor 1104 can include reference signal (RS) monitoring circuitry 1144 configured for various functions, including, for example, monitoring resources (e.g., a portion of a frequency-time domain (FD-TD) resource grid, the portion indicated via a set of RS-info parameters) for reference signals (RSs) transmitted by one or more transmitters (e.g., one or more UE(s) and/or BS(s)) for use in multi-node passive sensing. For example, the RS monitoring circuitry 1144 can be configured to implement one or more of the functions described below in connection with FIG. 16, such as functions described in connection with block 1604 and/or block 1606. In an example, the RS monitoring circuitry 1144 may utilize the RS-info (e.g., a set of RS-info parameters) to determine a set of resources to use when monitoring for a set of reference signals (RSs). In such examples, the RS monitoring circuitry 1144 may monitor for the set of RSs relative to the FD-TD resource grid based on the RS-info received from at least one transmitter of the one or more transmitters, or in some instances, from another entity other than the one or more transmitters.

Additionally, in some aspects, processor 1104 can include encoded data monitoring circuitry 1146 configured for various functions, including, for example, monitoring resources (e.g., a portion of a frequency-time domain (FD-TD) resource grid) for encoded signals transmitted by one or more transmitters for use in multi-node passive sensing. In some examples, the encoded data monitoring circuitry 1146 may be configured to implement one or more of the functions described below in connection with FIG. 19, such as functions described in connection with block 1904 and/or block 1906.

In some examples, the processor 1104 can manage bus 1102 and can perform general processing, including the execution of software stored on computer-readable medium 1106, which, when executed by processor 1104, causes processing system 1114 to perform the various functions described herein (e.g., those described with reference to FIGS. 13 to 19) for any particular apparatus. In some aspects, computer-readable medium 1106 and memory 1105 can also be used for storing data that is manipulated by processor 1104 when executing software.

One or more processors 1104 in the processing system can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software can reside on a computer-readable medium 1106. The computer-readable medium 1106 can be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that can be accessed and read by a computer. The computer-readable medium 1106 can reside in the processing system 1114, external to the processing system 1114, or distributed across multiple entities including the processing system 1114. The computer-readable medium 1106 can be embodied in a computer program product. By way of example, a computer program product can include a computer-readable medium in packaging materials. Those skilled in the art will recognize how best to implement the described functionality presented throughout this disclosure depending on the particular application and the overall design constraints imposed on the overall system.

In one or more examples, computer-readable storage medium 1106 can include reference signal information (RS-info) sharing software 1152 configured for various functions, including, for example, collecting and/or sharing RS-info (e.g., a set of resource parameters, etc.) received from one or more transmitters. For example, RS-info sharing software 1152 can be configured to implement one or more of the functions described below in connection with FIGS. 14 and 15, such as functions described in connection with 1402, 1404, and/or 1406, and/or in connection with 1502 and/or 1504.

In one or more examples, computer-readable storage medium 1106 can include data-decoding information sharing software 1154 configured for various functions, including, for example, collecting and/or sharing data-decoding information received from one or more transmitters. In some examples, the data-decoding information sharing software 1154 may be configured to implement one or more of the functions described below in connection with FIGS. 17 and 18, such as functions described in connection with block 1702, block 1704, block 1706, and/or block 1708, and/or in connection with block 1802, block 1804, and/or block 1806.

Additionally, in some aspects, computer-readable storage medium 1106 can include reference signal (RS) monitoring software 1156 configured for various functions, including, for example, monitoring resources (e.g., a portion of a frequency-time domain (FD-TD) resource grid) for one or more reference signals (RSs) transmitted by one or more transmitters for use in multi-node passive sensing. In some examples, RS monitoring software 1156 may be configured to implement one or more of the functions described below in connection with FIG. 16, such as functions described in connection with block 1604 and/or block 1606.

Additionally, in some aspects, computer-readable storage medium 1106 can include encoded data monitoring software 1158 configured for various functions, including, for example, monitoring resources (e.g., a portion of a frequency-time domain (FD-TD) resource grid) for encoded signals transmitted by one or more transmitters for use in multi-node passive sensing. In some examples, the encoded data monitoring software 1158 may be configured to implement one or more of the functions described below in connection with FIG. 19, such as functions described in connection with block 1904 and/or block 1906.

Scheduled Entity

Figure 12:
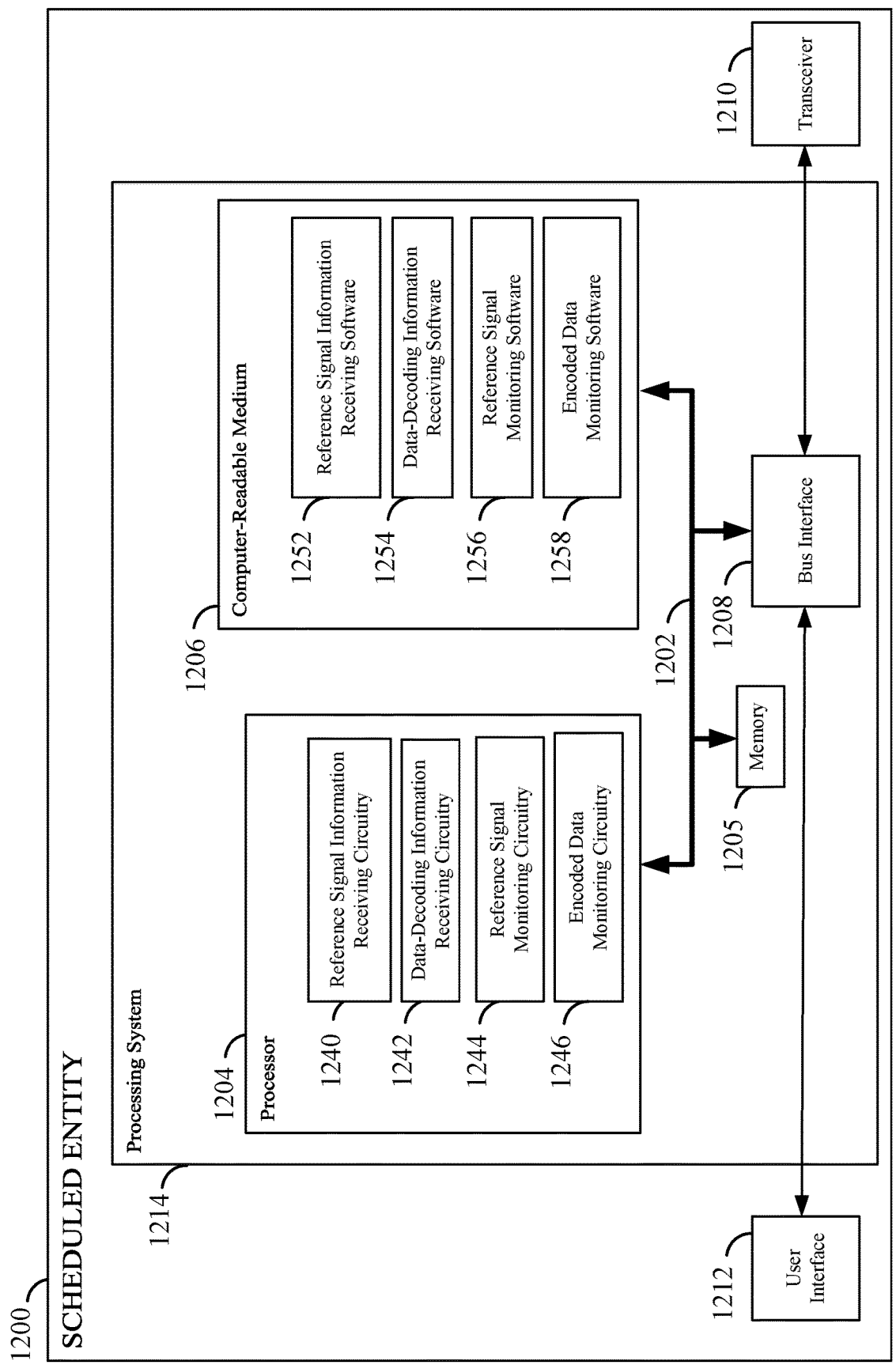
FIG. 12 is a block diagram conceptually illustrating an example of a hardware implementation for an example scheduled entity according to various aspects of the disclosure.

FIG. 12 is a block diagram conceptually illustrating an example of a hardware implementation for an example scheduled entity 1200 according to various aspects of the disclosure, and is described as an illustrative example without limitation. In some examples, the scheduled entity 1200 of FIG. 11 may represent an example of a user equipment (UE), such as a UE described for example with reference to any one or more of FIGS. 1 and/or 2. In accordance with some aspects of the disclosure, an element, or any portion of an element, or any combination of elements can be implemented with a processing system 1214 that includes one or more processors 1204.

In some aspects, the processing system 1214 can be substantially the same as the processing system 1114 illustrated in FIG. 11, including a bus interface 1208, a bus 1202, memory 1205, a processor 1204, and a computer-readable medium 1206. Furthermore, the scheduled entity 1200 may include a user interface 1212, which may be substantially similar to the user interface described, for example, above with reference to FIG. 11. In addition, the scheduled entity 1200 may include a transceiver 1210, which may be substantially similar to the transceiver described, for example, above with reference to FIG. 11.

In some examples, a processing system 1214 may utilize one or more processor(s) 1204 to implement any one or more of the processes described herein, for example, with reference to any one or more of FIGS. 13 to 19.

In some examples, a processor 1204 can include reference signal information (RS-info) receiving circuitry 1240 configured for various functions. Such functions may include, for example, receiving RS-info (e.g., RS configuration information) corresponding to a set of one or more transmitters (e.g., as shared by a transmitter, which may or may not be in, or belong to, the set of the one or more transmitters). In some examples, RS-info receiving circuitry 1240 may be configured to implement one or more of the functions described below in connection with FIGS. 14 and/or 16, such as functions described below in connection with block 1402 and/or block 1604.

Additionally, in some aspects, processor 1204 can include reference signal (RS) monitoring circuitry 1244 configured for various functions, including, for example, monitoring resources (e.g., a portion of a frequency-time domain (FD-TD) resource grid) for one or more reference signals (RSs) transmitted by one or more transmitters for use in multi-node passive sensing. In some examples, the RS monitoring circuitry 1244 may be configured to implement one or more of the functions described below in connection with FIG. 16, such as functions described in connection with block 1604 and/or block 1606.

In addition, a processor 1204 can include data-decoding information receiving circuitry 1242 configured for various functions, including, for example, receiving data-decoding information corresponding to a set of one or more transmitters (e.g., as shared by a transmitter that may or may not be in, or belong to the set of one or more transmitters). In some examples, the data-decoding information receiving circuitry 1242 may be configured to implement one or more of the functions described below, for example, in connection with FIGS. 17 and/or 19, such as functions described below in connection with block 1702 and/or block 1904.

Additionally, in some aspects, a processor 1204 can include encoded data monitoring circuitry 1246 configured for various functions, including, for example, monitoring resources (e.g., a portion of a frequency-time domain (FD-TD) resource grid) for encoded signals transmitted by a set of one or more transmitters for use in multi-node passive sensing. In some examples, the encoded data monitoring circuitry 1146 may be configured to implement one or more of the functions described below in connection with FIG. 19, such as functions described in connection with block 1904 and/or block 1906.

In one or more examples, computer-readable storage medium 1206 can include RS information (RS-info) receiving software 1252 configured for various functions, including, for example, receiving RS-info (e.g., a set of RS-info parameters, RS configuration information, a set of resource parameters, etc.) corresponding to a set of one or more transmitters (e.g., as shared by a transmitter that may or may not be in, or belong to the set of one or more transmitters). In some examples, the RS-info receiving software 1252 may be configured to implement one or more of the functions described below in connection with FIGS. 14 and/or 16, such as functions described below in connection with block 1402 and/or block 1604.

In one or more examples, computer-readable storage medium 1206 can include data-decoding information receiving software 1254 configured for various functions, including, for example, receiving data-decoding information corresponding to a set of one or more transmitters (e.g., as shared by a transmitter that may or may not be in, or belong to the set of one or more transmitters. In some examples, the data-decoding information receiving software 1254 may be configured to implement one or more of the functions described below in connection with FIGS. 17 and/or 19, such as functions described below in connection with block 1702 and/or block 1904.

Additionally, in some aspects, the computer-readable storage medium 1206 can include reference signal (RS) monitoring software 1256 configured for various functions, including, for example, monitoring resources (e.g., a portion of a frequency-time domain (FD-TD) resource grid) for one or more reference signals (RSs) transmitted by a set of one or more transmitters for use in multi-node passive sensing. In some examples, RS monitoring software 1256 may be configured to implement one or more of the functions described below in connection with FIG. 16, such as functions described in connection with block 1604 and/or block 1606.

Additionally, in some aspects, the computer-readable storage medium 1206 can include encoded data monitoring software 1258 configured for various functions, including, for example, monitoring resources (e.g., a portion of a frequency-time domain (FD-TD) resource grid) for encoded signals transmitted by a set of one or more transmitters for use in multi-node passive sensing. In some examples, encoded data monitoring software 1258 may be configured to implement one or more of the functions described below in connection with FIG. 19, such as functions described in connection with block 1904 and/or block 1906.

Figure 13:
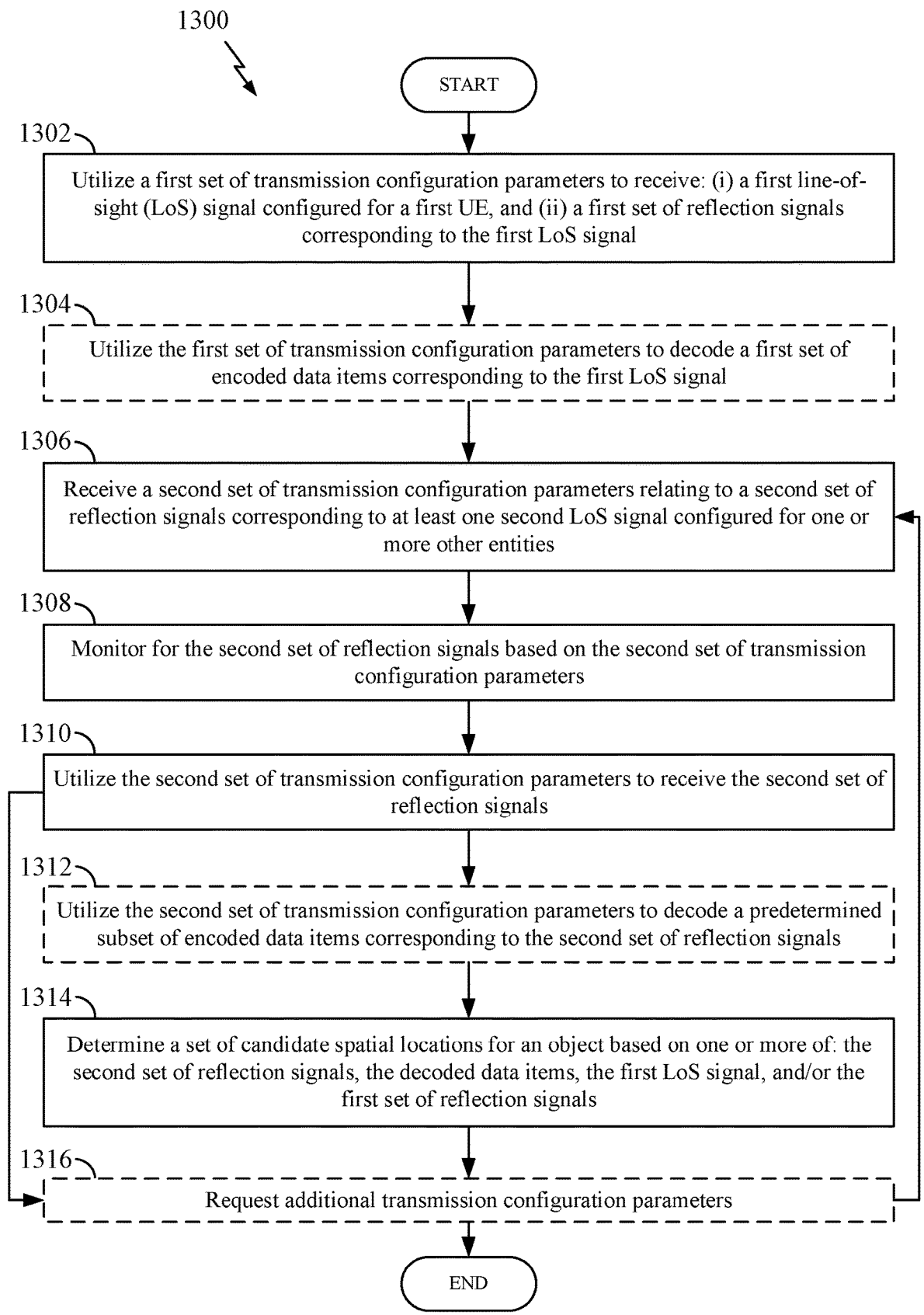
FIG. 13 is a flow chart illustrating an example process for sharing transmission configuration information between entities, in accordance with one or more of the various techniques of this disclosure.

Examples for Utilization of Reference Signal Information (RS-info) and Data-decoding Information FIG. 13 is a flow chart illustrating an example process 1300 for sharing transmission configuration information between entities in accordance with some aspects of the present disclosure. As described below, some or all illustrated features may be omitted in a particular implementation within the scope of the present disclosure, and some illustrated features may not be required for implementation of all embodiments. In some examples, the process 1300 may be carried out by the scheduled entity 1200 illustrated in FIG. 12 (e.g., a scheduled entity 106, including a UE 106*a*, a road side unit (RSU), etc.). In some examples, the process 1300 may be carried out by the scheduling entity 1100 illustrated in FIG. 11 (e.g., a scheduling entity 108, a UE, an RSU, etc.). In some examples, the process 1300 may be carried out by any suitable apparatus or means for carrying out the functions or algorithm described below.

Sharing transmission configuration information may include sharing any one or more of reference signal information (RS-info) parameters, data-decoding information parameters, or any other transmission configuration parameters. A receiving entity (e.g., a user equipment (UE), a base station (BS), a road side unit (RSU), etc.) may utilize such transmission configuration parameters to receive a reference signal reflected from an object that the receiving entity may have otherwise been unable to discern from static noise. The receiving entity may utilize such transmission configuration parameters to discern the reflection signal, where that reflection signal corresponds to a line-of-sight (LoS) signal transmitted between a transmitting entity and a separate receiving entity (e.g., between a UE and a BS, an RSU and a BS, between two BSs, etc.). The receiving entity may utilize such transmission configuration parameters to extract source and/or destination information from the reflection signal. In an example, the receiving entity may determine, from the reflection signal, a particular base station or UE that has transmitted a corresponding signal or a destination for the corresponding signal. In addition, the UE may determine an amount of time that the reflection signal has been in transit to the receiving entity based on a limited data decoding of the reflection signal to determine when the signal was transmitted, from where the signal was transmitted, and other such information for formulating geometric structures as discussed herein for identifying likely locations for objects.

At block 1302, a receiver, such as a first UE, may utilize a first set of transmission configuration parameters to receive: (i) a first line-of-sight (LoS) signal configured for the first UE, and (ii) a first set of reflection signals corresponding to the first LoS signal. In the example as illustrated in FIG. 3, the receiver UE may utilize the first set of transmission configuration parameter to receive the LoS signal 314 and the reflection signal 316.

At block 1304, the receiver may utilize the first set of transmission configuration parameters to decode a first set of encoded data items corresponding to the first LoS signal. In an example, the receiver may utilize a first set of data decoding parameters to decode data in the LoS signal 314. The first set of data decoding parameters may enable the receiver to fully decode the LoS signal 314 to determine a first amount of information from the LoS signal 314.

At block 1306, the receiver may receive a second set of transmission configuration parameters relating to a second set of reflection signals. The second set of reflection signals may correspond to at least one other LoS signal configured for one or more other entities. In the example of FIG. 4 or 5, the second set of reflection signals may reflect from object 418 or 568 and be reflection signals that correspond to LoS signals transmitted between any of UE 414, UE564*b*, UE 564*a*, UE 564*c*, BS 412*a*, BS 412*b*, BS 412*c*, or BS 562. The second set of transmission configuration parameters may include data decoding information and/or RS-info that enable the receiver to monitor for the second set of reflection signals and/or to partially decode the second set of reflection signals. In an illustrative example with the receiver being a UE 564*b*, the UE 564*b* may receive transmission configuration parameters from BS 562 or from UE 654*c*.

In some aspects, the receiver can receive the RS-info (e.g., RS configuration information, a set of resource parameters, etc.) in one or more messages and/or information elements (IEs) transmitted using any suitable communication network (e.g., via a network, such as RAN 104 or RAN 200, using one or more uplink (UL) slots and/or one or more downlink (DL) slots; or via one or more peer-to-peer (P2P) connections, vehicle-to-everything (V2X) connections, etc., utilizing any suitable technique or combination of techniques, such as sidelink (SL) communications, Bluetooth communications, etc.).

In some examples, the reference signal information (RS-info) can include an explicit indication that the RS-info (e.g., RS configuration information, a set of resource parameters, etc.) can be used by receivers for purposes other than decoding, transmitting, channel characterization, or synchronization (e.g., receivers that utilize the multi-node passive sensing system). Note that there may not be any preexisting relationship between devices that together form the multi-node passive sensing system. In some aspects, the entity can receive RS configuration from different transmitters at different times (e.g., when a transmitter, such as a UE, enters a cell corresponding to the entity). In some aspects, the RS-info received at block 1306 can be a portion (e.g., less than all) of the RS-info corresponding to the one or more transmitters. For example, the RS-info received at block 1306 can be a portion of RS-info that can be used for passive sensing.

At block 1308, the receiver may then monitor for the second set of reflection signals based on the second set of transmission configuration parameters. The transmission configuration parameters may indicate a set of resource elements to monitor for a reference signal transmitted from BS 562 to UE 564*c* or from UE 564*c* to BS 562 information. The transmission configuration parameters may include data decoding information enabling UE 564*b* to decode part of a signal carried on a reference signal to determine, for example, a timestamp indicating at what time the signal was transmitted from BS 562 to 564*b* or vice versa. In this way, the UE may determine when it has received a reflection signal corresponding to a LoS signal transmitted between BS 562 to 564*b*.

At block 1310, the receiver may then utilize the second set of transmission configuration parameters to receive the second set of reflection signals. In an example, the receiver may identify a set of received signals as the second set of reflection signals. The receiver may have been receiving the second set of reflection signals but the second set of transmission configuration parameters enable the receiver to recognize the second set of reflection signals. Otherwise, the received signals would be unintelligible to the receiver as blending in with the background noise of other signal transmissions that are sent between numerous other entities. The receiver can use the RS-info and/or the data-decoding information to receive the second set of reflection signals so as to separate the second set of reflection signals from other signals of the background noise. In an example, the receiver may monitor various resource elements (e.g., subcarriers and/or symbols) expecting that a reflection signal may be received corresponding to those specific resource elements.

At block 1312, the receiver may utilize the second set of transmission configuration parameters to (optionally) decode a predetermined subset of encoded data items corresponding to the second set of reflection signals. In an example, the receiver may utilize the second set of transmission configuration parameters to estimate the frequency domain (FD) channel response or received signals. In addition, the predetermined subset of encoded data items may correspond to less than a full amount of encoded data items of the second set of reflection signals. In an example, the receiver may decode less than the full amount of encoded data items relative to a higher percentage that the receiver could decode from the first LoS signal 314.

At block 1314, the receiver may determine a set of candidate spatial locations for an object based on one or more of: the second set of reflection signals, the decoded data items, the first LoS signal, and/or the first set of reflection signals. In an example, the receiver can determine ellipses for an object based on the estimated frequency domain (FD) channel response of various reference signals (RSs). In another example, the receiver may determine ellipse information for an object based on the reflection signal angle, indicating information for how the reflection signal reflected from the object to the receiver. The receiver can calculate an amount of time the reflection signal has been in transit to determine candidate spatial locations indicated based on how far away the object is from the receiver and the source transmitter. The source transmitter may have transmitted the LoS signal to a distant UE at a particular time, that the receiver may determine from partially decoding data. Using this information, and based on what time the reflection signal was received at the receiver, the receiver may deduce where an object may be located spatially (e.g., the set of candidate spatial locations) since the reflection signal may have reflected from the object in this way with the object located in a number of places (e.g., along the perimeter of an ellipse).

In addition, the intended UE (e.g., a second UE) for the LoS signal may receive the LoS signal corresponding to the second set of reflection signals. This UE may also receive reflection signals corresponding to the LoS signal. This UE may also be struck by other reflection signals corresponding to LoS signals transmitted to other UEs. This UE may not be able to discern these reflection signals from background noise without having corresponding transmission configuration information to monitor for these reflection signals.

At block 1316, the receiver may (optionally) request additional transmission configuration parameters. In an example, the receiver (e.g., the first UE) may request additional transmission configuration parameters so that the first UE can monitor for additional reflections signals. In any case, the first UE receiver may continue to receive LoS signals intended for its reception, as well as reflection signals related to the first UE's LoS signals that reflect from objects to the first UE. An object may reflect such signals to other receivers also, depending on an angle at which the signal collides with the object, for example. Other receivers may be unable to use the reflection signal, however, without specific transmission configuration information (e.g., RS-info, data-decoding parameters, etc.). In that case, the reflection signals would blend in with the noise of other signals, and the other receivers would not be able to use such reflection signals to estimate locations for the object reflecting the signals.

Examples for Utilization of Reference Signal Information (RS-info)

Figure 14:
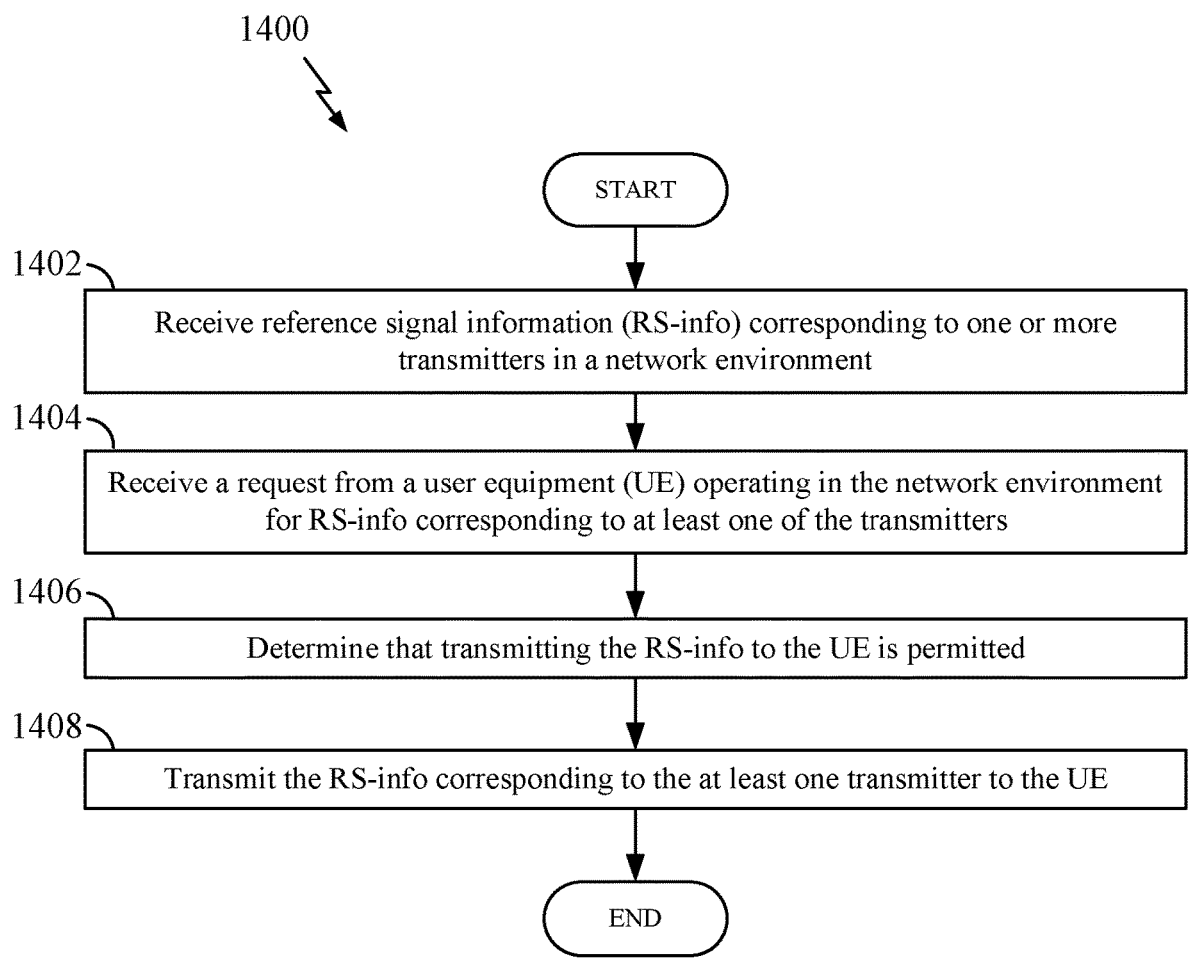
FIG. 14 is a flow chart illustrating an example process for sharing reference signal information (RS-info) between multiple entities, in accordance with one or more of the various techniques of this disclosure.

FIG. 14 is a flow chart illustrating an example process 1400 for sharing reference signal (RS) information (RS-info) between one or more entities, in accordance with one or more of the various techniques of this disclosure, and is described as an illustrative example without limitation. As described below, some or all illustrated features can be omitted in a particular implementation within the scope of the disclosed subject matter, and some illustrated features may not be required for implementation of all embodiments. In some examples, process 1400 can be carried out (e.g., executed) by a scheduling entity 1100 (e.g., a base station (BS) 108) described above in connection with FIG. 11 (e.g., using transceiver 1110, etc.), and/or by a scheduled entity 1200 (e.g., a UE 106) described above in connection with FIG. 12 (e.g., using transceiver 1210, etc.), and/or by base station 108 or UE 106 described above in connection with FIG. 1. In some examples, process 1400 can be carried out by any suitable apparatus or means for carrying out the functions or algorithm described below.

At block 1402, an entity (e.g., a user equipment (UE), a base station (BS), a road side unit (RSU), etc.) can receive reference signal information (RS-info) corresponding to one or more transmitters (e.g., transmitters that form part of a multi-node passive sensing system). In some aspects, the entity can receive the RS-info (e.g., RS configuration information, a set of resource parameters, etc.) in one or more messages and/or information elements (IEs) transmitted using any suitable communication network (e.g., via a network, such as RAN 104 or RAN 200, using one or more uplink (UL) slots and/or one or more downlink (DL) slots; or via one or more peer-to-peer (P2P) connections, vehicle-to-everything (V2X) connections, etc., utilizing any suitable technique or combination of techniques, such as sidelink (SL) communications, Bluetooth communications, etc.).

In some examples, the reference signal information (RS-info) can include an explicit indication that the RS-info (e.g., RS configuration information, a set of resource parameters, etc.) can be used by receivers for purposes other than decoding, transmitting, channel characterization, or synchronization (e.g., receivers that utilize the multi-node passive sensing system). Note that there may not be any preexisting relationship between devices that together form the multi-node passive sensing system. In some aspects, the entity can receive RS configuration from different transmitters at different times (e.g., when a transmitter, such as a UE, enters a cell corresponding to the entity). In some aspects, the RS-info received at block 1402 can be a portion (e.g., less than all) of the RS-info corresponding to the one or more transmitters. For example, the RS-info received at block 1402 can be a portion of RS-info that can be used for passive sensing. In some aspects, block 1402 can be omitted. For example, a device executing process 1400, such as a base station, can maintain RS-info corresponding to scheduled entities, such that block 1402 may be unnecessary. Note that the entity executing process 1400 may or may not identify a particular RS with a specific transmitter. For example, the information received by the entity executing the process can be information relating to an antenna port, QCL information, and/or an RS without specifically identifying a transmitter associated the antenna port, the QCL information, and/or the RS.

At block 1404, an entity (e.g., a user equipment (UE), a base station (BS), a road side unit (RSU), etc.) can receive a request from a UE (or other receiver) for RS-info corresponding to one or more nearby transmitters. In some aspects, the entity can receive the request for RS-info in one or more messages and/or information elements (IEs) transmitted using any suitable communication network (e.g., via a network, such as RAN 104 or RAN 200, using one or more uplink (UL) slots and/or one or more downlink (DL) slots; or via one or more peer-to-peer (P2P) connections, vehicle-to-everything (V2X) connections, etc., utilizing any suitable technique or combination of techniques, such as sidelink (SL) communications, Bluetooth communications, etc.).

In some examples, the request for reference signal information (RS-info) may correspond to an explicit indication that the requested RS-info (e.g., RS configuration information) is for use in a multi-node passive sensing process. Note that the entity that receives the RS-info at block 1402 can be the same or different from the entity that receives the request at block 1404. For example, an RSU can collect RS configuration information and provide that information to nearby base stations, which can receive the request at block 1404. In some aspects, block 1404 can be omitted. For example, RS-info can be broadcast periodically (e.g., at regular and/or irregular intervals).

At block 1406, an entity can determine that sharing of the RS-info is permitted. For example, in some aspects, the entity can determine that the RS-info can be shared for the purpose of multi-node passive sensing. In a more particular example, the entity can determine that the RS-info can be shared for the purpose of multi-node passive sensing based on an explicit indication received from the transmitter(s) that provided the RS-info at block 1402. As another more particular example, the entity can determine that the RS-info can be shared for the purpose of multi-node passive sensing based on the RS-info being received at block 1402. In some aspects, process 1400 can end if the request at block 1404 was not corresponding to an explicit indication that the requested RS-info is for use in a multi-node passive sensing process and/or if the RS-info was not corresponding to an explicit indication that the RS-info can be used by receivers that utilize the multi-node passive sensing system. Additionally or alternatively, in some aspects, the entity can determine not to share requested RS-info for any other suitable reason.

At block 1408, an entity can transmit, to the UE (or other receiver) requesting the RS-info (e.g., at block 1404), a set of reference signal information (RS-info) parameters for one or more nearby transmitters to the UE (or other receiver) that requested (or requests) RS-info (e.g., RS configuration information) at block 1404. In some aspects, the entity can transmit the RS-info in one or more messages and/or information elements (IEs) transmitted using any suitable communication network (e.g., via a network, such as RAN 104 or RAN 200, using one or more uplink (UL) slots and/or one or more downlink (DL) slots; or via one or more peer-to-peer (P2P) connections, vehicle-to-everything (V2X) connections, etc., utilizing any suitable technique or combination of techniques, such as sidelink (SL) communications, Bluetooth communications, etc.).

In some examples, the entity (e.g., a base station 108) can transmit to the UE only RS information (RS-info) relating to at least one RS transmission that is not already targeted at the UE (or other receiver) that requested the RS-info at block 1404. In some aspects, a reference signal (RS) can be targeted at a particular receiver if the RS is scheduled for the purpose of that particular receiver using the RS as a reference to conduct further communications. For example, an RS can be targeted at a particular receiver that is expected to use the RS for the purpose of properly receiving and/or decoding communications from a transmitter that is scheduled to (and/or has already) transmitted the RS. In a more particular example, a base station can target a particular UE with an RS that the UE uses as a reference to receive other signals transmitted to that particular UE.

In another more particular example, a UE can target one or more base stations (BSs) with an RS that the one or more BS(s) use as a reference to receive other signals transmitted by that particular UE. As yet another example, a first UE can target a second UE (neither of which is the UE that requested RS-info at block 1404) with an RS that the second UE uses as a reference to receive other signals transmitted by the first UE to the second UE. As described above an RS can be used to estimate a channel response of a channel used to transmit information to the receiver characterizing the channel. As another example, an RS can be targeted at a particular receiver that is expected to use the RS for the purpose of synchronizing transmission of signals with the device that transmitted the RS. As yet another example, if the UE that requested the RS-info at block 1404 is requesting the RS configuration only for purposes other than transmission of information, reception of information directed to the UE (e.g., the RS may be used for reception of information directed to another receiver for use in a multi-node passive sensing process, but are not used to receive messages and/or information elements (IEs) directed to the UE), channel characterization for reception of information directed to the UE, or synchronization of communications to/from the UE to another device.

In some aspects, the RS-info can include an indication that a set of reference signals (RSs) corresponding to the RS-info can only be used by the particular UE for limited or restricted purposes, such as passive sensing. Additionally or alternatively, in some aspects, the RS-info can include an indication that the RSs corresponding to the RS-info can be used for purposes other than decoding or transmitting data, such as for passive sensing. In an example, the RS-info can include an indication that at least a certain part of the RS-info is for use by the UE (or other receiver) to carry out a passive sensing process. As another example, the RS-info can include an indication that at least a certain part of the RS-info is not to be used by the UE (or other receiver) to decode or transmit any signals. As yet another example, the RS-info can include an indication that no HARQ-ACK feedback is needed from the UE (or other receiver) in connection with the RS-info.

In some aspects, an entity (e.g., a base station 108, a road side unit (RSU), a central server, etc.) may transmit the RS-info using any suitable channel, format, technique, or combination of techniques. In an example, the entity may transmit the RS-info to one or more receiving entities (e.g., one or more scheduled entities 106, etc.) using one or more of the following: a radio resource control (RRC) message; one or more MAC control elements (MAC-CEs); downlink control information (DCI); sidelink (SL) control information (SCI); a dedicated physical downlink shared channel (PDSCH) message; a dedicated physical sidelink shared channel (PDSCH) message; a message transmitted using a dedicated physical (PHY) layer channel (e.g., a PHY RS-info Indication Channel (PRICH)); and/or a control resource set (CORESET) identifier (ID) and a corresponding search space (SS).

Note that if a CORESET ID is used to convey RS-info, the UE (or other receiver) may already be configured with one or more search spaces (SSs) and CORESETs for physical downlink control channel (PDCCH) monitoring. In some aspects, the additional CORESET and SS can be used by the UE (or other receiver) to identify the demodulation reference signal (DMRS) for sensing purposes, and the UE can inhibit them from being used for PDCCH monitoring.

In a particular example, for reference signal information (RS-info) conveyed via downlink (DL) control information (DCI), the DCI can be a group-common DCI (GC-DCI), can be conveyed via PDCCH and/or PDSCH, and/or can be one part or both parts of a 2-stage DCI.

In another particular example, for RS-info conveyed via sidelink control information (SCI), the SCI can be conveyed via PSCCH and/or PSSCH, and/or can be one part or both parts of a 2-stage SCI.

In some aspects, an indication corresponding to the RS-info can indicate if the RS-info corresponds to a DL RS, a UL RS, and/or an SL RS.

In some examples, the one or more reference signals (RSs) corresponding to the RS information (RS-info) can be one or more of the following types of RSs: (i) a demodulation reference signal (DMRS) (e.g., for a physical uplink (UL) shared channel (PUSCH), a physical downlink (DL) shared channel (PDSCH), a physical UL control channel (PUCCH), a physical DL control channel (PDCCH), etc.); (ii) a channel state information reference signal (CSI-RS); (iii) a channel state information tracking reference signal (CSI-TRS); (iv) a positioning reference signal (PRS); (v) phase tracking reference signal (PTRS); (vi) a sounding reference signal (SRS); and/or (viii) any other suitable reference signal (RS).

Examples for Sharing of Reference Signal Information (RS-info)

Figure 15:
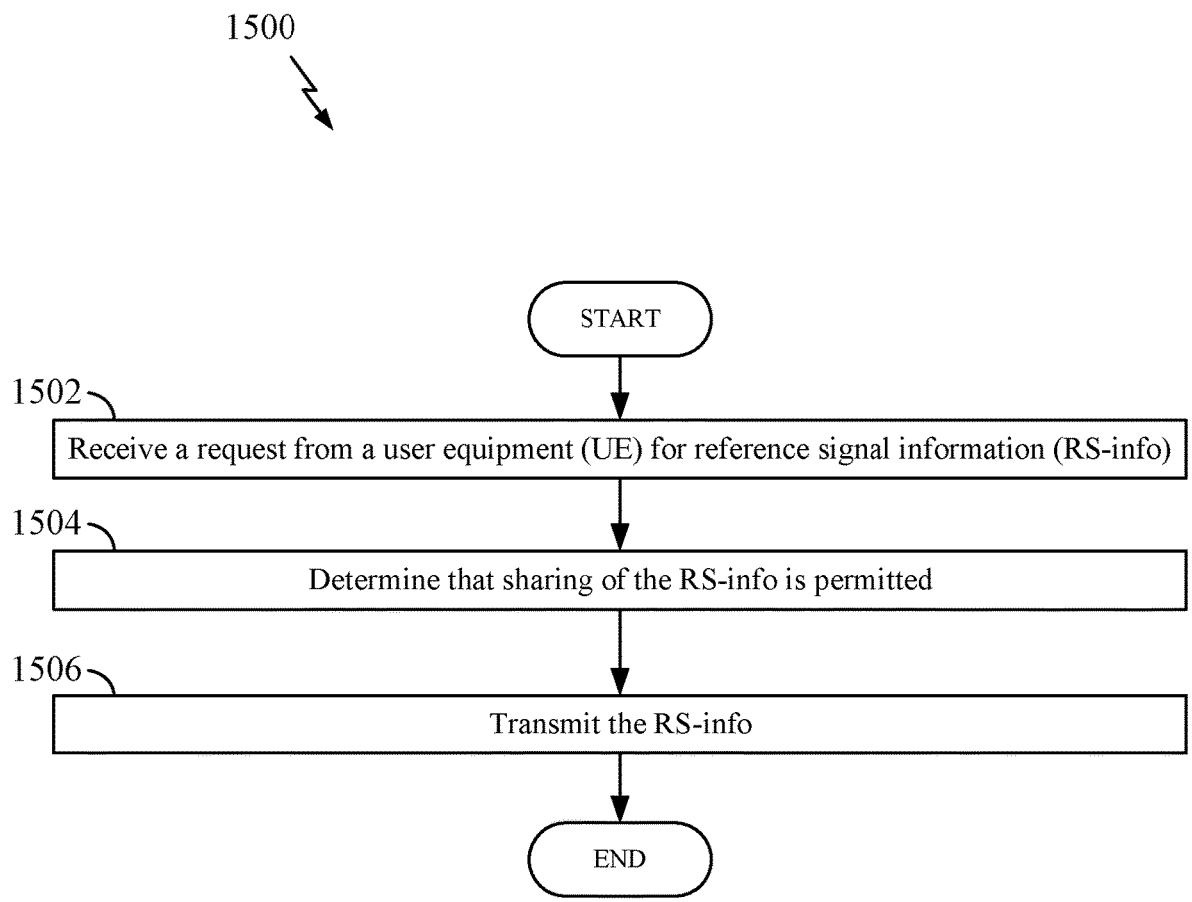
FIG. 15 is a flow chart illustrating an example process for an entity sharing RS-info corresponding to the entity's own transmission of one or more reference signals (RSs) to one or more other entities, in accordance with one or more of the various techniques of this disclosure.

FIG. 15 is a flow chart illustrating an example process 1500 for an entity sharing reference signal information (RS-info) corresponding to the entity's own transmission of one or more reference signals (RSs) to one or more other entities, in accordance with one or more of the various techniques of this disclosure, and is described as an illustrative example without limitation. As described below, some or all illustrated features can be omitted in a particular implementation within the scope of the disclosed subject matter, and some illustrated features may not be required for implementation of all embodiments. In some examples, process 1500 can be carried out (e.g., executed) by a scheduled entity or a scheduling entity (described above in connection with FIGS. 11 and 12), such as by base station 108 or UE 106 described above in connection with FIG. 1. In some examples, process 1500 can be carried out by any suitable apparatus or means for carrying out one or more of the various techniques disclosed herein.

At block 1502, an entity (e.g., a base station (BS), a road side unit (RSU), a user equipment (UE), a central node or server, etc.) can receive a request from a first UE (or other receiver) for a sharing of reference signal information (RS-info) with the first UE. In some aspects, the entity can receive the request for RS-info (e.g., RS configuration information, a set of resource parameters relating to a set of reference signals (RSs)), etc.) in one or more messages and/or information elements (IEs) transmitted using any suitable communication network (e.g., via a network, such as RAN 104 or RAN 200, using one or more uplink (UL) slots, sidelink (SL) slots, and/or downlink (DL) slots; or via one or more peer-to-peer (P2P) connections, vehicle-to-everything (V2X) connections, etc., utilizing any suitable technique or combination of techniques, such as sidelink (SL) communications, Bluetooth communications, etc.). In some examples, the request for RS-info may correspond to an explicit indication that the requested RS-info (e.g., RS configuration information) is for the first UE to use in a multi-node passive sensing process.

At block 1504, the entity may determine whether sharing of the RS-info with the first UE is permissible, such that the entity may wholly or at least partially fulfill or honor the request. In an example, the entity may determine that sharing of the RS-info with the first UE is permissible, such that the first UE may utilize the RS-info to perform one or more multi-node passive sensing techniques. In some examples, the entity may determine that the RS-info can be shared for the purpose of multi-node passive sensing based on an explicit indication (e.g., in memory) that the RS-info can be shared for the purpose of multi-node passive sensing. In some examples, process 1500 can end (e.g., at block 1504) in scenarios where the request received at block 1502 does not correspond to an explicit indication that the requested RS-info is for use in a multi-node passive sensing process and/or where the entity determines the requested RS-info cannot be shared with the first UE (and/or another receiver), such as for multi-node passive sensing. Additionally or alternatively, in some aspects, the entity can determine not to share the RS-info for any other suitable reason.

At block 1506, the entity can transmit a set of RS-info parameters corresponding to the entity's own reference signal (RS) transmissions to the UE (or other receiver) that requested the RS-info at block 1502. In some aspects, the RS-info can be transmitted using any suitable technique or combination of techniques, such as techniques described above in connection with FIG. 14. In some aspects, the entity can transmit the RS-info in one or more messages and/or information elements (IEs) transmitted using any suitable communication network (e.g., via a network, such as RAN 104 or RAN 200, using one or more uplink (UL) slots, sidelink slots, and/or downlink (DL) slots; or via one or more peer-to-peer (P2P) connections, vehicle-to-everything (V2X) connections, etc., utilizing any suitable technique or combination of techniques, such as sidelink (SL) communications, Bluetooth communications, etc.).

In some examples, the reference signal information (RS-info) may correspond to one or more dependencies that govern (e.g., control) the use of the RS-info as described above in connection with block 1408 of FIG. 14. In some aspects, an indication corresponding to the RS-info can indicate whether the RS-info is corresponding to a downlink (DL) reference signal (RS), an uplink (UL) RS, and/or a sidelink (SL) RS.

In some examples, the one or more reference signals (RSs) corresponding to the RS information (RS-info) can be one or more of the following RSs: (i) a demodulation reference signal (DMRS) (e.g., for a physical uplink (UL) shared channel (PUSCH), a physical downlink (DL) shared channel (PDSCH), a physical UL control channel (PUCCH), a physical DL control channel (PDCCH), etc.); (ii) channel state information reference signal (CSI-RS); (iii) a channel state information tracking reference signal (CSI-TRS); (iv) a positioning reference signal (PRS); (v) a phase tracking reference signal (PTRS); (vi) a sounding reference signal (SRS); and/or (vii) any other suitable reference signal (RS).

Examples for Providing Reference Signal Information Pursuant to a Request

Figure 16:
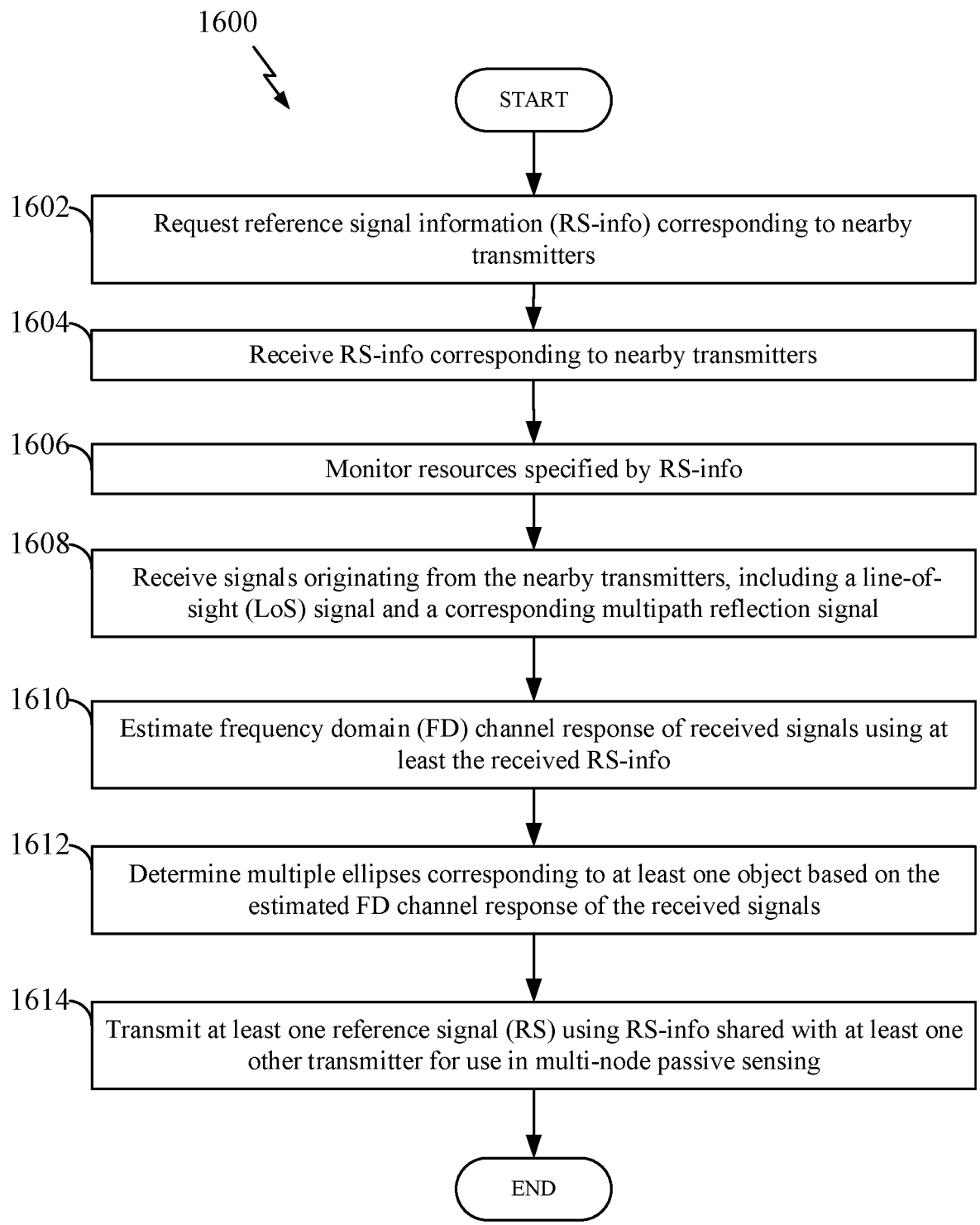
FIG. 16 is a flow chart illustrating an example process for using RS-info to facilitate multi-node passive sensing, in accordance with one or more of the various techniques of this disclosure.

FIG. 16 is a flow chart illustrating an example process 1600 for using reference signal information (RS-info) configuration to facilitate multi-node passive sensing, in accordance with one or more of the various techniques of this disclosure, and is described as an illustrative example without limitation. As described below, some or all illustrated features can be omitted in a particular implementation within the scope of the disclosed subject matter, and some illustrated features may not be required for implementation of all embodiments. In some examples, process 1600 can be carried out (e.g., executed) by a scheduled entity or a scheduling entity described above in connection with FIGS. 11 and 12, and/or by base station 108 or UE 106 described above in connection with FIG. 1. In some examples, process 1600 can be carried out by any suitable apparatus or means for carrying out the functions or algorithm described below.

At block 1602, a receiver (e.g., a user equipment (UE), a base station (BS), a road side unit (RSU), etc.) can request reference signal information (RS-info) corresponding to one or more nearby transmitters (e.g., one or more UEs, base stations (BSs), road side units (RSUs), etc.). In some aspects, the receiver can request RS-info (e.g., a set of RS-info parameters, etc.) using one or more messages and/or information elements (IEs) transmitted using any suitable communication network (e.g., via a network, such as RAN 104 or RAN 200, using one or more uplink (UL) slots and/or one or more downlink (DL) slots; or via one or more peer-to-peer (P2P) connections, vehicle-to-everything (V2X) connections, etc., utilizing any suitable technique or combination of techniques, such as sidelink (SL) communications, Bluetooth communications, etc.).

In some examples, the receiver can request the reference signal information (RS-info) from any suitable transmitter or transmitters. In an example, the receiver can request the RS-info from a base station (BS) during uplink (UL). In another example, the receiver can request the RS-info from a user equipment (UE) during downlink (DL) (e.g., in instances where the receiver is a base station (BS)). As yet another example, the receiver can request the RS-info from another entity via a sidelink (SL) connection.

In some examples, an entity performing process 1600 may omit (e.g., skip) block 1602 from process 1600. In an example, a transmitter may provide RS-info that is not sent in response to an explicit request from the receiver (e.g., a request can come from another entity, such as a base station, or from the core network).

At block 1604, the receiver can receive reference signal information (RS-info) corresponding to one or more transmitters. In some aspects, the receiver can receive the RS-info in one or more messages and/or information elements (IEs) transmitted using any suitable communication network (e.g., via a network, such as RAN 104 or RAN 200, using one or more uplink (UL) slots and/or one or more downlink (DL) slots; or via one or more peer-to-peer (P2P) connections, vehicle-to-everything (V2X) connections, etc., utilizing any suitable technique or combination of techniques, such as sidelink (SL) communications, Bluetooth communications, etc.). In some examples, the reference signal information (RS-info) can include information about multiple reference signals (RSs) used by a particular transmitter.

In some examples, the RS-info may correspond to one or more dependencies that control (e.g., restrict) and/or permit the use of the RS-info as described herein, for example, with reference to block 1408 of FIG. 14.

In some aspects, the RS-info can be received using any suitable technique or combination of techniques, such as techniques described herein, for example, with reference to FIG. 14. In some examples, an indication corresponding to the RS-info may indicate whether the RS-info corresponds to a downlink (DL) reference signal (RS), an uplink (UL) RS, and/or a sidelink (SL) RS.

In some examples, the one or more reference signals (RSs) corresponding to the reference signal information (RS-info) can be one or more of the following reference signals: (i) a demodulation reference signal (DMRS) (e.g., for a physical uplink (UL) shared channel (PUSCH), a physical downlink (DL) shared channel (PDSCH), a physical UL control channel (PUCCH), a physical DL control channel (PDCCH), etc.); (ii) channel state information reference signal (CSI-RS); (iii) a channel state information tracking reference signal (CSI-TRS); (iv) a positioning reference signal (PRS); (v) a phase tracking reference signal (PTRS); (vi) a sounding reference signal (SRS); and/or (vii) any other suitable reference signal (RS).

At block 1606, the receiver can monitor resources specified by the RS-info (e.g., RS-info corresponding to the one or more nearby transmitters). For example, the receiver can monitor a set of frequency-time domain (FD-TD) resources corresponding to the RS-info. The receiver may do so using one or more transceivers (e.g., using transceiver 1210). In a more particular example, the receiver can attempt to detect RSs corresponding to a set of FD-TD resources corresponding to the RS-info by sampling and buffering a received wireless signal, and applying suitable processing to the buffered signal such as energy detection, demodulation, decoding, etc.

At block 1608, the receiver can receive reference signals (RSs) originating from one or more nearby transmitters. As described herein, for example with reference to FIGS. 3 to 5, a receiver can receive the same reference signal (RS) transmitted by a particular transmitter multiple times, including as a line-of-sight (LoS) signal and as one or more multipath reflection signals that correspond to the LoS reference signal. Because the receiver has access to the RS-info (e.g., RS configuration information), the receiver may utilize the RS-info to detect at least one reference signal (RS) that corresponds to the RS-info).

Without RS-info, the receiver may not properly detect a reference signal (RS) intended for another device (e.g., a second receiver, such as a second user equipment (UE)). That is, without having access to the demodulation reference signal (DMRS) corresponding to the receiver for which the RS was intended, the receiver may not properly detect the RS. In such instances, the receiver may be unable to properly estimate the channel response for a channel.

At block 1610, the receiver can estimate a frequency domain (FD) channel response of the received signals using the received RS-info. In some aspects, the receiver can estimate the FD channel response using any suitable technique or combination of techniques. In an example, the receiver may estimate the channel by calculating a symbol-wise channel frequency response using inverse filtering. The receiver may use such filtering to recover one or more transmitted symbols and may utilize the symbols to generate a channel impulse response that indicates the multipath time delay. In some aspects, the receiver can estimate the FD channel response for RSs received from multiple transmitters.

At block 1612, the receiver can determine ellipses for an object based on the estimated frequency domain (FD) channel response of various reference signals (RSs). In some aspects, the receiver can determine ellipses using any suitable technique or combination of techniques. For example, the receiver may determine ellipses corresponding to RSs received from various transmitters using techniques described herein, for example, with reference to FIGS. 3 to 5.

At block 1614, the receiver can act as a transmitter, and can transmit a reference signal (RS) using at least a portion of the reference signal information (RS-info) shared with at least one other transmitter for use in multi-node passive sensing. For example, the receiver can act as a portion of a multi-node passive sensing system that can be used by other receivers to locate objects in the environment. In some aspects, the receiver can transmit the RS-info (e.g., RS configuration information, a set of resource parameters, a set of RS-info parameters, etc.) in one or more messages and/or information elements (IEs) transmitted using any suitable communication network (e.g., via a network, such as RAN 104 or RAN 200, using one or more uplink (UL) slots and/or one or more downlink (DL) slots; or via one or more peer-to-peer (P2P) connections, vehicle-to-everything (V2X) connections, etc., utilizing any suitable technique or combination of techniques, such as sidelink (SL) communications, Bluetooth communications, etc.).

Examples for Utilization of Data-Decoding Information

Figure 17:
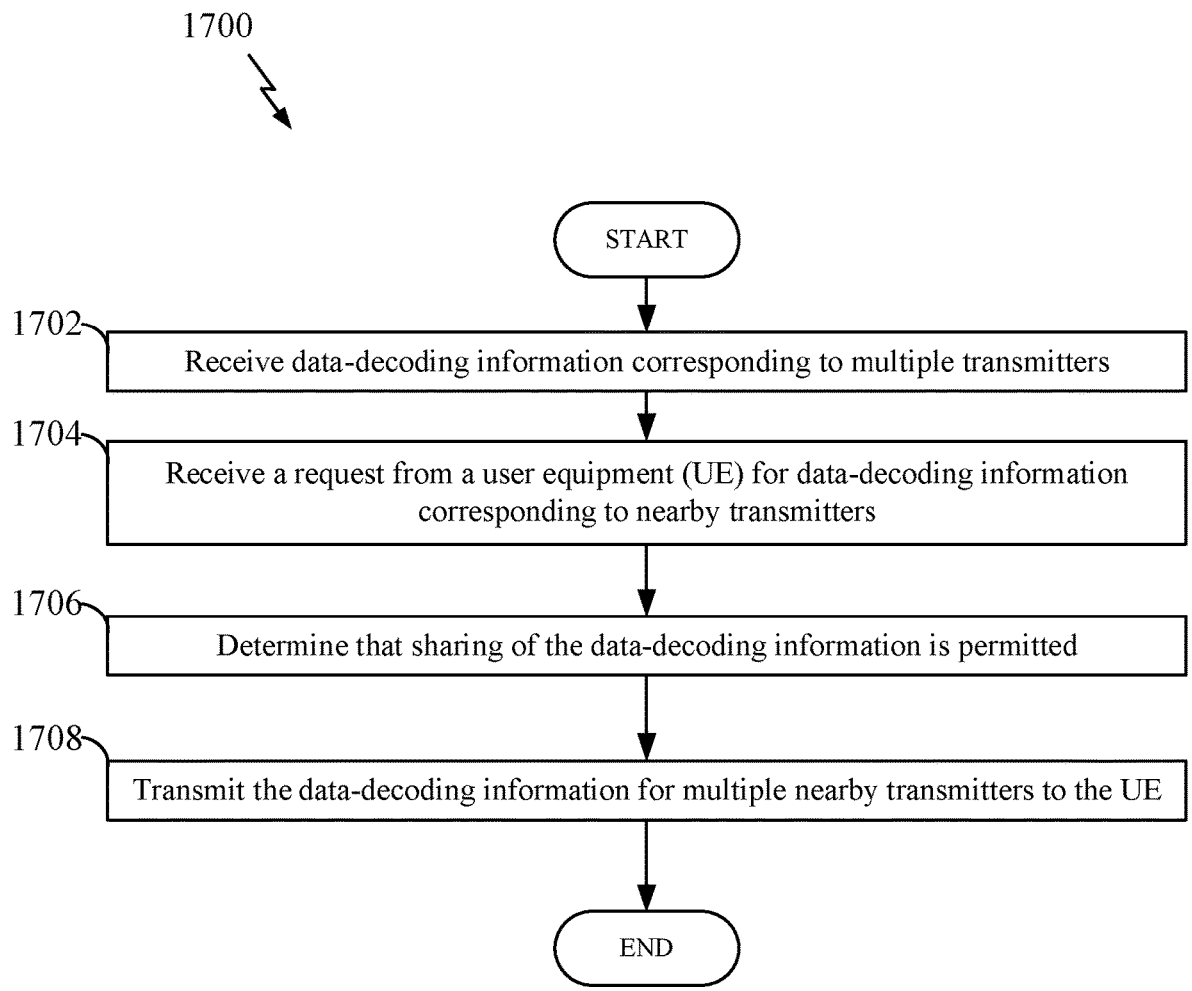
FIG. 17 is a flow chart illustrating an example process for sharing data-decoding information between multiple entities, in accordance with one or more of the various techniques of this disclosure.

FIG. 17 is a flow chart illustrating an example process for sharing data-decoding information for one or more entities, in accordance with one or more of the various techniques of this disclosure, and is described as an illustrative example without limitation. As described below, some or all illustrated features can be omitted in a particular implementation within the scope of the disclosed subject matter, and some illustrated features may not be required for implementation of all embodiments. In some examples, process 1700 can be carried out (e.g., executed) by a scheduled entity or a scheduling entity described above in connection with FIGS. 11 and 12, and/or by base station 108 or UE 106 described above in connection with FIG. 1. In some examples, process 1700 can be carried out by any suitable apparatus or means for carrying out the functions or algorithm described below.

At block 1702, an entity (e.g., a user equipment (UE), a base station (BS), a road side unit (RSU), etc.) can receive data-decoding information corresponding to one or more transmitters (e.g., transmitters that form part of a multi-node passive sensing system). In some aspects, the entity can receive the data-decoding information in one or more messages and/or information elements (IEs) transmitted using any suitable communication network (e.g., via a network, such as RAN 104 or RAN 200, using one or more uplink (UL) slots and/or one or more downlink (DL) slots; or via one or more peer-to-peer (P2P) connections, vehicle-to-everything (V2X) connections, etc., utilizing any suitable technique or combination of techniques, such as sidelink (SL) communications, Bluetooth communications, etc.).

In some examples, the data-decoding information can include an explicit indication that the data-decoding information can be used by receivers for purposes other than decoding data that is scheduled for the entity to receive (e.g., receivers that utilize the multi-node passive sensing system). Note that there may not be any preexisting relationship between devices that together form the multi-node passive sensing system. In some aspects, the entity can receive data-decoding information from different transmitters at different times (e.g., when a transmitter, such as a UE, enters a cell corresponding to the entity). In some aspects, the data-decoding information received at block 1702 can be a portion (e.g., less than all) of data-decoding information corresponding to the one or more transmitters. For example, the data-decoding information received at block 1702 can be a portion of data-decoding information that can be used for passive sensing. In some aspects, block 1702 can be omitted. For example, a device executing process 1700, such as a scheduling entity 108 (e.g., a base station (BS)), may maintain and/or manage data-decoding information corresponding to scheduled entities 106, such that block 1702 may be unnecessary. Note that the entity executing process 1700 may or may not identify a particular RS with a specific transmitter. For example, the information received by the entity executing the process can be information relating to an antenna port, QCL information, and/or an RS without specifically identifying a transmitter associated the antenna port, the QCL information, and/or the RS.

At block 1704, an entity (e.g., a user equipment (UE), a base station (BS), a road side unit (RSU), etc.) can receive a request from a UE (or other receiver) for data-decoding information corresponding to one or more nearby transmitters. In some aspects, the entity can receive the request for data-decoding information in one or more messages and/or information elements (IEs) transmitted using any suitable communication network (e.g., via a network, such as RAN 104 or RAN 200, using one or more uplink (UL) slots and/or one or more downlink (DL) slots; or via one or more peer-to-peer (P2P) connections, vehicle-to-everything (V2X) connections, etc., utilizing any suitable technique or combination of techniques, such as sidelink (SL) communications, Bluetooth communications, etc.).

In some examples, the request for data-decoding information may correspond to an explicit indication that the requested data-decoding information is for use in a multi-node passive sensing process. Note that the entity that receives the data-decoding information at block 1702 can be the same or different from the entity that receives the request at block 1704. In an example, a road side unit (RSU) may collect data-decoding information and provide that information to nearby base stations (BSs), which can receive the request at block 1704. In some aspects, block 1704 can be omitted. For example, data-decoding information can be broadcast periodically (e.g., at regular and/or irregular intervals). In some aspects, the data-decoding information can include only decoding information that can be used to decode signals at the physical (PHY) layer, which can leave higher layer data transmitted to or from a UE encrypted and inaccessible to an entity in possession of the data-decoding information.

At block 1706, an entity can determine that sharing of the data-decoding information is permitted. For example, in some aspects, the entity can determine that the data-decoding information can be shared for the purpose of multi-node passive sensing. In a more particular example, the entity can determine that the data-decoding information can be shared for the purpose of multi-node passive sensing based on an explicit indication received from the transmitter(s) that provided the data-decoding information at block 1702. As another more particular example, the entity can determine that the data-decoding information can be shared for the purpose of multi-node passive sensing based on the data-decoding information being received at block 1702.

In some examples, process 1700 can end if the request at block 1704 was not corresponding to an explicit indication that the requested data-decoding information is for use in a multi-node passive sensing process and/or if the data-decoding information was not corresponding to an explicit indication that the data-decoding information can be used by receivers that utilize the multi-node passive sensing system. Additionally or alternatively, in some aspects, the entity can determine not to share requested data-decoding information for any other suitable reason.

At block 1708, an entity can transmit data-decoding information for one or more nearby transmitters to the UE (or other receiver) that requests data-decoding information at block 1704. In some aspects, the data-decoding information can include an indication that encoded signals corresponding to the data-decoding information can only be used for limited or restricted purposes. In some aspects, the entity can transmit the data-decoding information in one or more messages and/or information elements (IEs) transmitted using any suitable communication network (e.g., via a network, such as RAN 104 or RAN 200, using one or more uplink (UL) slots and/or one or more downlink (DL) slots; or via one or more peer-to-peer (P2P) connections, vehicle-to-everything (V2X) connections, etc., utilizing any suitable technique or combination of techniques, such as sidelink (SL) communications, Bluetooth communications, etc.).

In some examples, the data-decoding information can include an indication that the data corresponding to the data-decoding information can be used for purposes other than decoding or transmitting data, such as passive sensing. For example, the data-decoding information can include an indication that at least a certain part of the data-decoding information is for use by the UE (or other receiver) to carry out a passive sensing process. As another example, the data-decoding information can include an indication that at least a certain part of the data-decoding information is not to be used by the UE (or other receiver) to schedule the UE to receive the encoded data (e.g., encoded in one or more packets). As yet another example, the data-decoding information can include an indication that no HARQ-ACK feedback is needed from the UE (or other receiver) in connection with the data-decoding information. As still another example, the data-decoding information may correspond to an indication that no HARQ-ACK feedback is needed from the UE (or other receiver) when the UE has received and/or decoded the encoded data.

In some aspects, the data-decoding information can be transmitted using any suitable channel, format, technique, or combination of techniques. For example, the data-decoding information can be transmitted using one or more of the following: radio resource control (RRC) message; one or more medium access control (MAC) control elements (MAC-CEs); downlink (DL) control information (DCI); sidelink (SL) control information (SCI) (e.g., scheduling physical sidelink shared channel (PUSCH)); DCI and/or SCI included in a PDSCH, physical downlink control channel (PDCCH), physical sidelink control channel (PSCCH), and/or physical sidelink shared channel (PDSCH) message; a dedicated PDSCH message; a dedicated PDSCH message; a message transmitted using a dedicated physical (PHY) layer channel (e.g., a PHY RS-info Indication Channel (PRICH)); and/or a CORESET ID and a corresponding search space (SS). Note that if a CORESET ID is used to convey data-decoding information the UE (or other receiver) may already be configured with one or more SSs and CORESETs for physical downlink control channel (PDCCH) monitoring. In some aspects, the additional CORESET and SS can be used by the UE (or other receiver) to identify the encoded messages transmitting for sensing purposes. According to one or more of the various techniques of this disclosure, the UE may inhibit the particular set of encoded messages from being used for other purposes (e.g., decoding the message fully to decode a full set of encoded data signals).

In a particular example, for data-decoding information conveyed via downlink (DL) control information (DCI) (e.g., to a first user equipment (UE)), the DCI can be conveyed via one or more downlink channels (e.g., a physical downlink DL control channel (PDCCH) and/or a physical DL shared channel (PDSCH), etc.), and/or can be one part or both parts of a 2-stage DCI.

In another particular example, for data-decoding information conveyed via sidelink (SL) control information (SCI) (e.g., to the first UE), the SCI can be conveyed (e.g., via a second UE, a road side unit, etc.) via one or more sidelink channels (e.g., a physical SL control channel (PSCCH) and/or a physical SL shared channel (PSSCH), etc.), and/or can be one part or both parts of a 2-stage SCI.

In some aspects, an indication corresponding to the data-decoding information can indicate if the data-decoding information is corresponding to a DL transmission, a UL transmission, and/or an SL transmission.

In some aspects, the encoded data items (e.g., one or more encoded data packets, encoded data signals, encoded data, etc.) corresponding to the data-decoding information can be sent over one or more of the following channels: a PDSCH, a PUSCH, a PUCCH, a PDCCH, a PSSCH, a PSCCH; and/or any other suitable signal. Encoded data items sent over an encoded channel may be considered a message of that encoded channel. In an illustrative and non-limiting example, an encoded message sent via a PDSCH includes a PDSCH message.

Figure 18:
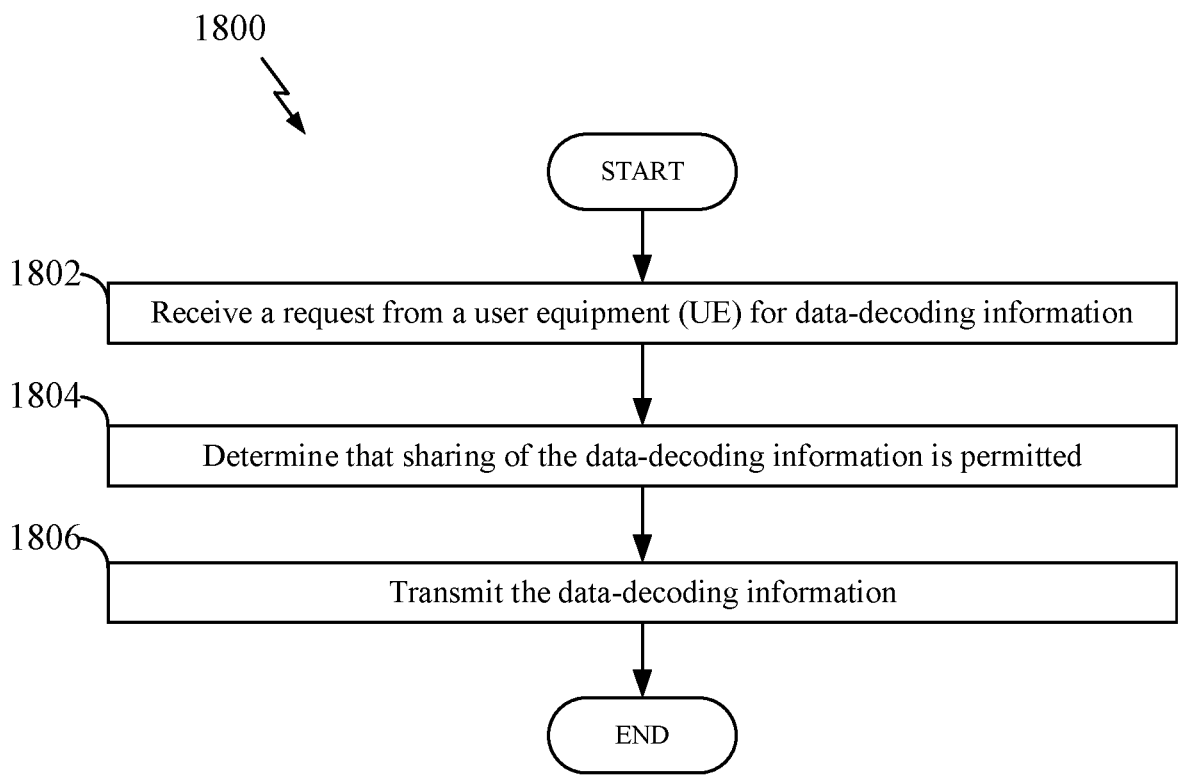
FIG. 18 is a flow chart illustrating an example process for an entity sharing data-decoding information corresponding to its own signal transmissions, in accordance with one or more of the various techniques of this disclosure.

FIG. 18 is a flow chart illustrating an example process for an entity sharing data-decoding information corresponding to its own transmissions, in accordance with one or more of the various techniques of this disclosure, and is described as an illustrative example without limitation. As described below, some or all illustrated features can be omitted in a particular implementation within the scope of the disclosed subject matter, and some illustrated features may not be required for implementation of all embodiments. In some examples, process 1800 can be carried out (e.g., executed) by a scheduled entity or a scheduling entity described above in connection with FIGS. 11 and 12, and/or by base station 108 or UE 106 described above in connection with FIG. 1. In some examples, process 1800 can be carried out by any suitable apparatus or means for carrying out the functions or algorithm described below.

At 1802, an entity (e.g., a user equipment (UE), a base station (BS), a road side unit (RSU), etc.) can receive a request from a UE (or other receiver) for data-decoding information. In some aspects, the entity can receive the request for data-decoding information in one or more messages and/or information elements (IEs) transmitted using any suitable communication network (e.g., via a network, such as RAN 104 or RAN 200, using one or more uplink (UL) slots and/or one or more downlink (DL) slots; or via one or more peer-to-peer (P2P) connections, vehicle-to-everything (V2X) connections, etc., utilizing any suitable technique or combination of techniques, such as sidelink (SL) communications, Bluetooth communications, etc.).

In some examples, the request for data-decoding information may correspond to an explicit indication that the requested data-decoding information is for use in a multi-node passive sensing process.

At 1804, the entity can determine that sharing of the data-decoding information is permitted. For example, in some aspects, the entity can determine that the data-decoding information can be shared for the purpose of multi-node passive sensing. In a more particular example, the entity can determine that the data-decoding information can be shared for the purpose of multi-node passive sensing based on an explicit indication (e.g., in memory) that the data-decoding information can be shared for the purpose of multi-node passive sensing. In some aspects, process 1800 can end if the request at 1802 was not corresponding to an explicit indication that the requested data-decoding information is for use in a multi-node passive sensing process and/or if the data-decoding information cannot be shared with receivers for multi-node passive sensing. Additionally or alternatively, in some aspects, the entity can determine not to share the data-decoding information for any other suitable reason.

At 1806, the entity can transmit data-decoding information corresponding to the entity's encoded signal transmissions to the UE (or other receiver) that requested data-decoding information at 1802. In some aspects, the entity can transmit the data-decoding information in one or more messages and/or information elements (IEs) transmitted using any suitable communication network (e.g., via a network, such as RAN 104 or RAN 200, using one or more uplink (UL) slots and/or one or more downlink (DL) slots; or via one or more peer-to-peer (P2P) connections, vehicle-to-everything (V2X) connections, etc., utilizing any suitable technique or combination of techniques, such as sidelink (SL) communications, Bluetooth communications, etc.).

In some examples, the data-decoding information may correspond to one or more dependencies that control the use of the data-decoding information as described above in connection with block 1708. In some aspects, the data-decoding information can be transmitted using any suitable technique or combination of techniques, such as techniques described above in connection with FIG. 17. In some aspects, an indication corresponding to the data-decoding information can indicate if the data-decoding information is corresponding to a downlink (DL) transmission, an uplink (UL) transmission, and/or a sidelink (SL) transmission.

In some aspects, the encoded transmission (e.g., including one or more packets) corresponding to the data-decoding information can be one or more of the following types of transmission: a PDSCH transmission, a PUSCH transmission, a PUCCH transmission, a PDCCH transmission, a PSSCH transmission, a PSCCH transmission, and/or any other suitable type of transmission.

Examples for Utilizing Data-Decoding Information

Figure 19:
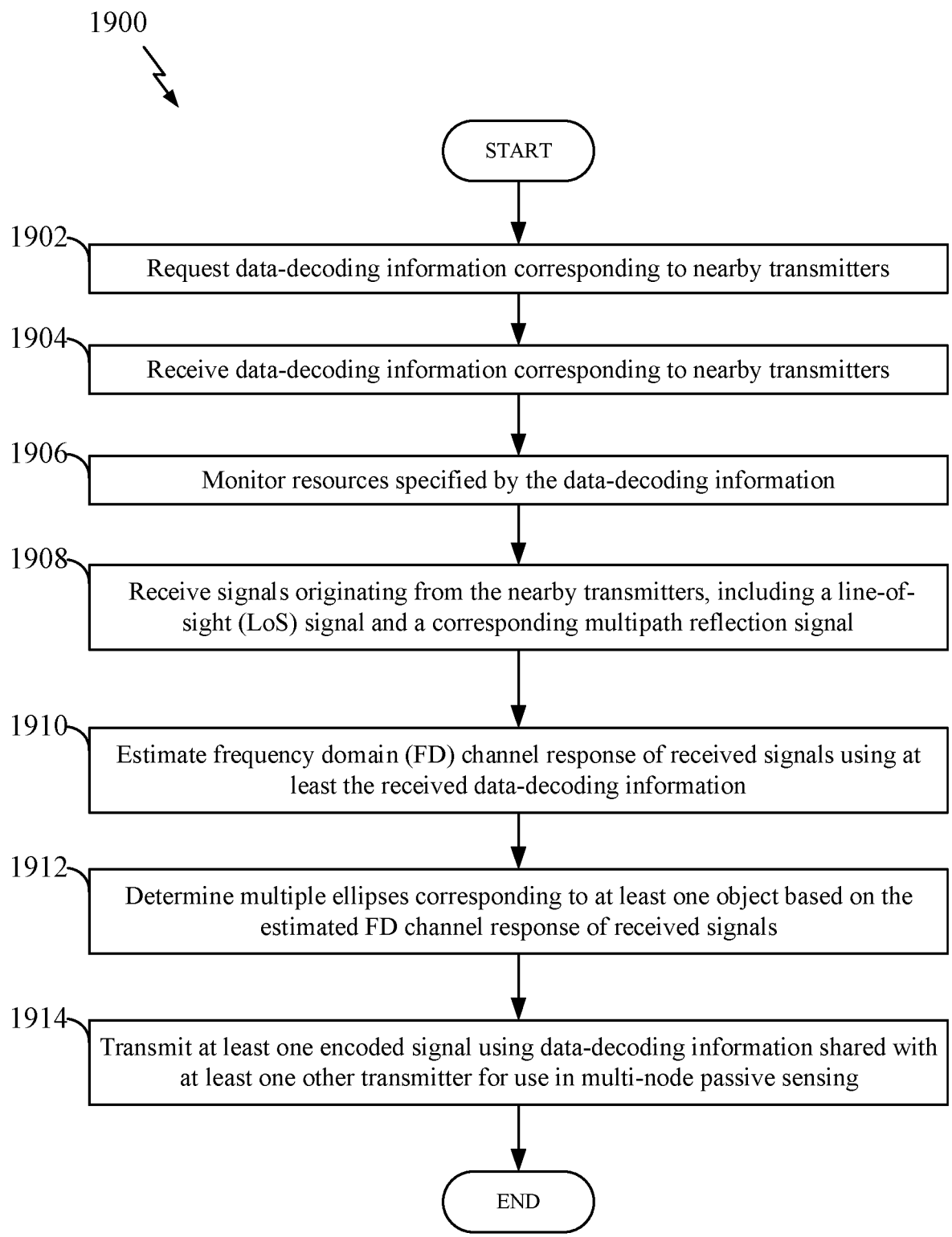
FIG. 19 is a flow chart illustrating an example process for using data-decoding information to facilitate multi-node passive sensing, in accordance with one or more of the various techniques of this disclosure.

FIG. 19 is a flow chart illustrating an example process for using data-decoding information to facilitate multi-node passive sensing, in accordance with one or more of the various techniques of this disclosure, and is described as an illustrative example without limitation. As described below, some or all illustrated features can be omitted in a particular implementation within the scope of the disclosed subject matter, and some illustrated features may not be required for implementation of all embodiments. In some examples, process 1900 can be carried out (e.g., executed) by a scheduled entity or a scheduling entity described above in connection with FIGS. 11 and 12, and/or by base station 108 or UE 106 described above in connection with FIG. 1. In some examples, process 1900 can be carried out by any suitable apparatus or means for carrying out the functions or algorithm described below.

At block 1902, a receiver (e.g., a user equipment (UE), a base station (BS), a road side unit (RSU), etc.) can request data-decoding information corresponding to one or more nearby transmitters (e.g., one or more UEs, base stations, RSUs, etc.). In some aspects, the receiver can request data-decoding information using one or more messages and/or information elements (IEs) transmitted using any suitable communication network (e.g., via a network, such as RAN 104 or RAN 200, using one or more uplink (UL) slots and/or one or more downlink (DL) slots; or via one or more peer-to-peer (P2P) connections, vehicle-to-everything (V2X) connections, etc., utilizing any suitable technique or combination of techniques, such as sidelink (SL) communications, Bluetooth communications, etc.).

In some examples, the receiver can request the data-decoding information from any suitable transmitter or transmitters. For example, the receiver can request the data-decoding information from a base station (BS) during uplink (UL). As another example, the receiver can request the data-decoding information from a UE during downlink (DL) (e.g., if the receiver is a base station). As yet another example, the receiver can request the data-decoding information from another entity via a sidelink (SL) connection. In some aspects, an entity executing process 1900 may omit executing functions corresponding to block 1902. For example, a transmitter can provide data-decoding information that is not sent in response to an explicit request from the receiver (e.g., a request can come from another entity, such as a base station, or from the core network).

At block 1904, the receiver can receive data-decoding information corresponding to one or more transmitters. In some aspects, the receiver can receive data-decoding information in one or more messages and/or information elements (IEs) transmitted using any suitable communication network (e.g., via a network, such as RAN 104 or RAN 200, using one or more uplink (UL) slots and/or one or more downlink (DL) slots; or via one or more peer-to-peer (P2P) connections, vehicle-to-everything (V2X) connections, etc., utilizing any suitable technique or combination of techniques, such as sidelink (SL) communications, Bluetooth communications, etc.).

In some examples, the data-decoding information can include information about multiple types of transmission sent by a particular transmitter. In some aspects, the data-decoding information may correspond to one or more dependencies that control the use of the data-decoding information as described above in connection with block 1708. In some aspects, the data-decoding information can be received using any suitable technique or combination of techniques, such as techniques described above in connection with FIG. 17. In some aspects, an indication corresponding to the data-decoding information can indicate if the data-decoding is corresponding to a downlink (DL) transmission, an uplink (UL) transmission, and/or a sidelink (SL) transmission.

In some aspects, the encoded transmission corresponding to the data-decoding information can be one or more of the following types of transmission: a PDSCH transmission, a PUSCH transmission, a PUCCH transmission, a PDCCH transmission, a PSSCH transmission, a PSCCH transmission, and/or any other suitable type of transmission.

At block 1906, the receiver can monitor resources specified by data-decoding information corresponding to one or more nearby transmitters. For example, the receiver can monitor FD-TD resources corresponding to the data-decoding information using one or more transceivers. In a more particular example, the receiver can attempt to detect encoded signals corresponding to FD-TD resources corresponding to the data-decoding information by sampling and buffering a received wireless signal, and applying suitable processing to the buffered signal such as energy detection, demodulation, decoding, etc.

At block 1908, the receiver can receive encoded transmissions (e.g., including one or more packets, transport blocks (TBs), etc.) originating from one or more nearby transmitters. As described above in connection with FIGS. 3 to 5, the same signal transmitted by a particular transmitter can be received multiple times, including as a line-of-sight (LoS) signal and as one or more multipath reflection signals (e.g., backscattered signals). In instances where the receiver has access to the RS-info and/or data-decoding information, the receiver can estimate the channel over which the encoded signal is sent, and can decode the physical (PHY) layer of the encoded signal corresponding to the data-decoding information. Without data-decoding information, the receiver may not decode an encoded signal even if the receiver has received a reference signal corresponding to the channel and/or has estimated the channel response.

At block 1910, the receiver can estimate a frequency domain (FD) channel response of the received signals using the received data-decoding information. In some aspects, the receiver can estimate the FD channel response using any suitable technique or combination of techniques. For example, the receiver can estimate the FD channel response, for example, by determining channel coefficients for a plurality of antenna ports. In some aspects, the receiver can estimate the FD channel response for encoded signals received from multiple transmitters.

At block 1912, the receiver can determine ellipses corresponding to an object based on the estimated frequency domain (FD) channel response of various signals. In some aspects, the receiver can determine ellipses using any suitable technique or combination of techniques. For example, the receiver can determine ellipses corresponding to encoded signals received from various transmitters using techniques described herein, for example, with reference to FIGS. 3 to 5.

At block 1914, the receiver can act as a transmitter, and can transmit an encoded signal using data encoding information corresponding to data-decoding information that has been shared with at least one other transmitter for use in multi-node passive sensing. For example, the receiver can act as a portion of a multi-node passive sensing system that can be used by other receivers to locate objects in the environment. In some aspects, the receiver can transmit the data-decoding information in one or more messages and/or information elements (IEs) transmitted using any suitable communication network (e.g., via a network, such as RAN 104 or RAN 200, using one or more uplink (UL) slots and/or one or more downlink (DL) slots; or via one or more peer-to-peer (P2P) connections, vehicle-to-everything (V2X) connections, etc., utilizing any suitable technique or combination of techniques, such as sidelink (SL) communications, Bluetooth communications, etc.).

In one configuration, the apparatus 1100 and/or 1200 for wireless communication includes means for collecting and/or sharing data-decoding information and/or reference signal information (RS-info) (e.g., a set of RS-info parameters, reference signal (RS) configuration information, RS monitoring and/or reception data, etc.), means for monitoring resources for one or more encoded signals and/or one or more reference signals (RSs), and/or means for receiving data-decoding information and/or RS-info. In some aspects, the aforementioned means can be the processor(s) 1104 and/or 1204 described above in connection with FIGS. 11 and 12 configured to perform the functions recited by the aforementioned means. Additionally or alternatively, in some aspects, the aforementioned means can be a circuit or any apparatus configured to perform the functions recited by the aforementioned means.

Of course, in the above examples, the circuitry included in the processor 1104 and/or processor 1204 is merely provided as an example, and other means for carrying out the described functions can be included within various aspects of the present disclosure, including but not limited to the instructions stored in the computer-readable storage medium 1106 and/or 1206, or any other suitable apparatus or means described in any one of the FIGS. 1 and/or 2, and utilizing, for example, the processes and/or algorithms described with reference to any one or more of FIGS. 13 to 19.

FURTHER EXAMPLES HAVING A VARIETY OF FEATURES

Example 1: A method for receiving, by a first entity (e.g., a first user equipment (UE)), a transmission configuration message including: (i) reference signal information (RS-info) corresponding to a set of reference signals (RSs) transmitted between a second entity (e.g., a base station, a sidelink UE, or a road side unit) and a third entity (e.g., a second UE, a second base station, a second road side unit), and/or (ii) data-decoding information indicative of a first set of data-decoding parameters corresponding to the second entity and/or the third entity; and monitoring, by the first entity, for at least one of: (i) the set of RSs based on the RS-info, or (ii) the set of encoded signals on one or more encoded channels based on the data-decoding information.

Example 2: A method according to Example 1, further including: receiving at least one of: (i) the set of RSs based on the RS-info, or (ii) the set of encoded signals based on the data-decoding information; and determining information relating to a spatial location of an object proximate the UE based on at least one of: (i) the set of encoded signals, or (ii) the set of RSs.

Example 3: A method according to any one of Examples 1 or 2, further including: omitting transmission of hybrid automatic repeat request (HARQ) feedback in connection with reception of one or more of: (i) the RS-info, (ii) the set of RSs received using the RS-info, (iii) the data-decoding information, or (iv) the set of encoded signals.

Example 4: A method according to Example 3, further including: receiving a second set of RSs, the second set of RSs including at least one line-of-sight (LoS) signal targeting the first UE, and at least one corresponding reflection signal; and transmitting one or more feedback messages indicating receipt of the second set of RSs.

Example 5: A method according to any one or more of Examples 1 to 4, wherein the transmission configuration message includes one or more of: a radio resource control (RRC) configuration message; one or more medium access control (MAC) control elements (MAC-CEs); downlink control information (DCI); a physical downlink shared channel (PDSCH) message; sidelink control information (SCI); a physical sidelink shared channel (PSSCH) message; a message transmitted using a physical (PHY) layer channel; a control resource set (CORESET) identifier (ID) and a corresponding search space (SS); a physical RS-info channel including the RS-info; a physical data-decoding channel including the data-decoding information; or a physical transmission configuration channel including the data-decoding information and the RS-info.

Example 6: A method according to any one or more of Examples 1 to 5, wherein the RS-info indicates that at least one reference signal (RS) from the set of RSs corresponds to at least one first slot, and wherein the data-decoding information indicates that at least one encoded signal from the set of encoded signals corresponds to the at least one first slot or at least one second slot other.

Example 7: A method according to any one or more of Examples 1 to 6, wherein the monitoring for the set of RSs based on the RS-info includes: utilizing the RS-info to determine the set of resource elements to monitor for at least one of: (i) a demodulation reference signal (DMRS), (ii) a channel state information reference signal (CSI-RS), (iii) a channel state information tracking reference signal (CSI-TRS), (iv) a positioning reference signal (PRS), (v) a phase tracking reference signal (PTRS), or (vi) a sounding reference signal (SRS). And monitoring for the set of encoded signals based on the data-decoding information includes: utilizing the data-decoding information to decode at least one encoded channel (e.g., one or more of: a physical downlink shared channel (PDSCH), a physical downlink control channel (PDCCH), a physical uplink shared channel (PUSCH), a physical uplink control channel (PUCCH), a physical sidelink shared channel (PSSCH), or a physical sidelink control channel (PSCCH).

Example 8: A method according to any one or more of Examples 1 to 7, wherein the set of resource parameters include at least one of: (i) a frequency domain (FD) property indicative of the set of resource parameters for the first UE to monitor; or (ii) a time domain (TD) property indicative of the set of resource parameters for the first UE to monitor.

Example 9: A method according to Example 8, wherein the frequency domain (FD) property of the set of resource parameters includes an indication of one or more of the following: one or more physical resource blocks (PRBs); one or more bandwidth parts (BWPs), one or more component carriers (CCs), one or more subcarriers, or at least one radio access technology (RAT).

Example 10: A method according to any one or more of Examples 8 or 9, wherein the time domain (TD) property of the set of resource parameters includes an indication of one or more of the following: one or more symbols, one or more slots, one or more subframes, or one or more frames.

Example 11: A method according to any one or more of Examples 1 to 8, wherein the RS-info includes information relating to one or more port IDs or one or more scrambling IDs for the first UE to monitor for the set of RSs, and wherein the data-decoding information includes information relating to one or more port IDs or one or more scrambling IDs for the first UE to monitor for the set of encoded signals on the one or more channels.

Example 12: A wireless communication device, including: a transceiver; memory; and a processor communicatively coupled to the transceiver and the memory, the processor configured to: receive, via the transceiver, a message including at least one of: (i) a set of reference signal information (RS-info) parameters relating to one or more reference signals (RSs) corresponding to at least one line-of-sight (LoS) signal targeting one or more receiving devices distinct and separate from the wireless communication device, or (ii) a set of data-decoding information parameters relating to data that is scheduled for purposes of communications with the one or more receiving devices via the at least one line-of-sight (LoS) signal targeting the one or more receiving devices; and monitor, using the transceiver, for at least one of: (i) a set of RSs based on the set of RS-info parameters, or (ii) a set of encoded signals based on the set of data-decoding information parameters.

Example 13: A wireless communication device according to Example 12, wherein to monitor for the set of RSs, the processor is configured to: utilize the set of RS-info parameters to receive a first reference signal (RS); and determine information relating to a spatial location of an object proximate the wireless communication device based on the first RS, and wherein to monitor for the set of encoded signals, the processor is configured to: utilize the set of data-decoding information parameters to receive a first encoded signal; and determine information relating to a spatial location of an object proximate the wireless communication device based on the first encoded signal.

Example 14: A wireless communication device according to any one of Examples 12 or 13, wherein the processor is further configured to: omit transmission of feedback in connection with reception of the set of RS-info parameters, or in connection with reception of the set of RSs, and wherein the processor is further configured to: omit transmission of feedback in connection with reception of the set of data-decoding information parameters, or in connection with reception of the set of encoded signals.

Example 15: A wireless communication device according to any one or more of Examples 12 to 14, wherein the set of RS-info parameters includes an indication that a first RS of the set of RSs corresponds to one of the following: a downlink (DL) slot, an uplink (UL) slot, or a sidelink (SL) slot, and wherein the set of data-decoding information parameters includes an indication that a first encoded signal of the set of encoded signals corresponds to one of the following: a downlink (DL) slot, an uplink (UL) slot, or a sidelink (SL) slot.

Example 16: A wireless communication device according to any one or more of Examples 12 to 16, wherein to monitor for the set of RSs, the processor is configured to: utilize the set of RS-info parameters to receive at least one first reference signal (RS) of the set of RSs, wherein the at least one first RS corresponds to the at least one line-of-sight (LoS) signal targeting the one or more receiving devices, and wherein to monitor for the set of encoded signals, the processor is configured to: utilize the set of data-decoding information parameters to receive at least one first encoded signal of the set of encoded signals, wherein the at least one first encoded signal includes a multipath reflection signal corresponding to the at least one line-of-sight (LoS) signal targeting the one or more receiving devices.

Example 17: A wireless communication device according to Example 16, wherein the at least one first RS includes at least one of: (i) a demodulation reference signal (DMRS), (ii) a channel state information reference signal (CSI-RS), (iii) a channel state information tracking reference signal (CSI-TRS), (iv) a positioning reference signal (PRS), (v) a phase tracking reference signal (PTRS), or (vi) a sounding reference signal (SRS); and wherein the at least one first encoded signal includes at least one of: (i) a physical downlink shared channel (PDSCH) message; (ii) a physical uplink shared channel (PUSCH) message; (iii) a physical uplink control channel (PUCCH) message; (iv) a physical downlink control channel (PDCCH) message; (v) a physical sidelink shared channel (PSSCH) message; or (vi) a physical sidelink control channel (PSCCH) message.

Example 18: A wireless communication device according to any one or more of Examples 12 to 17, wherein the set of RS-info parameters includes a set of resource parameters corresponding to a set of resources for the wireless communication device to monitor for the one or more RSs, and wherein the data-decoding information includes a set of resource parameters corresponding to a set of resources for the wireless communication device to monitor for the encoded signals.

Example 19: A wireless communication device according to Example 18, wherein the set of resource parameters includes at least one of: a frequency domain (FD) property corresponding to the set of resource parameters; or a time domain property (TD) corresponding to the set of resource parameters.

Example 20: A wireless communication device according to Example 19, wherein the FD property of the set of resource parameters includes an indication of one or more of the following: one or more physical resource blocks (PRBs); one or more bandwidth parts (BWPs); one or more component carriers (CCs); one or more subcarriers; or at least one radio access technology (RAT).

Example 21: A wireless communication device according to any one or more of Examples 18 to 20, wherein the TD property of the set of resource parameters includes an indication of one or more of the following: one or more symbols; one or more slots; one or more subframes; or one or more frames.

Example 22: A wireless communication device according to any one or more of Examples 18 to 21, wherein the set of resource parameters includes one or more of: a UE-specific identifier (ID) for identifying a demodulation reference signal (DMRS)-sequence; at least one orthogonal frequency division multiplexing (OFDM) symbol index corresponding to a DMRS; a comb type; a DMRS port ID; a code division multiplexing (CDM)-group ID; an energy per resource element (EPRE)-ratio with data symbols; or quasi co-location (QCL) information, or a parameter specifying one or more DCI formats to monitor for the encoded signals; a parameter specifying a DCI format carried on PSSCH; or a parameter specifying SCI carried on PSSCH, or a radio network temporary identifier (RNTI); a scrambling ID; a frequency domain resource assignment (FDRA); a time domain resource assignment (TDRA); or a UE-specific ID for identifying a DMRS-sequence.

Example 23: A wireless communication device according to any one or more of Examples 12 to 22, wherein the set of RS-info parameters includes information identifying a plurality of sets of resources, wherein a first set of the plurality of sets of resources at least partially overlaps in frequency and/or time with a second set of the plurality of sets of resources, and wherein the first set of the plurality of sets of resources corresponds to a different port ID or a different scrambling ID than that of the second set of the plurality of sets of resources; and wherein the set of data-decoding information parameters includes information identifying a plurality of resources, wherein a first set of resources of the plurality of resources at least partially overlaps in frequency and/or time with a second set of resources of the plurality of resources, and wherein the first set of resources of the plurality of resources corresponds to a port ID or a scrambling ID that is different from that of the second set of resources of the plurality of resources.

Example 24: A wireless communication device according to any one or more of Examples 12 to 23, wherein the set of RS-info parameters includes information relating to one or more port IDs or one or more scrambling IDs for the device to monitor for the one or more RSs, and wherein the set of data-decoding information parameters includes information relating to one or more port IDs or one or more scrambling IDs for the device to monitor for encoded signals on the one or more channels.

Example 25: An apparatus for wireless communication, including: means for receiving, by a first user equipment (UE), a message including at least one of: (i) a set of reference signal information (RS-info) parameters relating to one or more reference signals (RSs) corresponding to at least one line-of-sight (LoS) signal targeting one or more other devices distinct and separate from the first UE, or (ii) a set of data-decoding information parameters relating to data that is scheduled for purposes of communications with the one or more other devices via the at least one line-of-sight (LoS) signal targeting the one or more other devices; and means for monitoring for at least one of: (i) a set of RSs based on the set of RS-info parameters, or (ii) a set of encoded signals based on the data-decoding information parameters.

Example 26: An apparatus according to Example 25, further including: means for receiving at least one of: (i) a first reference signal (RS) based on the set of reference signal information (RS-info) parameters, or (ii) a first encoded signal based on the data-decoding information parameters; and means for determining information relating to a spatial location of an object proximate the first UE based at least in part on at least one of: (i) the first RS, or (ii) the first encoded signal.

Example 27: An apparatus according to any one or more of Examples 25 or 26, wherein the set of RS-info parameters includes an indication that a first RS of the set of RSs corresponds to one of the following: a downlink (DL) slot, an uplink (UL) slot, or a sidelink (SL) slot, and wherein the set of data-decoding information parameters includes an indication that a first encoded signal of the set of encoded signals corresponds to one of the following: a downlink (DL) slot, an uplink (UL) slot, or a sidelink (SL) slot.

Example 28: An apparatus according to any one or more of Examples 25 to 27, wherein the set of RS-info parameters includes a set of resource parameters corresponding to a set of resources for the first UE to monitor for the one or more RSs, and wherein the data-decoding information includes a set of resource parameters corresponding to a set of resources for the first UE to monitor for the encoded signals.

Example 29: A scheduling entity for wireless communication, comprising: a transceiver; memory; and a processor communicatively coupled to the transceiver and the memory, the processor configured to: receive, via the transceiver, at least one of: (i) a set of reference signal information (RS-info) parameters including a set of resource parameters corresponding to one or more reference signals (RSs) targeting a plurality of receiving devices, or (ii) a set of data-decoding information parameters including a set of decoding parameters for decoding a set of encoded signals transmitted to a plurality of receiving devices over one or more encoded channels; receive, via the transceiver, a request from a first user equipment (UE) for at least one of: (i) the set of RS-info parameters, wherein the RS-info parameters includes information relating to one or more reference signals (RSs) that target at least one second UE other than the first UE, or (ii) the data-decoding information parameters, wherein the data-decoding information corresponds to a data-decoding for at least one data item scheduled for at least one second UE; and transmit, via the transceiver, a message to the first UE, wherein the message includes at least one of: (i) the set of RS-info parameters, or (ii) the set of data-decoding information parameters.

Example 30: A scheduling entity according to Example 29, wherein the processor is further configured to: utilize the set of RS-info parameters to monitor for a set of corresponding RSs; or utilize the set of data-decoding information parameters to monitor for a set of corresponding encoded signals on one or more encoded channels.

Example 31: An apparatus including means for receiving spatial location information relating to one or more objects (e.g., ellipse coordinates) from a set of entities performing a multi-node passive sensing of objects in a network environment. The apparatus further includes means for transmitting transmission configuration information to the set of entities performing the multi-node passive sensing of objects in the network environment. In addition, or alternatively, the apparatus further includes means for storing the spatial location information to memory (e.g., memory of a server), and the apparatus may further include means for fusing the spatial location information to determine a location of a potential object relative to the set of entities in the network environment.

Example 1A: A method, apparatus, system, and non-transitory computer-readable medium for wireless communication, including: receiving, by a user equipment (UE), a first set of reference signal information (RS-info) parameters (e.g., reference signal configuration information, resource monitoring information, etc.) corresponding to a first transmitter; monitoring resources based on the RS-info; receiving a first reference signal (RS) transmitted by the first transmitter; receiving a multipath reflection of the first RS transmitted by the first transmitter; and determining a first set of ellipse information parameters (e.g., coordinate values) corresponding to possible locations of an object based on a time delay between reception of the first RS and reception of the multipath reflection of the first RS.

Example 2A: A method, apparatus, system, and non-transitory computer-readable medium according to Example 1A, further including: receiving, by the first UE, a second set of RS-info parameters corresponding to a second transmitter; monitoring resources based on the second set of RS-info parameters corresponding to the second transmitter; receiving a second RS from the second transmitter; receiving a multipath reflection of the second RS; determining a second set of ellipse information parameters corresponding to possible locations of the object based on time delays between reception of the second RS received from the second transmitter and reception of the multipath reflection of the second RS; and estimating a location of the object based at least in part on a first ellipse corresponding to the first set of ellipse information parameters and a second ellipse corresponding to the second set of ellipse information parameters.

Example 3A: A method, apparatus, system, and non-transitory computer-readable medium according to any one or more of Examples 1A to 2A, further including receiving the first set of RS-info parameters and/or the second set of RS-info parameters from one or more base stations (BSs).

Example 4A: A method, apparatus, system, and non-transitory computer-readable medium according to any one or more of Examples 2A to 3A, wherein the second transmitter includes one or more of: a road side unit (RSU) and/or a data server.

Example 5A: A method, apparatus, system, and non-transitory computer-readable medium according to any one or more of Examples 1A to 4A, further including: receiving, by the UE, information about one or more ellipses determined by one or more other transmitters (e.g., the second transmitter, a third transmitter, and/or a fourth transmitter, etc.); and estimating the location of the object based on the first set of ellipse information parameters and the one or more ellipses.

Example 6A: A method, apparatus, system, and non-transitory computer-readable medium according to any one or more of Examples 1A to 5A, further including: decoding one or more transport blocks (TBs) corresponding to the reference signal (RS) transmitted by the transmitter; decoding one or more TBs of the multipath reflection of the RS transmitted by the transmitter; and determining the time delay based on the decoded one or more TBs of the RS transmitted by the transmitter and the one or more TBs of the multipath reflection of the RS transmitted by the transmitter.

Example 7A: A method, apparatus, system, and non-transitory computer-readable medium according to any one or more of Examples 1A to 6A, wherein receiving, by the UE, the RS-info corresponding to the first transmitter includes: receiving an indication that the UE omit HARQ-ACK feedback in connection with reception of a reference signal (RS) corresponding to the first set of RS-info parameters.

Example 8A: A method, apparatus, system, and non-transitory computer-readable medium according to any one or more of Examples 1A to 7A, wherein receiving, by the UE, the first set of RS-info parameters corresponding to the first transmitter includes receiving one or more of the following: radio resource control (RRC) configuration information; one or more medium access control (MAC) control elements (MAC-CEs); downlink control information (DCI); sidelink control information (SCI); a dedicated physical downlink shared channel (PDSCH) message; a dedicated physical sidelink shared channel (PDSCH) message; a message transmitted using a dedicated physical (PHY) layer channel (e.g., a PHY RS-info Indication Channel (PRICH)); and/or a control resource set (CORESET) identifier (ID) and a corresponding search space (SS).

Example 9A: A method, apparatus, system, and non-transitory computer-readable medium according to any one or more of Examples 1A to 8A, wherein receiving, by the UE, the RS-info corresponding to the transmitter includes: receiving an indication that the RS-info corresponds to a reference signal (RS) transmitted by the transmitter during one of the following: an uplink (UL) slot or a sidelink (SL) slot.

Example 10A: A method, apparatus, system, and non-transitory computer-readable medium according to any one or more of Examples 1A to 9A, wherein receiving, by the UE, the RS-info corresponding to the transmitter includes: receiving an indication that the RS-info corresponds to a reference signal (RS) transmitted to the transmitter during a downlink (DL) slot.

Example 11A: A method, apparatus, system, and non-transitory computer-readable medium according to any one or more of Examples 1A to 10A, wherein the reference signal (RS) corresponding to the RS-info includes: a demodulation reference signal (DMRS) for a physical uplink shared channel (PUSCH); a DMRS for a physical downlink shared channel (PDSCH), a DMRS for a physical uplink control channel (PUCCH), a DMRS for a physical downlink control channel (PDCCH); a channel state information (CSI)-RS; a CSI tracking reference signal (CSI-TRS); a positioning reference signal (PRS); a phase tracking reference signal (PTRS); or a sounding reference signal (SRS).

Example 12A: A method, apparatus, system, and non-transitory computer-readable medium according to any one or more of Examples 1A to 11A, wherein the RS-info includes: an RS pattern corresponding to a combination of frequency domain resources and time domain resources.

Example 13A: A method, apparatus, system, and non-transitory computer-readable medium according to Example 12A, wherein the RS pattern corresponds to at least one physical resource block in the frequency domain, and at least one symbol in the time domain.

Example 14A: A method, apparatus, system, and non-transitory computer-readable medium according to any one or more of Examples 1A to 13A, wherein the RS-info includes one or more of the following: a UE-specific ID for identifying a demodulation reference signal (DMRS)-sequence; at least one an orthogonal frequency division multiplexing (OFDM) symbol index corresponding to a DMRS; a comb type used by the transmitter; a DMRS port ID; a code division multiplexing (CDM)-group ID corresponding to the transmitter; an energy per resource element (EPRE)-ratio with data symbols; and/or quasi co-location (QCL) information.

Example 15A: A method, apparatus, system, and non-transitory computer-readable medium according to any one or more of Examples 1A to 14A, wherein the RS-info includes one or more of the following: multiple DMRS port IDs; and/or multiple DMRS scrambling IDs.

Example 16A: A method, apparatus, system, and non-transitory computer-readable medium, including: receiving, by a scheduling entity, reference signal information (RS-info) corresponding to one or more transmitters; receiving, by the scheduling entity, a request from a user equipment (UE) for RS-info corresponding to one or more nearby transmitters; in response to the request from the UE for RS-info corresponding to one or more nearby transmitters, transmitting the RS-info corresponding to the one or more transmitters to the UE.

Example 17A: A method, apparatus, system, and non-transitory computer-readable medium according to any one or more of Examples 1A to 15A, further including: receiving, by a scheduling entity, reference signal information (RS-info) corresponding to one or more transmitters; receiving, by the scheduling entity, a request from a user equipment (UE) for RS-info corresponding to one or more nearby transmitters; in response to the request from the UE for RS-info corresponding to one or more nearby transmitters, transmitting the RS-info corresponding to the one or more transmitters to the UE.

Example 18A: A method, apparatus, system, and non-transitory computer-readable medium according to any one or more of Examples 1A to 17A, further including: monitoring resources based on the RS-info corresponding to the one or more transmitters; receiving a RS transmitted by each of the one or more transmitters; receiving a multipath reflection of the RS transmitted by each of the one or more transmitters; determining one or more ellipses corresponding to possible locations of an object based on a time delay between reception of the RS transmitted by each of the one or more transmitters and reception of the multipath reflection of the RS transmitted by each of the one or more transmitters; and determining a location of the object based on the first ellipse and the one or more ellipses.

Example 19A: A method, apparatus, system, and non-transitory computer-readable medium according to any one or more of Examples 16A to 18A, further including: receiving, by the scheduling entity, information about one or more ellipses determined by one or more receivers, including the UE; and estimating a location of an object based on the one or more ellipses.

Example 20A: A method, apparatus, system, and non-transitory computer-readable medium for wireless communication, including: receiving, by a user equipment (UE), a message including reference signal (RS) information (RS-info) relating to one or more reference signals (RSs) that target a receiver other than the UE; and monitoring for one or more RSs based on the RS-info.

Example 21A: A method, apparatus, system, and non-transitory computer-readable medium according to Example 20A, further including: receiving an RS based on the RS information; and determining information relating to a spatial location of an object proximate the UE by passive radar sensing based on the received RS.

Example 22A: A method, apparatus, system, and non-transitory computer-readable medium according to any one or more of Examples 20A to 21A, further including omitting transmission of HARQ-ACK feedback in connection with the RS information.

Example 23A: A method, apparatus, system, and non-transitory computer-readable medium according to any one or more of Examples 20A to 22A, wherein the message includes one or more of the following: a radio resource control (RRC) configuration message; one or more MAC control elements (MAC-CEs); downlink control information (DCI); sidelink control information (SCI); a physical downlink shared channel (PDSCH) message; a physical sidelink shared channel (PSSCH) message; a message transmitted using a dedicated physical (PHY) layer channel; and/or a control resource set (CORESET) identifier (ID) and a corresponding search space (SS).

Example 24A: A method, apparatus, system, and non-transitory computer-readable medium according to any one or more of Examples 20A to 23A, wherein the RS information includes an indication that the RS information is corresponding to an RS transmitted utilizing one of the following: a downlink (DL) slot, an uplink (UL) slot, or a sidelink (SL) slot.

Example 25A: A method, apparatus, system, and non-transitory computer-readable medium according to any one or more of Examples 20A to 24A, further including: receiving an RS based on the RS information, wherein the RS is one of the following: a demodulation reference signal (DMRS) for a physical uplink shared channel (PUSCH); a DMRS for a physical downlink shared channel (PDSCH), a DMRS for a physical uplink control channel (PUCCH), a DMRS for a physical downlink control channel (PDCCH); a channel state information (CSI)-RS; a CSI tracking reference signal (CSI-TRS); a positioning reference signal (PRS); a phase tracking reference signal (PTRS); and/or a sounding reference signal (SRS).

Example 26A: A method, apparatus, system, and non-transitory computer-readable medium according to any one or more of Examples 20A to 25A, wherein the information relating to the one or more RSs includes information relating to a set of resources for the UE to monitor for the one or more RSs.

Example 27A: A method, apparatus, system, and non-transitory computer-readable medium according to any one or more of Examples 20A to 26A, wherein the information relating to the set of resources for the UE to monitor for the one or more RSs includes at least one of: a frequency domain (FD) property of the set of resources; and/or a time domain (TD) property of the set of resources.

Example 28A: A method, apparatus, system, and non-transitory computer-readable medium according to any one or more of Examples 20A to 27A, wherein the frequency domain property of the set of resources includes an indication of one or more of the following: one or more physical resource blocks (PRBs); one or more bandwidth parts (BWPs); one or more component carriers (CCs); one or more subcarrier components; and/or at least one radio access technology (RAT).

Example 29A: A method, apparatus, system, and non-transitory computer-readable medium according to any one or more of Examples 20A to 28A, wherein the time domain property of the set of resources includes an indication of one or more of the following: one or more symbols; one or more slots; one or more subframes; and/or one or more frames.

Example 30A: A method, apparatus, system, and non-transitory computer-readable medium according to any one or more of Examples 20A to 29A, wherein the information relating to the set of resources for the UE to monitor for the one or more RSs includes: the frequency domain property of the set of resources; and the time domain property of the set of resources Example 31A: A method, apparatus, system, and non-transitory computer-readable medium according to any one or more of Examples 20A to 30A, wherein the information relating to the set of resources for the UE to monitor for the one or more RSs includes at least one: a frequency domain property of each set of a plurality of sets of resources including the set of resources; or a time domain property of each set of a plurality of sets of resources including the set of resources.

Example 32A: A method, apparatus, system, and non-transitory computer-readable medium according to any one or more of Examples 20A to 31A, wherein at least one set of the plurality of sets of resources overlaps in frequency and/or time with at least one other set of the plurality of sets of resources.

Example 33A: A method, apparatus, system, and non-transitory computer-readable medium according to any one or more of Examples 20A to 32A, wherein the information relating to the one or more RSs includes one or more resource parameters corresponding to resources for the UE to monitor for the one or more RSs.

Example 34A: A method, apparatus, system, and non-transitory computer-readable medium according to any one or more of Examples 20A to 33A, wherein the one or more resource parameters corresponding to the resources for the UE to monitor for the one or more RSs includes one or more of the following: a UE-specific identifier (ID) for identifying a demodulation reference signal (DMRS)-sequence; at least one orthogonal frequency division multiplexing (OFDM) symbol index corresponding to a DMRS; a comb type corresponding to the one or more RSs; a DMRS port ID; a code division multiplexing (CDM)-group ID corresponding to the one or more RSs; an energy per resource element (EPRE)-ratio with data symbols; or quasi co-location (QCL) information.

Example 35A: A method, apparatus, system, and non-transitory computer-readable medium according to any one or more of Examples 20A to 34A, wherein the information relating to the one or more RSs includes information relating to one or more port IDs or one or more scrambling IDs for the UE to monitor for the RSs.

Example 36A: A method, apparatus, system, and non-transitory computer-readable medium according to any one or more of Examples 20A to 35A, wherein the information relating to the one or more RSs includes information identifying a plurality of sets of resources, wherein a first set of the plurality of sets of resources at least partially overlaps in frequency and/or time with a second set of the plurality of sets of resources, and wherein the first set is corresponding to a different port ID or a different scrambling ID than that of the second set.

Example 37A: A method, apparatus, system, and non-transitory computer-readable medium, wherein the one or more RSs are not for any one or more of: reference in relation to transmission or reception of information by the UE, channel characterization by the UE, or synchronization by the UE.

Example 38A: A method, apparatus, system, and non-transitory computer-readable medium, including: receiving, by a scheduling entity, reference signal (RS) information including information relating to one or more RSs; receiving, by the scheduling entity, a request from a user equipment (UE) for RS information relating to one or more RSs that target a receiver of then the UE; and in response to the request from the UE, transmitting a message including the RS-info to the UE.

Example 39A: A method, apparatus, system, and non-transitory computer-readable medium according to any one or more of Examples 20A to 37A, further including: receiving, by a scheduling entity, reference signal (RS) information including information relating to one or more reference signals (RSs); receiving, by the scheduling entity, a request from a user equipment (UE) for RS-info relating to one or more RSs that target a receiver other than the UE; and in response to the request from the UE, transmitting a message including the RS information to the UE.

Example 40A: A method, apparatus, system, and non-transitory computer-readable medium according to any one or more of Examples 20A to 39A, further including: monitoring, by the scheduling entity, RSs based on the RS information.

Example 1B: A method, apparatus, system, and non-transitory computer-readable medium for wireless communication, including: receiving, by a user equipment (UE), data-decoding information corresponding to a transmitter; monitoring resources based on the data-decoding information; receiving an encoded signal transmitted by the transmitter, the encoded signal including one or more encoded packets; receiving a multipath reflection of the encoded signal transmitted by the transmitter; and determining a first ellipse corresponding to possible locations of an object based on a time delay between reception of encoded signal and reception of the multipath reflection of the encoded signal.

Example 2B: A method, apparatus, system, and non-transitory computer-readable medium according to Example 1B, further including: receiving, by the UE, data-decoding information corresponding to a second transmitter; monitoring resources based on the data-decoding information corresponding to the second transmitter; receiving an encoded signal from the second transmitter; receiving a multipath reflection of the encoded signal from the second transmitter; determining a second ellipse corresponding to possible locations of the object based on time delays between reception of the encoded signal received from the second transmitter and reception of the multipath reflection of the of encoded signal received from the second transmitter; and estimating a location of the object based on the first ellipse and the second ellipse.

Example 3B: A method, apparatus, system, and non-transitory computer-readable medium according to any one or more of Examples 1B to 2B, further including: receiving the data-decoding information corresponding to the first transmitter and/or the second transmitter from one or more base stations (BSs).

Example 4B: A method, apparatus, system, and non-transitory computer-readable medium according to any one or more of Examples 2B to 3B, wherein the second transmitter includes one or more of: a road side unit (RSU) and/or a data server.

Example 5B: A method, apparatus, system, and non-transitory computer-readable medium according to any one or more of Examples 1B to 4B, further including: receiving, by the UE, information about one or more ellipses determined by one or more transmitters; and estimating a location of the object based on the first ellipse and the one or more ellipses determined by the one or more transmitters.

Example 6B: A method, apparatus, system, and non-transitory computer-readable medium according to any one or more of Examples 1B to 5B, further including: receiving, by the UE, reference signal (RS) configuration information corresponding to the transmitter; monitoring resources based on the RS-info; receiving a RS transmitted by the transmitter; receiving a multipath reflection of the RS transmitted by the transmitter; and determining a second ellipse corresponding to possible locations of an object based on a time delay between reception of the RS and reception of the multipath reflection of the RS.

Example 7B: A method, apparatus, system, and non-transitory computer-readable medium according to any one or more of Examples 1B to 6B, wherein receiving, by the UE, the data-decoding information corresponding to the transmitter includes: receiving an indication that the UE omit HARQ-ACK feedback in connection with reception of an encoded signal corresponding to the data-decoding information.

Example 8B: A method, apparatus, system, and non-transitory computer-readable medium according to any one or more of Examples 1B to 7B, wherein receiving, by the UE, the data-decoding information corresponding to the transmitter includes: receiving one or more of the following: radio resource control (RRC) configuration information; one or more MAC control elements (MAC-CEs); downlink control information (DCI); sidelink control information (SCI); a dedicated physical downlink shared channel (PDSCH) message; a physical sidelink shared channel (PSSCH) message; a message transmitted using a dedicated physical (PHY) layer channel; or a control resource set (CORESET) identifier (ID) and a corresponding search space (SS).

Example 9B: A method, apparatus, system, and non-transitory computer-readable medium according to any one or more of Examples 1B to 8B, wherein receiving, by the first UE, the data-decoding information corresponding to the transmitter includes: receiving an indication that the data-decoding information is corresponding to an encoded signal transmitted by the transmitter utilizing one of the following: an uplink (UL) slot or a sidelink (SL) slot.

Example 10B: A method, apparatus, system, and non-transitory computer-readable medium according to any one or more of Examples 1B to 9B, wherein receiving, by the UE, the data-decoding information corresponding to the transmitter includes: receiving an indication that the data-decoding information is corresponding to an encoded signal transmitted to the transmitter utilizing a downlink (DL) slot.

Example 11B: A method, apparatus, system, and non-transitory computer-readable medium according to any one or more of Examples 1B to 10B, wherein the encoded signal corresponding to the data-decoding information includes: a physical downlink shared channel (PDSCH) message; a physical uplink shared channel (PUSCH) message; a physical uplink control channel (PUCCH) message; a physical downlink control channel (PDCCH) message; a physical sidelink shared channel (PSSCH) message; or a physical sidelink control channel (PSCCH) message.

Example 12B: A method, apparatus, system, and non-transitory computer-readable medium according to any one or more of Examples 1B to 11B, wherein the data-decoding information includes: a pattern corresponding to a combination of frequency domain resources and time domain resources.

Example 13B: A method, apparatus, system, and non-transitory computer-readable medium according to Example 12B, wherein the pattern corresponds to at least one physical resource block in the frequency domain, and at least one symbol in the time domain.

Example 14B: A method, apparatus, system, and non-transitory computer-readable medium according to any one or more of Examples 1B to 13B, wherein the data-decoding information includes one or more of the following: a radio network temporary identifier (RNTI); a scrambling ID; a frequency domain resource assignment (FDRA); a time domain resource assignment (TDRA); a UE-specific ID for identifying a demodulation reference signal (DMRS)-sequence; at least one orthogonal frequency division multiplexing (OFDM) symbol index corresponding to a DMRS; a comb type used by the transmitter; a DMRS port ID; a code division multiplexing (CDM)-group ID corresponding to the transmitter; an energy per resource element (EPRE)-ratio with data symbols; or quasi co-location (QCL) information.

Example 15B: A method, apparatus, system, and non-transitory computer-readable medium according to any one or more of Examples 1 to 14, wherein the data-decoding information includes one or more of the following: multiple DMRS port identifiers (IDs); or multiple DMRS scrambling IDs.

Example 16B: A method, apparatus, system, and non-transitory computer-readable medium, including: receiving, by a scheduling entity, data-decoding information corresponding to one or more transmitters; receiving, by the scheduling entity, a request from a user equipment (UE) for data-decoding information corresponding to one or more nearby transmitters; in response to the request from the UE for data-decoding information corresponding to one or more nearby transmitters, transmitting the data-decoding information corresponding to the one or more transmitters to the UE.

Example 17B: A method, apparatus, system, and non-transitory computer-readable medium according to any one or more of Examples 1B to 15B, further including: receiving, by a scheduling entity, data-decoding information corresponding to one or more transmitters; receiving, by the scheduling entity, a request from a user equipment (UE) for data-decoding information corresponding to one or more nearby transmitters; in response to the request from the UE for data-decoding information corresponding to one or more nearby transmitters, transmitting the data-decoding information corresponding to the one or more transmitters to the UE.

Example 18B: A method, apparatus, system, and non-transitory computer-readable medium according to any one or more of Examples 1B to 17B, further including: monitoring resources based on the data-decoding information corresponding to the one or more transmitters; receiving an encoded signal transmitted by each of the one or more transmitters, the encoded signal including one or more encoded packets; receiving a multipath reflection of the encoded signal transmitted by each of the one or more transmitters; determining one or more ellipses corresponding to possible locations of an object based on a time delay between reception of the encoded signal transmitted by each of the one or more transmitters and reception of the multipath reflection of the encoded signal transmitted by each of the one or more transmitters; and estimating a location of an object based on the first ellipse and each of the one or more ellipses.

Example 19B: A method, apparatus, system, and non-transitory computer-readable medium according to any one or more of Examples 1B to 18B, further including: receiving, by the scheduling entity, information about one or more ellipses determined by one or more receivers, including the UE; and estimating a location of an object based on the one or more ellipses.

Example 20B: A method, apparatus, system, and non-transitory computer-readable medium, including: receiving, by a user equipment (UE), a message including data-decoding information relating to data that is not scheduled for purposes of communication with the UE to receive; and monitoring for encoded signals based on the data-decoding information.

Example 21B: A method, apparatus, system, and non-transitory computer-readable medium according to Example 20B, further including: receiving an encoded signal based on the data-decoding information; and determining information relating to a spatial location of an object proximate the UE by passive radar sensing based on the received encoded signal.

Example 22B: A method, apparatus, system, and non-transitory computer-readable medium according to any one or more of Examples 20B to 21B, wherein the data-decoding information includes an indication that the UE is permitted to omit HARQ-ACK feedback in connection with reception of one or both of the message including the data-decoding information, or an encoded signal corresponding to the data-decoding information.

Example 23B: A method, apparatus, system, and non-transitory computer-readable medium according to any one or more of Examples 20B to 22B, wherein the message including the data-decoding information includes one or more of the following: a radio resource control (RRC) configuration message; one or more MAC control elements (MAC-CEs); downlink control information (DCI); sidelink control information (SCI); a dedicated physical downlink shared channel (PDSCH) message; a physical sidelink shared channel (PSSCH) message; a message transmitted using a dedicated physical (PHY) layer channel; or a control resource set (CORESET) identifier (ID) and a corresponding search space (SS).

Example 24B: A method, apparatus, system, and non-transitory computer-readable medium according to any one or more of Examples 20B to 23B, wherein the data-decoding information includes an indication that corresponding data for decoding is transmitted utilizing one of the following: a downlink (DL) slot, an uplink (UL) slot, or a sidelink (SL) slot.

Example 25B: A method, apparatus, system, and non-transitory computer-readable medium according to any one or more of Examples 20B to 24B, further including receiving an encoded signal based on the data-decoding information, wherein the encoded signal is one of the following: a physical downlink shared channel (PDSCH) message; a physical uplink shared channel (PUSCH) message; a physical uplink control channel (PUCCH) message; a physical downlink control channel (PDCCH) message; a physical sidelink shared channel (PSSCH) message; or a physical sidelink control channel (PSCCH) message.

Example 26B: A method, apparatus, system, and non-transitory computer-readable medium according to any one or more of Examples 20B to 25B, wherein the data-decoding information includes information relating to a set of resources for the UE to monitor for the encoded signals.

Example 27B: A method, apparatus, system, and non-transitory computer-readable medium according to any one or more of Examples 20B to 26B, wherein the information relating to the set of resources for the UE to monitor for the encoded signals includes at least one of: a frequency domain property of the set of resources; or a time domain property of the set of resources.

Example 28B: A method, apparatus, system, and non-transitory computer-readable medium according to any one or more of Examples 20B to 27B, wherein the frequency domain property of the set of resources includes an indication of one or more of the following: one or more physical resource blocks (PRBs); one or more bandwidth parts (BWPs); one or more component carriers (CCs); one or more subcarrier components; and/or at least one radio access technology (RAT).

Example 29B: A method, apparatus, system, and non-transitory computer-readable medium according to any one or more of Examples 20B to 28B, wherein the time domain property of the set of resources includes an indication of one or more of the following: one or more symbols; one or more slots; one or more subframes; or one or more frames.

Example 30B: A method, apparatus, system, and non-transitory computer-readable medium according to any one or more of Examples 20B to 29B, wherein the information relating to the set of resources for the UE to monitor for encoded signals includes: the frequency domain property of the set of resources; and the time domain property of the set of resources.

Example 31B: A method, apparatus, system, and non-transitory computer-readable medium according to any one or more of Examples 20B to 30B, wherein the information relating to the set of resources for the UE to monitor for encoded signals on the one or more channels: a frequency domain property of each set of a plurality of sets of resources including the set of resources; and a time domain property of each set of a plurality of sets of resources including the set of resources.

Example 32B: A method, apparatus, system, and non-transitory computer-readable medium according to any one or more of Examples 20B to 31B, wherein at least one set of the plurality of sets of resources overlaps in frequency and/or time with at least one other set of the plurality of sets of resources.

Example 33B: A method, apparatus, system, and non-transitory computer-readable medium according to any one or more of Examples 20B to 32B, wherein the data-decoding information includes one or more resource parameters corresponding to resources for the UE to monitor for encoded signals.

Example 34B: A method, apparatus, system, and non-transitory computer-readable medium according to any one or more of Examples 20B to 33B, wherein the one or more resource parameters corresponding to the resources for the UE to monitor for encoded signals includes one or more of the following: a radio network temporary identifier (RNTI); a scrambling ID; a frequency domain resource assignment (FDRA); a time domain resource assignment (TDRA); a UE-specific identifier (ID) for identifying a demodulation reference signal (DMRS)-sequence; at least one orthogonal frequency division multiplexing (OFDM) symbol index corresponding to a DMRS; a comb type corresponding to one or more encoded signals; a DMRS port ID; a code division multiplexing (CDM)-group ID corresponding to the one or more channels; an energy per resource element (EPRE)-ratio with data symbols; quasi co-location (QCL) information; a parameter specifying one or more DCI formats to monitor for the encoded signals; a parameters specifying a DCI format carried on PSSCH; or a parameter specifying SCI carried on PSSCH.

Example 35B: A method, apparatus, system, and non-transitory computer-readable medium according to any one or more of Examples 20B to 34B, wherein the information relating to the one or more channels includes information relating to one or more port IDs or one or more scrambling IDs for the UE to monitor for encoded signals on the one or more channels.

Example 36B: A method, apparatus, system, and non-transitory computer-readable medium according to any one or more of Examples 20B to 35B, wherein the information relating to the one or more channels includes information identifying a plurality of sets of resources, wherein a first set of the plurality of sets of resources at least partially overlaps in frequency and/or time with a second set of the plurality of sets of resources, and wherein the first set is corresponding to a different port ID or a different scrambling ID than that of the second set.

Example 37B: A method, apparatus, system, and non-transitory computer-readable medium, including receiving, by a scheduling entity, data-decoding information including information relating to data-decoding of one or more channels; receiving, by the scheduling entity, a request from a user equipment (UE) for data-decoding information relating data-decoding of one or more channels that are not for any one or more of: reference in relation to transmission or reception of information by the UE, channel characterization by the UE, or synchronization by the UE; in response to the request from the UE, transmitting a message including the data-decoding information to the UE.

Example 38B: A method, apparatus, system, and non-transitory computer-readable medium, according to any one or more of Examples 20B to 36B, further including: receiving, by a scheduling entity, data-decoding information including information relating to a data-decoding of one or more channels; receiving, by the scheduling entity, a request from a user equipment (UE) for data-decoding information relating to the data-decoding of the one or more channels that are not for any one or more of: reference in relation to transmission or reception of information by the UE, channel characterization by the UE, or synchronization by the UE; in response to the request from the UE, transmitting a message including the data-decoding information to the UE.

Example 39B: A method, apparatus, system, and non-transitory computer-readable medium according to any one or more of Examples 20B to 38B, monitoring, by the scheduling entity, for encoded signals on the one or more channels based on the data-decoding information.

Example 1C: A method, apparatus, system, and non-transitory computer-readable medium for wireless communication, including: receiving, by a user equipment (UE), a message including reference signal information (RS-info) relating to one or more reference signals (RSs) that target a receiver other than the UE; and monitoring, by the UE, for one or more RSs based on the RS-info.

Example 2C: A method, apparatus, system, and non-transitory computer-readable medium according to Example 1C, further including: receiving an RS based on the RS information; and determining information relating to a spatial location of an object proximate the UE by passive radar sensing based on the received RS.

Example 3C: A method, apparatus, system, and non-transitory computer-readable medium according to any one or more of Examples 1C to 2C, further including omitting transmission of HARQ-ACK feedback in connection with the RS-info.

Example 4C: A method, apparatus, system, and non-transitory computer-readable medium according to any one or more of Examples 1C through 3C, wherein the message includes one or more of the following: a radio resource control (RRC) configuration message; one or more MAC control elements (MAC-CEs); downlink control information (DCI); sidelink control information (SCI); a physical downlink shared channel (PDSCH) message; a physical sidelink shared channel (PSSCH) message; a message transmitted using a dedicated physical (PHY) layer channel; or a control resource set (CORESET) ID and a corresponding search space (SS).

Example 5C: A method, apparatus, system, and non-transitory computer-readable medium according to Examples 1C through 4C, wherein the RS information includes an indication that the RS information is associated with an RS transmitted utilizing one of the following: a downlink (DL) slot, an uplink (UL) slot, or a sidelink (SL) slot.

Example 6C: A method, apparatus, system, and non-transitory computer-readable medium according to Examples 1C through 5C, further including receiving an RS based on the RS information, wherein the RS is one of the following: a demodulation reference signal (DMRS) for a physical uplink shared channel (PUSCH); a DMRS for a physical downlink shared channel (PDSCH), a DMRS for a physical uplink control channel (PUCCH), a DMRS for a physical downlink control channel (PDCCH); a channel state information (CSI)-RS; a CSI tracking reference signal (CSI-TRS); a positioning reference signal (PRS); a phase tracking reference signal (PTRS); or a sounding reference signal (SRS).

Example 7C: A method, apparatus, system, and non-transitory computer-readable medium according to any one or more of Examples 1C through 6C, wherein the information relating to the one or more RSs includes information relating to a set of resources for the UE to monitor for the one or more RSs.

Example 8C: A method, apparatus, system, and non-transitory computer-readable medium according to Example 7C, wherein the information relating to the set of resources for the UE to monitor for the one or more RSs includes at least one of: a frequency domain property of the set of resources; or a time domain property of the set of resources.

Example 9C: A method, apparatus, system, and non-transitory computer-readable medium according to the method according to Example 8C, wherein the frequency domain property of the set of resources includes an indication of one or more of the following: one or more physical resource blocks (PRB); one or more bandwidth parts (BWP); one or more component carriers (CC); one or more subcarrier components; and/or at least one radio access technology (RAT).

Example 10C: A method, apparatus, system, and non-transitory computer-readable medium according to Example 8C, wherein the time domain property of the set of resources includes an indication of one or more of the following: one or more symbols; one or more slots; one or more subframes; or one or more frames.

Example 11C: A method, apparatus, system, and non-transitory computer-readable medium according to Example 8C, wherein the information relating to the set of resources for the UE to monitor for the one or more RSs includes: the frequency domain property of the set of resources; and the time domain property of the set of resources.

Example 12C: A method, apparatus, system, and non-transitory computer-readable medium according to Example 8C, wherein the information relating to the set of resources for the UE to monitor for the one or more RSs includes at least one of: a frequency domain property of each set of a plurality of sets of resources including the set of resources; and/or a time domain property of each set of a plurality of sets of resources including the set of resources.

Example 13C: A method, apparatus, system, and non-transitory computer-readable medium according to Example 12C, wherein at least one set of the plurality of sets of resources overlaps in frequency and/or time with at least one other set of the plurality of sets of resources.

Example 14C: A method, apparatus, system, and non-transitory computer-readable medium according to any one or more of Examples 1C through 13C, wherein the information relating to the one or more RSs includes one or more resource parameters corresponding to resources for the UE to monitor for the one or more RSs.

Example 15C: A method, apparatus, system, and non-transitory computer-readable medium according to Example 14C, wherein the one or more resource parameters corresponding to the resources for the UE to monitor for the one or more RSs includes one or more of the following: a UE-specific ID for identifying a DMRS-sequence; at least one orthogonal frequency division multiplexing (OFDM) symbol index corresponding to a DMRS; a comb type corresponding to the one or more RSs; a DMRS port ID; a code division multiplexing (CDM)-group ID associated with the one or more RSs; an energy per resource element (EPRE)-ratio with data symbols; or quasi co-location (QCL) information.

Example 16C: A method, apparatus, system, and non-transitory computer-readable medium according to any one or more of Examples 1C through 15C, wherein the information relating to the one or more RSs includes information relating to one or more port IDs or one or more scrambling IDs for the UE to monitor for the RSs.

Example 17C: A method, apparatus, system, and non-transitory computer-readable medium according to Example 16C, wherein the information relating to the one or more RSs includes information identifying a plurality of sets of resources, wherein a first set of the plurality of sets of resources at least partially overlaps in frequency and/or time with a second set of the plurality of sets of resources, and wherein the first set is associated with a different port ID or a different scrambling ID than that of the second set.

Example 18C: A method, apparatus, system, and non-transitory computer-readable medium according to any one or more of Examples 1C to 17C, wherein the one or more RSs are not for any one or more of: reference in relation to transmission or reception of information by the UE, channel characterization by the UE, or synchronization by the UE.

Example 19C: An apparatus including means for sharing transmission configuration information to a first user equipment (UE), the first UE to utilize the transmission configuration information to perform multi-node passive sensing in a network environment. The transmission configuration information conveying means for receiving a particular set of reference signals as reflection signals corresponding to a line-of-sight (LoS) signal transmitted between two other entities in the network environment. In some examples, the transmission configuration information conveys means for decoding encoded data conveyed between the two other entities in the network environment (e.g., for performing decoding of a less than full set of encoded data items targeted for another UE other than the first UE).

Example 1D: A method, apparatus, system, and non-transitory computer-readable medium for wireless communication, including: receiving, by a first user equipment (UE), a message including data decoding information relating to data that is not scheduled for purposes of communication with the first UE (e.g., for purposes of communication with a second UE in the network environment); and monitoring for encoded signals based on the data decoding information.

Example 2D: A method, apparatus, system, and non-transitory computer-readable medium according to Example 1D, further including: receiving an encoded signal based on the data decoding information; and determining information relating to a spatial location of an object proximate the UE by passive radar sensing based on the received encoded signal.

Example 3D: A method, apparatus, system, and non-transitory computer-readable medium according to the method of any one or more of Examples 1D or 2D, wherein the data decoding information includes an indication that the UE is permitted to omit HARQ-ACK feedback in connection with reception of one or both of the message including the data decoding information, or an encoded signal associated with the data decoding information.

Example 4D: A method, apparatus, system, and non-transitory computer-readable medium according to the method of any one or more of Examples 1D through 3D, wherein the message including the data decoding information includes one or more of the following: a radio resource control (RRC) configuration message; one or more MAC control elements (MAC-CEs); downlink control information (DCI); sidelink control information (SCI); a dedicated physical downlink shared channel (PDSCH) message; a physical sidelink shared channel (PSSCH) message; a message transmitted using a dedicated physical (PHY) layer channel; or a control resource set (CORESET) ID and a corresponding search space (SS).

Example 5D: A method, apparatus, system, and non-transitory computer-readable medium according to the method of any one or more of Examples 1D through 3D, wherein the data decoding information includes an indication that corresponding data is transmitted utilizing one of the following: a downlink (DL) slot, an uplink (UL) slot, or a sidelink (SL) slot.

Example 6D: A method, apparatus, system, and non-transitory computer-readable medium according to the method of any one or more of Examples 1D through 3D, further including receiving an encoded signal based on the data decoding information, wherein the encoded signal is one of the following: a physical downlink shared channel (PDSCH) message; a physical uplink shared channel (PUSCH) message; a physical uplink control channel (PUCCH) message; a physical downlink control channel (PDCCH) message; a physical sidelink shared channel (PSSCH) message; or a physical sidelink control channel (PSCCH) message.

Example 7D: A method, apparatus, system, and non-transitory computer-readable medium according to the method of any one or more of Examples 1D through 3D, wherein the data decoding information includes information relating to a set of resources for the UE to monitor for the encoded signals.

Example 8D: A method, apparatus, system, and non-transitory computer-readable medium according to Example 7D, wherein the information relating to the set of resources for the UE to monitor for the encoded signals includes at least one of: a frequency domain property of the set of resources; or a time domain property of the set of resources.

Example 9D: A method, apparatus, system, and non-transitory computer-readable medium according to Example 8D, wherein the frequency domain property of the set of resources includes an indication of one or more of the following: one or more physical resource blocks (PRB); one or more bandwidth parts (BWP); one or more component carriers (CC); one or more subcarrier components; and/or at least one radio access technology (RAT).

Example 10D: A method, apparatus, system, and non-transitory computer-readable medium according to Example 8D, wherein the time domain property of the set of resources includes an indication of one or more of the following: one or more symbols; one or more slot; one or more subframes; or one or more frames.

Example 11D: A method, apparatus, system, and non-transitory computer-readable medium according to Example 8D, wherein the information relating to the set of resources for the UE to monitor for encoded signals includes: the frequency domain property of the set of resources; and the time domain property of the set of resources.

Example 12D: A method, apparatus, system, and non-transitory computer-readable medium according to Example 8D, wherein the information relating to the set of resources for the UE to monitor for encoded signals on the one or more channels: a frequency domain property of each set of a plurality of sets of resources including the set of resources; and/or a time domain property of each set of a plurality of sets of resources including the set of resources.

Example 13D: A method, apparatus, system, and non-transitory computer-readable medium according to Example 12D, wherein at least one set of the plurality of sets of resources overlaps in frequency and/or time with at least one other set of the plurality of sets of resources.

Example 14D: A method, apparatus, system, and non-transitory computer-readable medium according to the method of any one or more of Examples 1D through 13D, wherein the data decoding information includes one or more resource parameters corresponding to resources for the UE to monitor for encoded signals.

Example 15D: A method, apparatus, system, and non-transitory computer-readable medium according to Example 14D, wherein the one or more resource parameters corresponding to the resources for the UE to monitor for encoded signals includes one or more of the following: a radio network temporary identifier (RNTI); a scrambling ID; a frequency domain resource assignment (FDRA); a time domain resource assignment (TDRA); a UE-specific ID for identifying a DMRS-sequence; at least one orthogonal frequency division multiplexing (OFDM) symbol index corresponding to a DMRS; a comb type corresponding to one or more encoded signals; a DMRS port ID; a code division multiplexing (CDM)-group ID associated with the one or more channels; an energy per resource element (EPRE)-ratio with data symbols; quasi co-location (QCL) information; a parameter specifying one or more DCI formats to monitor for the encoded signals; a parameters specifying a DCI format carried on PSSCH; or a parameter specifying SCI carried on PSSCH.

Example 16D: A method, apparatus, system, and non-transitory computer-readable medium according to the method of any one or more of Examples 1D through 15D, wherein the information relating to the one or more channels includes information relating to one or more port IDs or one or more scrambling IDs for the UE to monitor for encoded signals on the one or more channels.

Example 17D: A method, apparatus, system, and non-transitory computer-readable medium according to Example 16D, wherein the information relating to the one or more channels includes information identifying a plurality of sets of resources, wherein a first set of the plurality of sets of resources at least partially overlaps in frequency and/or time with a second set of the plurality of sets of resources, and wherein the first set is associated with a different port ID or a different scrambling ID than that of the second set.

Example 18D: An apparatus including means for receiving transmission configuration information for multi-node passive sensing of objects in a network environment. The transmission configuration information conveying means for the apparatus to receive a particular set of reference signals as reflection signals corresponding to a line-of-sight (LoS) signal transmitted between two other entities in the network environment. In some examples, the transmission configuration information includes means for decoding the encoded data transmitted on an encoded channel between the two other entities (e.g., a PSSCH, a PSCCH, etc.).

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3rd Generation Partnership Project (3GPP), such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-19 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-19 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication, comprising:
    receiving, by a first user equipment (UE), one or more messages comprising:
        (i) reference signal information (RS-info) indicative of a set of resource parameters relating to a set of reference signals (RSs), the set of reference signals (RSs) corresponding to at least one line-of-sight (LoS) signal, the LoS signal targeting at least one entity other than the first UE, and
        (ii) data-decoding information indicative of a first set of data-decoding parameters configured for at least partially decoding a set of encoded data items, the set of encoded data items corresponding to a set of encoded signals configured for a second UE to fully decode via a second set of data-decoding parameters different from the first set of data-decoding parameters; and
    monitoring, by the first UE, for at least one of:
        (i) the set of RSs based on the RS-info, or
        (ii) the set of encoded signals on one or more channels based on the data-decoding information.

2. The method of claim 1, further comprising:
    receiving at least one of:
        (i) the set of RSs based on the RS-info, or
        (ii) the set of encoded signals based on the data-decoding information; and
    determining information relating to a spatial location of an object proximate the first UE based on at least one of:
        (i) the set of encoded signals, or
        (ii) the set of RSs.

3. The method of claim 1, further comprising:
    omitting transmission of hybrid automatic repeat request (HARQ) feedback in connection with reception of one or more of:
        (i) the RS-info,
        (ii) the set of RSs received using the RS-info,
        (iii) the data-decoding information, or
        (iv) the set of encoded signals.

4. The method of claim 3, further comprising:
    receiving a second set of RSs, the second set of RSs including at least one line-of-sight (LoS) signal targeting the first UE, and at least one corresponding reflection signal; and
    transmitting one or more feedback messages indicating receipt of the second set of RSs.

5. The method of claim 1, wherein the message one or more messages comprise one or more of:
    a radio resource control (RRC) configuration message;
    one or more medium access control (MAC) control elements (MAC-CEs);
    downlink control information (DCI);
    a physical downlink shared channel (PDSCH) message;
    sidelink control information (SCI);
    a physical sidelink shared channel (PSSCH) message;
    a message transmitted using a physical (PHY) layer channel;
    a control resource set (CORESET) identifier (ID) and a corresponding search space (SS);
    a physical RS-info channel comprising the RS-info;
    a physical data-decoding channel comprising the data-decoding information; or
    a physical transmission configuration channel comprising the data-decoding information and the RS-info.

6. The method of claim 1,
    wherein the RS-info indicates that at least one reference signal (RS) from the set of RSs corresponds to at least one first slot, and
    wherein the data-decoding information indicates that at least one encoded signal from the set of encoded signals corresponds to the at least one first slot or at least one second slot other.

7. The method of claim 1,
    wherein the monitoring for the set of RSs based on the RS-info includes:
        utilizing the RS-info to determine the set of resource elements to monitor for at least one of:
            (i) a demodulation reference signal (DMRS),
            (ii) a channel state information reference signal (CSI-RS),
            (iii) a channel state information tracking reference signal (CSI-TRS),
            (iv) a positioning reference signal (PRS),
            (v) a phase tracking reference signal (PTRS), or
            (vi) a sounding reference signal (SRS); and
    wherein the monitoring for the set of encoded signals based on the data-decoding information includes:
        utilizing the data-decoding information to decode an encoded message transmitted via at least one of:
            (i) a physical downlink shared channel (PDSCH),
            (ii) a physical downlink control channel (PDCCH),
            (iii) a physical uplink shared channel (PUSCH),
            (iv) a physical uplink control channel (PUCCH), (v) a physical sidelink shared channel (PSSCH), or
(vi) a physical sidelink control channel (PSCCH).

8. The method of claim 1,
wherein the set of resource parameters comprise at least one of:
(i) a frequency domain (FD) property indicative of the set of resource parameters for the first UE to monitor; or
(ii) a time domain (TD) property indicative of the set of resource parameters for the first UE to monitor.

9. The method of claim 8, wherein the FD property of the set of resource parameters includes an indication of one or more of the following:
one or more physical resource blocks (PRBs),
one or more bandwidth parts (BWPs),
one or more component carriers (CCs),
one or more subcarriers, or
at least one radio access technology (RAT).

10. The method of claim 8, wherein the TD property of the set of resource parameters comprises an indication of one or more of the following:
one or more symbols,
one or more slots,
one or more subframes, or
one or more frames.

11. The method of claim 1,
wherein the RS-info comprises information relating to one or more port IDs or one or more scrambling IDs for the first UE to monitor for the set of RSs, and
wherein the data-decoding information comprises information relating to one or more port IDs or one or more scrambling IDs for the first UE to monitor for the set of encoded signals on the one or more channels.

12. A wireless communication device, comprising:
a transceiver;
memory; and
at least one processor communicatively coupled to the transceiver and the memory, the at least one processor configured to cause the wireless communication device to:
receive, via the transceiver, one or more messages comprising:
(i) a set of reference signal information (RS-info) parameters relating to one or more reference signals (RSs) corresponding to at least one line-of-sight (LoS) signals targeting one or more receiving devices distinct from the wireless communication device, and
(ii) a set of data-decoding information parameters relating to data that is scheduled for purposes of communications with the one or more receiving devices via the at least one line-of-sight (LoS) signal; and
monitor, using the transceiver, at least one of:
(i) a set of reference signal transmissions based on the set of RS-info parameters, or
(ii) a set of encoded data signals based on the set of data-decoding information parameters.

13. The wireless communication device of claim 12,
wherein to monitor the set of reference signal transmissions, the at least one processor is configured to cause the wireless communication device to:
utilize the set of RS-info parameters to receive a first reference signal (RS) of the set of reference signal transmissions, and
wherein to monitor the set of encoded data signals, the processor is configured to:
utilize the set of data-decoding information parameters to receive a first encoded signal; and
determine information relating to a spatial location of an object proximate the wireless communication device based on the first encoded signal.

14. The wireless communication device of claim 13, wherein the set of RS-info parameters includes an indication that the first reference signal corresponds to a sidelink (SL) slot.

15. The wireless communication device of claim 12,
wherein the at least one processor is configured to cause the wireless communication device to:
omit transmission of feedback in connection with reception of the set of RS-info parameters, or in connection with reception of the set of reference signal transmissions, and
wherein the processor is further configured to:
omit transmission of feedback in connection with reception of the set of data-decoding information parameters, or in connection with reception of the set of encoded signals.

16. The wireless communication device of claim 12,
wherein to monitor the set of reference signal transmissions, the at least one processor is configured to cause the wireless communication device to:
utilize the set of RS-info parameters to receive at least one first reference signal (RS) of the set of reference signal transmissions, wherein the at least one first RS corresponds to the at least one LoS signals, and
wherein to monitor the set of encoded signals, the at least one processor is configured to cause the wireless communication device to:
utilize the set of data-decoding information parameters to receive at least one first encoded signal of the set of encoded signals, wherein the at least one first encoded signal comprises a multipath reflection signal.

17. The wireless communication device of claim 16,
wherein the at least one first RS includes at least one of:
(i) a demodulation reference signal (DMRS),
(ii) a channel state information reference signal (CSI-RS),
(iii) a channel state information tracking reference signal (CSI-TRS),
(iv) a positioning reference signal (PRS),
(v) a phase tracking reference signal (PTRS), or
(vi) a sounding reference signal (SRS); and
wherein the at least one first encoded signal comprises at least one of:
(i) a physical downlink shared channel (PDSCH) message;
(ii) a physical uplink shared channel (PUSCH) message;
(iii) a physical uplink control channel (PUCCH) message;
(iv) a physical downlink control channel (PDCCH) message;
(v) a physical sidelink shared channel (PSSCH) message; or
(vi) a physical sidelink control channel (PSCCH) message.

18. The wireless communication device of claim 12,
wherein the set of RS-info parameters comprises a set of resource parameters corresponding to a set of resources for the wireless communication device to monitor, and wherein the data-decoding information comprises a set of resource parameters corresponding to a set of resources of the encoded signals.

19. The wireless communication device of claim 18, wherein the one or more messages include at least one of:
a frequency domain (FD) property; or
a time domain property (TD).

20. The wireless communication device of claim 19, wherein the FD property comprises an indication of one or more of the following: one or more physical resource blocks (PRBs); one or more bandwidth parts (BWPs); one or more component carriers (CCs); one or more subcarriers; or at least one radio access technology (RAT).

21. The wireless communication device of claim 19, wherein the TD property comprises an indication of one or more of the following: one or more symbols; one or more slots; one or more subframes; or one or more frames.

22. The wireless communication device of claim 18, wherein the set of resource parameters comprises one or more of:
a UE-specific ID for identifying a demodulation reference signal (DMRS)-sequence; at least one orthogonal frequency division multiplexing (OFDM) symbol index corresponding to a DMRS; a comb type; a DMRS port ID; a code division multiplexing (CDM)-group ID; an energy per resource element (EPRE)-ratio with data symbols; or quasi co-location (QCL) information, or
a parameter specifying one or more DCI formats to monitor the encoded signals; a parameter specifying a DCI format carried on PSSCH; or a parameter specifying SCI carried on PSSCH, or
a radio network temporary identifier (RNTI); a scrambling ID; a frequency domain resource assignment (FDRA); a time domain resource assignment (TDRA); or a UE-specific ID for identifying a DMRS-sequence.

23. The wireless communication device of claim 12,
wherein the set of RS-info parameters comprises information identifying a plurality of sets of resources, wherein a first set of the plurality of sets of resources at least partially overlaps in frequency and/or time with a second set of the plurality of sets of resources, and wherein the first set of the plurality of sets of resources corresponds to a different port ID or a different scrambling ID than that of the second set of the plurality of sets of resources; and
wherein the set of data-decoding information parameters comprises information identifying a plurality of resources, wherein a first set of resources of the plurality of resources at least partially overlaps in frequency and/or time with a second set of resources of the plurality of resources, and wherein the first set of resources of the plurality of resources corresponds to a port ID or a scrambling ID that is different from that of the second set of resources of the plurality of resources.

24. The wireless communication device of claim 12,
wherein the set of RS-info parameters comprises information relating to one or more port IDs or one or more scrambling IDs for the wireless communication device to monitor for the one or more RSs, and
wherein the set of data-decoding information parameters comprises information relating to one or more port IDs or one or more scrambling IDs for the wireless communication device to monitor for the data scheduled for purposes of communications with the one or more receiving devices via the at least one line-of-sight (LoS) signal.

25. An apparatus for wireless communication, comprising:
means for receiving, by a first user equipment (UE), one or more messages comprising:
(i) a set of reference signal information (RS-info) parameters relating to one or more reference signals (RSs) corresponding to at least one line-of-sight (LoS) signal targeting one or more other devices distinct and separate from the first UE, and
(ii) a set of data-decoding information parameters relating to data that is scheduled for purposes of communications with the one or more other devices via the at least one line-of-sight (LoS) signal targeting the one or more other devices; and
means for monitoring for at least one of:
(i) a set of reference signal transmissions based on the set of RS-info parameters, or
(ii) a set of encoded channels based on the data-decoding information parameters.

26. The apparatus of claim 25, further comprising:
means for receiving at least one of:
(i) a first reference signal (RS) based on the set of reference signal information (RS-info) parameters, or
(ii) a first encoded signal based on the data-decoding information parameters; and
means for determining information relating to a spatial location of an object proximate the first UE based at least in part on at least one of:
(i) the first RS, or
(ii) the first encoded signal.

27. The apparatus of claim 25,
wherein the set of RS-info parameters comprises an indication that a first RS of the set of RSs corresponds to one of the following: a downlink (DL) slot, an uplink (UL) slot, or a sidelink (SL) slot, and
wherein the set of data-decoding information parameters comprises an indication that the data scheduled for purposes of communications via the at least one LoS signal corresponds to one of the following: a downlink (DL) slot, an uplink (UL) slot, or a sidelink (SL) slot.

28. The apparatus of claim 25,
wherein the set of RS-info parameters comprises a set of resource parameters corresponding to a set of resources for the first UE to monitor for the one or more RSs, and
wherein the data-decoding information includes a set of resources for the first UE to monitor an encoded data channel.

29. A scheduling entity for wireless communication, comprising:
a transceiver;
memory; and
at least one processor communicatively coupled to the transceiver and the memory, the at least one processor configured to cause the scheduling entity to:
receive, via the transceiver, at least one of:
(i) a set of reference signal information (RS-info) parameters including a set of resource parameters corresponding to one or more reference signals (RSs) targeting a plurality of receiving devices, or
(ii) a set of data-decoding information parameters including a set of decoding parameters for decoding a set of encoded signals transmitted to a plurality of receiving devices over one or more encoded channels;
receive, via the transceiver, a request from a first user equipment (UE) for at least one of:

(i) the set of RS-info parameters, wherein the RS-info parameters comprises information relating to one or more reference signals (RSs) that target at least one second UE other than the first UE, or (ii) the data-decoding information parameters, wherein the data-decoding information corresponds to a data-decoding for at least one data item scheduled for at least one second UE; and transmit, via the transceiver, one or more messages to the first UE, wherein the one or more messages comprise:
(i) the set of RS-info parameters, and
(ii) the set of data-decoding information parameters.

30. The scheduling entity of claim 29, wherein the at least one processor is configured to cause the scheduling entity to:
utilize the set of RS-info parameters to monitor for a set of corresponding RSs; or
utilize the set of data-decoding information parameters to monitor for a set of corresponding encoded signals on one or more encoded channels.

* * * * *